United States Patent [19]

George et al.

[11] Patent Number: 5,327,518

[45] Date of Patent: Jul. 5, 1994

[54] AUDIO ANALYSIS/SYNTHESIS SYSTEM

[75] Inventors: E. Bryan George, Smyrna; Mark J. T. Smith, Atlanta, both of Ga.

[73] Assignee: Georgia Tech Research Corporation, Atlanta, Ga.

[21] Appl. No.: 748,544

[22] Filed: Aug. 22, 1991

[51] Int. Cl.⁵ .............................................. G10L 9/02
[52] U.S. Cl. ..................................... 395/2.2; 395/2.7
[58] Field of Search ................................. 381/29–41, 381/46–53, 94; 395/2

[56] References Cited

U.S. PATENT DOCUMENTS

| | | | |
|---|---|---|---|
| 4,856,068 | 8/1989 | Quatieri, Jr. et al. | 381/47 |
| 4,885,790 | 12/1989 | McAulay et al. | 381/36 |
| 4,937,873 | 6/1990 | McAulay et al. | 381/51 |
| 5,054,072 | 10/1991 | McAulay et al. | 381/31 |

OTHER PUBLICATIONS

Robert J. McAulay and Thomas F. Quatieri, "Pitch Estimation and Voicing Detection Based on a Sinusoidal Speech Model," *IEEE Int'l Conf. on Acoustics, Speech and Signal Processing*, pp. 249–252 (Apr. 1990).

Thomas F. Quatieri and Robert J. McAulay, "Phase Coherence in Speech Reconstruction for Enhancement and Coding Applications," *IEEE Int'l Conf. on Acoustics, Speech and Signal Processing*, Glasgow, Scotland, pp. 207–209 (May 1989).

Robert J. McAulay and Thomas F. Quatieri, "Computationally Efficient Sine-Wave Synthesis and Its Application to Sinusoidal Transform Coding," *IEEE Int'l Conf. on Acoustics, Speech and Signal Processing*, pp. 370–373 (Apr. 1988).

Thomas F. Quatieri and Robert J. McAulay, "Mixed-Phase Deconvolution of Speech Based on a Sine-Wave Model," *IEEE Int'l Conf. on Acoustics, Speech and Signal Processing*, pp. 649–652 (Apr. 1987).

Thomas F. Quatieri and Robert J. McAulay, "Speech Transformations Based on a Sinusoidal Representation," *IEEE Transactions on Acoustics, Speech and Signal Processing*, pp. 1449–1464, vol. ASSP-34, No. 6 (Dec. 1986).

Robert J. McAulay and Thomas F. Quatieri, "Speech Analysis/Synthesis Based on a Sinusoidal Representation," *IEEE Transactions on Acoustics, Speech and Signal Processing*, pp. 744–754, vol. ASSP-34, No. 4 (Aug. 1986).

R. J. McAulay and T. F. Quatieri, "Phase Modeling and Its Application to Sinusoidal," *IEEE Int'l Conf. on Acoustics, Speech and Signal Processing*, Tokyo, Japan, pp. 1713–1715 (Apr. 1986).

*Primary Examiner*—Michael R. Fleming
*Assistant Examiner*—Michelle Doerrler
*Attorney, Agent, or Firm*—Needle & Rosenberg

[57] ABSTRACT

A method and apparatus for the automatic analysis, synthesis and modification of audio signals, based on an overlap-add sinusoidal model, is disclosed. Automatic analysis of amplitude, frequency and phase parameters of the model is achieved using an analysis-by-synthesis procedure which incorporates successive approximation, yielding synthetic waveforms which are very good approximations to the original waveforms and are perceptually identical to the original sounds. A generalized overlap-add sinusoidal model is introduced which can modify audio signals without objectionable artifacts. In addition, a new approach to pitch-scale modification allows for the use of arbitrary spectral envelope estimates and addresses the problems of high-frequency loss and noise amplification encountered with prior art methods. The overlap-add synthesis method provides the ability to synthesize sounds with computational efficiency rivaling that of synthesis using the discrete short-time Fourier transform (DSTFT) while eliminating the modification artifacts associated with that method.

28 Claims, 30 Drawing Sheets

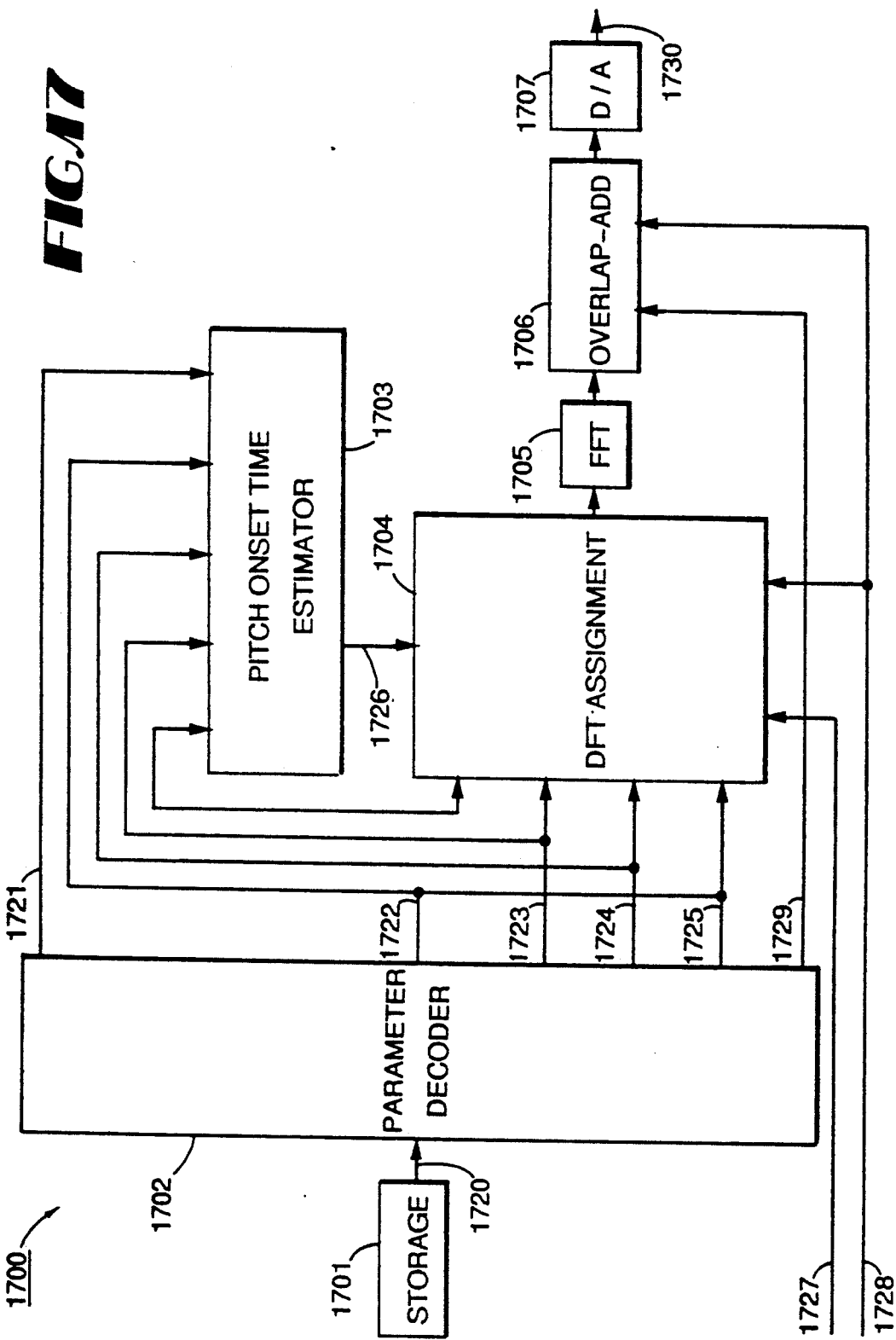

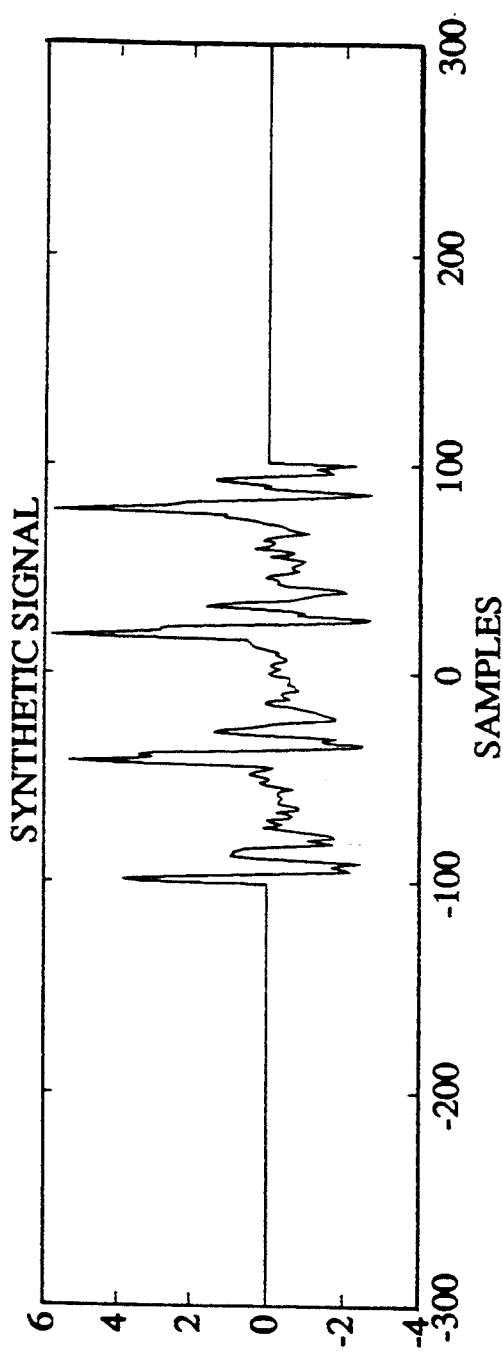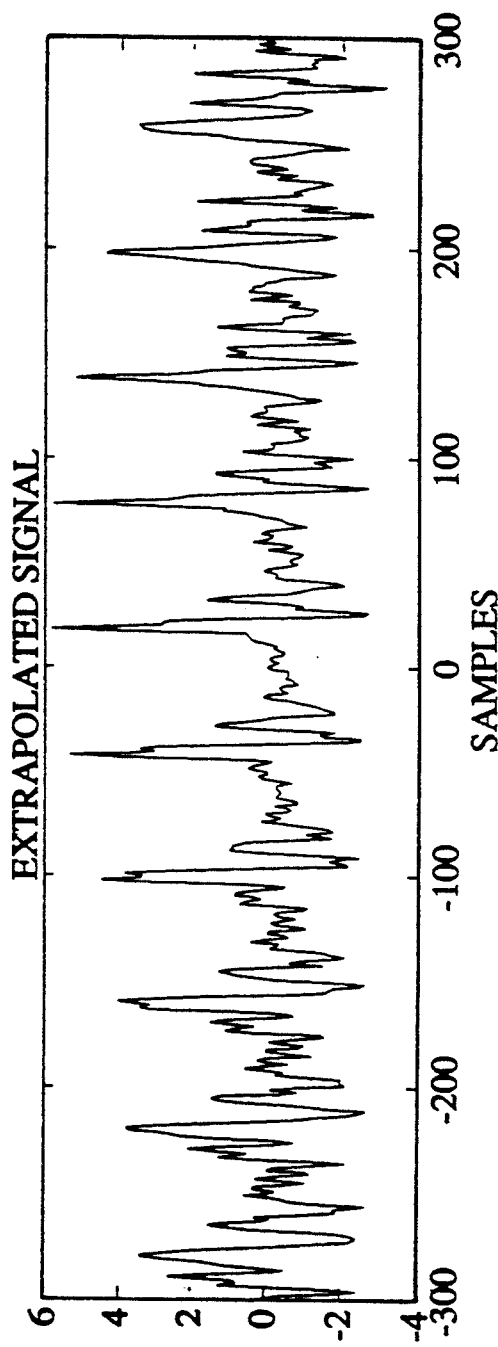

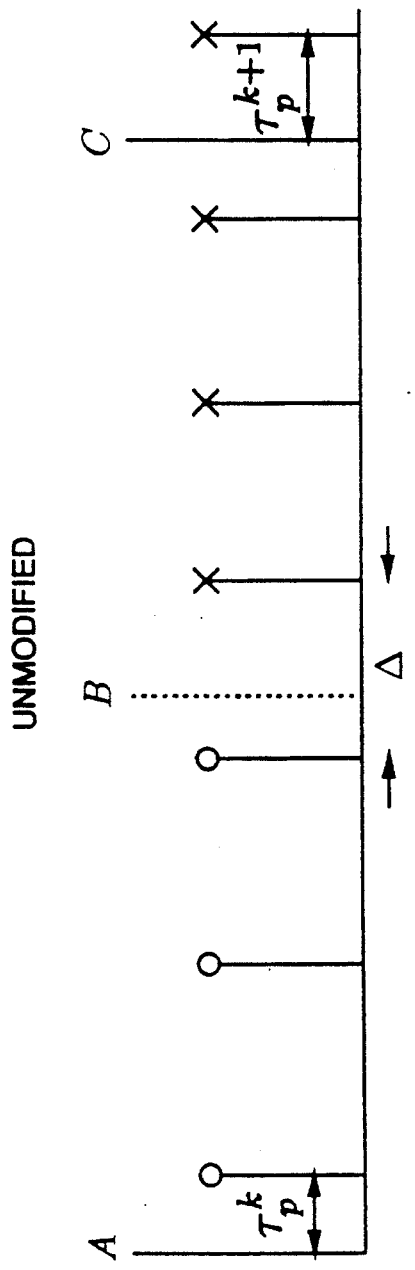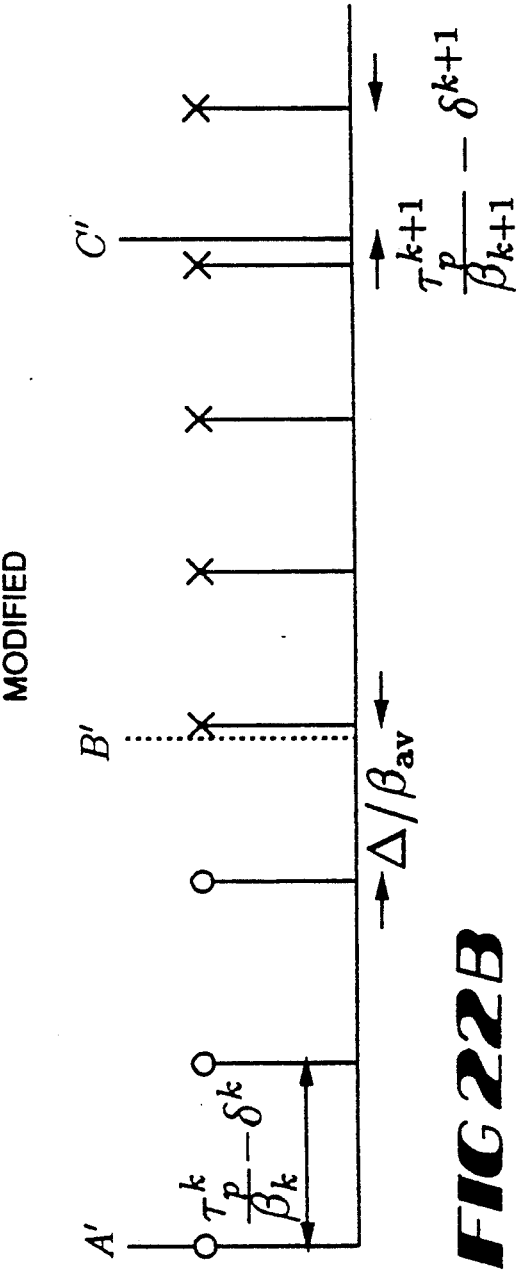

AUDIO ANALYSIS/SYNTHESIS SYSTEM

This invention was made with government support under Grant No. MIP-8611372 awarded by the National Science Foundation. The government has certain rights in the invention.

TECHNICAL FIELD

The present invention relates to methods and apparatus for acoustic signal processing and especially for audio analysis and synthesis. More particularly, the present invention relates to the analysis and synthesis of audio signals such as speech or music, whereby time-, frequency- and pitch-scale modifications may be introduced without perceptible distortion.

BACKGROUND OF THE INVENTION

For many years the most popular approach to representing speech signals parametrically has been linear predictive (LP) modeling. Linear prediction is described by J. Makhoul, "Linear Prediction: A Tutorial Review," *Proc. IEEE*, vol. 63, pp. 561–580, April 1975. In this approach, the speech production process is modeled as a linear time-varying, all-pole vocal tract filter driven by an excitation signal representing characteristics of the glottal waveform. While many variations on this basic model have been widely used in low bit-rate speech coding, the formulation known as pitch-excited LPC has been very popular for speech synthesis and modification as well. In pitch-excited LPC, the excitation signal is modeled either as a periodic pulse train for voiced speech or as white noise for unvoiced speech. By effectively separating and parameterizing the voicing state, pitch frequency and articulation rate of speech, pitch-excited LPC can flexibly modify analyzed speech as well as produce artificial speech given linguistic production rules (referred to as synthesis-by-rule).

However, pitch-excited LPC is inherently constrained and suffers from wellknown distortion characteristics. LP modeling is based on the assumption that the vocal tract may be modeled as an all-pole filter; deviations of an actual vocal tract from this ideal thus result in an excitation signal without the purely pulse-like or noisy structure assumed in the excitation model. Pitch-excited LPC therefore produces synthetic speech with noticeable and objectionable distortions. Also, LP modeling assumes a priori that a given signal is the output of a time-varying filter driven by an easily represented excitation signal, which limits its usefulness to those signals (such as speech) which are reasonably well represented by this structure. Furthermore, pitch-excited LPC typically requires a "voiced/unvoiced" classification and a pitch estimate for voiced speech; serious distortions result from errors in either procedure.

Time-frequency representations of speech combine the observations that much speech information resides in the frequency domain and that speech production is an inherently non-stationary process. While many different types of time-frequency representations exist, to date the most popular for the purpose of speech processing has been the short-time Fourier transform (STFT). One formulation of the STFT, discussed in the article by J. L. Flanagan and R. M. Golden, "Phase Vocoder," *Bell Sys. Tech. J.*, vol. 45, pp. 1493–1509, 1966, and known as the digital phase vocoder (DPV), parameterizes speech production information in a manner very similar to LP modeling and is capable of performing speech modifications without the constraints of pitch-excited LPC.

Unfortunately, the DPV is also computationally intensive, limiting its usefulness in real-time applications. An alternate approach to the problem of speech modification using the STFT is based on the discrete short-time Fourier transform (DSTFT), implemented using a Fast Fourier Transform (FFT) algorithm. This approach is described in the Ph.D. thesis of M. R. Portnoff, *Time-Scale Modification of Speech Based on Short-Time Fourier Analysis*, Massachusetts Institute of Technology, 1978. While this approach is computationally efficient and provides much of the functionality of the DPV, when applied to modifications the DSTFT generates reverberant artifacts due to phase distortion. An iterative approach to phase estimation in the modified transform has been disclosed by D. W. Griffin and J. S. Lira in "Signal Estimation from Modified Short-Time Fourier Transform," *IEEE Trans. on Acoust., Speech and Signal Processing*, vol. ASSP-32, no. 2, pp. 236–242, 1984. This estimation technique reduces phase distortion, but adds greatly to the computation required for implementation.

Sinusoidal modeling, which represents signals as sums of arbitrary amplitude- and frequency-modulated sinusoids, has recently been introduced as a high-quality alternative to LP modeling and the STFT and offers advantages over these approaches for synthesis and modification problems. As with the STFT, sinusoidal modeling operates without an "all-pole" constraint, resulting in more natural sounding synthetic and modified speech. Also, sinusoidal modeling does not require the restrictive "source/filter" structure of LP modeling; sinusoidal models are thus capable of representing signals from a variety of sources, including speech from multiple speakers, music signals, speech in musical backgrounds, and certain biological and biomedical signals. In addition, sinusoidal models offer greater access to and control over speech production parameters than the STFT.

The most notable and widely used formulation of sinusoidal modeling is the Sine-Wave System introduced by McAulay and Quatieri, as described in their articles "Speech Analysis/Synthesis Based on a Sinusoidal Representation," *IEEE Trans. on Acoust., Speech and Signal Processing*, vol. ASSP-34, pp. 744–754, August 1986, and "Speech Transformations Based on a Sinusoidal Representation," *IEEE Trans. on Acoust., Speech and Signal Processing*, vol. ASSP-34, pp. 1449–1464, December 1986. The Sine-Wave System has proven to be useful in a wide range of speech processing applications, and the analysis and synthesis techniques used in the system are well-justified and reasonable, given certain assumptions.

Analysis in the Sine-Wave System derives model parameters from peaks of the spectrum of a windowed signal segment. The theoretical justification for this analysis technique is based on an analogy to least-squares approximation of the segment by constant-amplitude, constant-frequency sinusoids. However, sinusoids of this form are not used to represent the analyzed signal; instead, synthesis is implemented with parameter tracks created by matching sinusoids from one frame to the next and interpolating the matched parameters using polynomial functions.

This implementation, while making possible many of the applications of the system, represents an uncontrolled departure from the theoretical basis of the analysis technique. This can lead to distortions, particularly during non-stationary portions of a signal. Furthermore, the matching and interpolation algorithms add to the computational overhead of the system, and the continuously variable nature of the parameter tracks necessitates direct evaluation of the sinusoidal components at each sample point, a significant computational obstacle. A more computationally efficient synthesis algorithm for the Sine-Wave System has been proposed by McAulay and Quatieri in "Computationally Efficient Sine-Wave Synthesis and its Application to Sinusoidal Transform Coding," *Proc. IEEE Int'l Conf. on Acoust., Speech and Signal Processing*, pp. 370–373, April 1988, but this algorithm departs even farther from the theoretical basis of analysis.

Many techniques for the digital generation of musical sounds have been studied, and many are used in commercially available music synthesizers. In all of these techniques a basic tradeoff is encountered; namely, the conflict between accuracy and generality (defined as the ability to model a wide variety of sounds) on the one hand and computational efficiency on the other. Some techniques, such as frequency modulation (FM) synthesis as described by J. M. Chowning, "The Synthesis of Complex Audio Spectra by Means of Frequency Modulation," *J. Audio Eng. Soc.*, vol. 21, pp. 526–534, September 1973, are computationally efficient and can produce a wide variety of new sounds, but lack the ability to accurately model the sounds of existing musical instruments.

On the other hand, sinusoidal additive synthesis implemented using the DPV is capable of analyzing the sound of a given instrument, synthesizing a perfect replica and performing a wide variety of modifications. However, as previously mentioned, the amount of computation needed to calculate the large number of time-varying sinusoidal components required prohibits real-time synthesis using relatively inexpensive hardware. As in the case of time-frequency speech modeling, the computational problems of additive synthesis of musical tones may be addressed by formulating the DPV in terms of the DSTFT and to implement this formulation using FFT algorithms. Unfortunately, this strategy produces the same type of distortion when applied to musical tone synthesis as to speech synthesis.

There clearly exists a need for better methods and devices for the analysis, synthesis and modification of audio waveforms. In particular, an analysis/synthesis system capable of altering the pitch frequency and articulation rate of speech and music signals and capable of operating with low computational requirements and therefore low hardware cost would satisfy long-felt needs and would contribute significantly to the art.

SUMMARY OF THE INVENTION

The present invention addresses the above described limitations of the prior art and achieves a technical advance by provision of a method and structural embodiment comprising: an analyzer responsive to either speech or musical tone signals which for each of a plurality of overlapping data frames extracts and stores parameters which serve to represent input signals in terms of an overlap-add, quasi-harmonic sinusoidal model, and; a synthesizer responsive to the stored parameter set previously determined by analysis to produce a synthetic facsimile of the analyzed signal or alternately a synthetic audio signal advantageously modified in time-, frequency- or pitch-scale.

In one embodiment of the present invention appropriate for speech signals, the analyzer determines a time-varying gain signal representative of time-varying energy changes in the input signal. This time-varying gain is incorporated in the synthesis model and acts to improve modeling accuracy during transient portions of a signal. Also, given isolated frames of input signal and time-varying gain signal data the analyzer determines sinusoidal model parameters using a frequency-domain analysis-by-synthesis procedure implemented using a Fast Fourier Transform (FFT) algorithm. Advantageously, this analysis procedure overcomes inaccuracies encountered with discrete Fourier transform "peak-picking" analysis as used in the Sine-Wave System, while maintaining a comparable computational load. Furthermore, a novel fundamental frequency estimation algorithm is employed which uses knowledge gained from analysis to improve computational efficiency over prior art methods.

The synthesizer associated with this embodiment advantageously uses a refined modification model, which allows modified synthetic speech to be produced without the objectionable artifacts typically associated with modification using the DSTFT and other prior art methods. In addition, overlap-add synthesis may be implemented using an FFT algorithm, providing improved computational efficiency over prior art methods without departing significantly from the synthesis model used in analysis.

The synthesizer also incorporates an improved phase coherence preservation algorithm which provides higher quality modified speech. Furthermore, the synthesizer performs pitch-scale modification using a phasor interpolation procedure. This procedure eliminates the problems of information loss and noise migration often encountered in prior art methods of pitch modification.

In an embodiment of the present invention appropriate for musical tone signals, a harmonically-constrained analysis-by-synthesis procedure is used to determine appropriate sinusoidal model parameters and a fundamental frequency estimate for each frame of signal data. This procedure allows for fine pitch tracking over the analyzed signal without significantly adding to the computational load of analysis. Due to a priori knowledge of pitch, the synthesizer associated with this embodiment uses a simple functional constraint to maintain phase coherence, significantly reducing the amount of computation required to perform modifications.

BRIEF DESCRIPTION OF THE DRAWINGS

FIG. 17 is a system level block diagram of a speech synthesizer according to the present invention, showing the required signal processing elements and their relationship to the flow of the information signals.

FIGS. 18A and 18B are an illustration of distortion due to extrapolation beyond analysis frame boundaries. The phase coherence of $\tilde{s}^k[n]$ is seen to break down quickly outside the analysis frame due to the quasi-harmonic nature of the model.

FIGS. 22A and 22B are an illustration of virtual excitation sequences in both the unmodified and modified cases, and of the coherence constraint imposed on the sequences at boundary C'.

DETAILED DESCRIPTION

Figure 1:
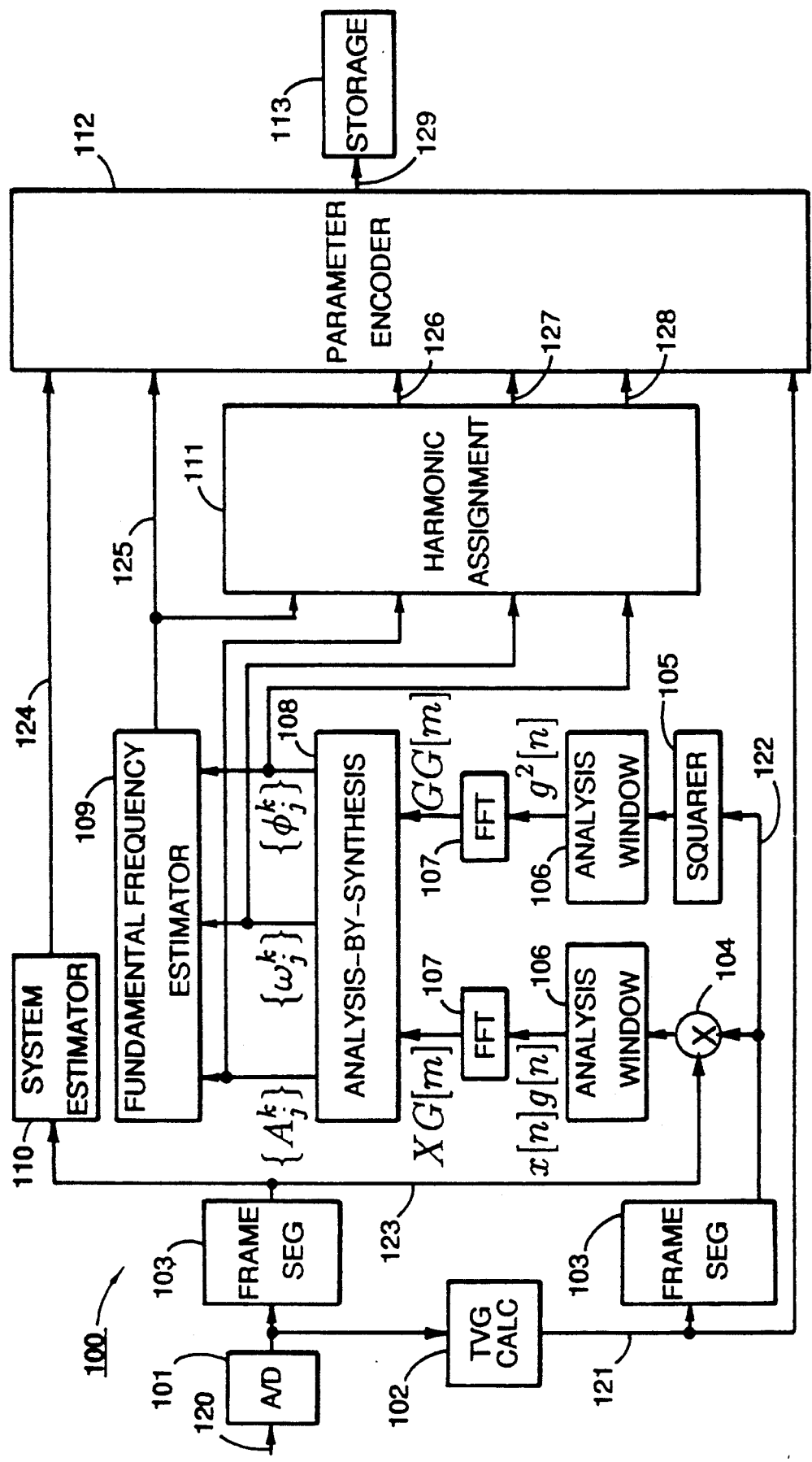
FIG. 1 is a system level block diagram of a speech analyzer according to the present invention showing the required signal processing elements and their relationship to the flow of the information signals.

FIG. 1 illustrates an analyzer embodiment of the present invention appropriate for the analysis of speech signals. Speech analyzer 100 of FIG. 1 responds to an analog speech signal, denoted by $s_c(t)$ and received via path 120, in order to determine the parameters of a signal model representing the input speech and to encode and store these parameters in storage element 113 via path 129. Speech analyzer 100 digitizes and quantizes $s_c(t)$ using analog-to-digital (A/D) converter 101, according to the relation $$s[n] = Q\{s_c(n/F_s)\}, \qquad (1)$$

where $F_s$ is the sampling frequency in samples/sec and $Q\{.\}$ represents the quantization operator of A/D converter 101. It is assumed that $s_c(t)$ is bandlimited to $F_s/2$ Hz.

Figure 2:
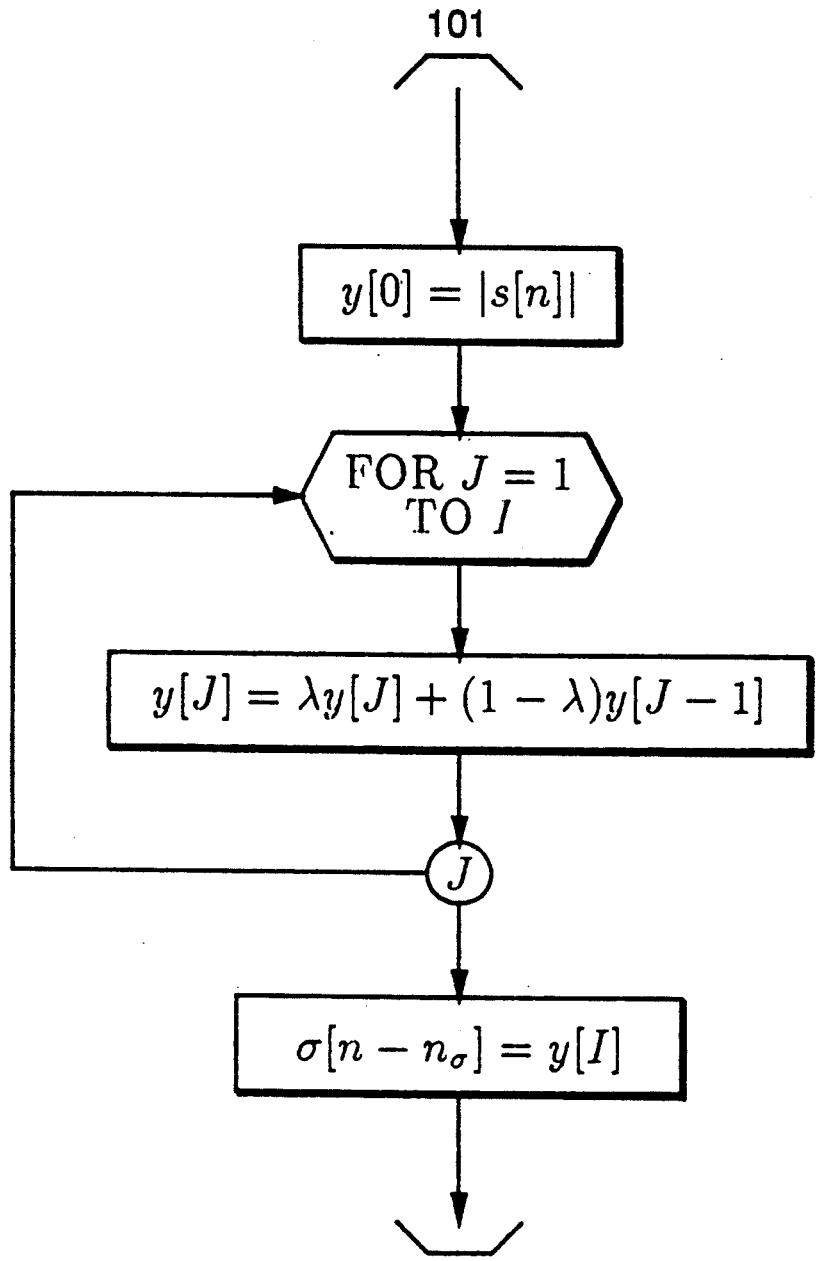
FIG. 2 is a flowchart illustrating the information processing task which takes place in the time-varying calculator block of FIG. 1.

Time-varying gain calculator 102 responds to the data stream produced by A/D converter 101 to produce a sequence $\sigma[n]$ which reflects time-varying changes in the average magnitude of $s[n]$. This sequence may be determined by applying a lowpass digital filter to $|s[n]|$. One such filter is defined by the recursive relation $$y_i[n] = \lambda y_i[n-1] + (1-\lambda) y_{i-1}[n], \quad 1 \leq i \leq I, \qquad (2)$$

where $y_0[n] = |s[n]|$. The time-varying gain sequence is then given by $$\sigma[n] = y_I[n + n_\sigma], \qquad (3)$$

where $n_\sigma$ is the delay in samples introduced by filtering. The frequency response of this filter is given by $$F(e^{j\omega}) = \left( \frac{1 - \lambda}{1 - \lambda e^{-j\omega}} \right)^I, \qquad (4)$$

where the filter parameters $\lambda$ and $I$ determine the frequency selectivity and rolloff of the filter, respectively. For speech analysis, a fixed value of $I=20$ is appropriate, while $\lambda$ is varied as a function of $F_s$ according to $$\lambda = 0.9^{F_s/8000}, \qquad (5)$$

assuring that the filter bandwidth is approximately independent of the sampling frequency. The filter delay $n_\sigma$ can then be determined as $$n_\sigma = \left\langle I \frac{\lambda}{1-\lambda} \right\rangle, \qquad (6)$$

where $\langle . \rangle$ represents the "round to nearest integer" operator. A flowchart of this algorithm is shown in FIG. 2. Time-varying gain calculator 102 transmits $\sigma[n]$ via path 121 to parameter encoder 112 for subsequent transmission to storage element 113.

It should be noted that any components of $s[n]$ with frequencies close to $F_s/2$ will be "aliased" into low-frequency components by the absolute value operator $|.|$, which can cause distortion in $\sigma[n]$. Therefore, it is advisable to apply a lowpass filter to any s[n] known to contain significant high-frequency energy before taking the absolute value. Such a filter need only attenuate frequencies near $F_s/2$, thus it need not be complicated. One example is the simple filter defined by $$s'[n] = 0.25s[n-1] + 0.5s[n] + 0.25s[n+1]. \quad (7)$$

Figure 3:
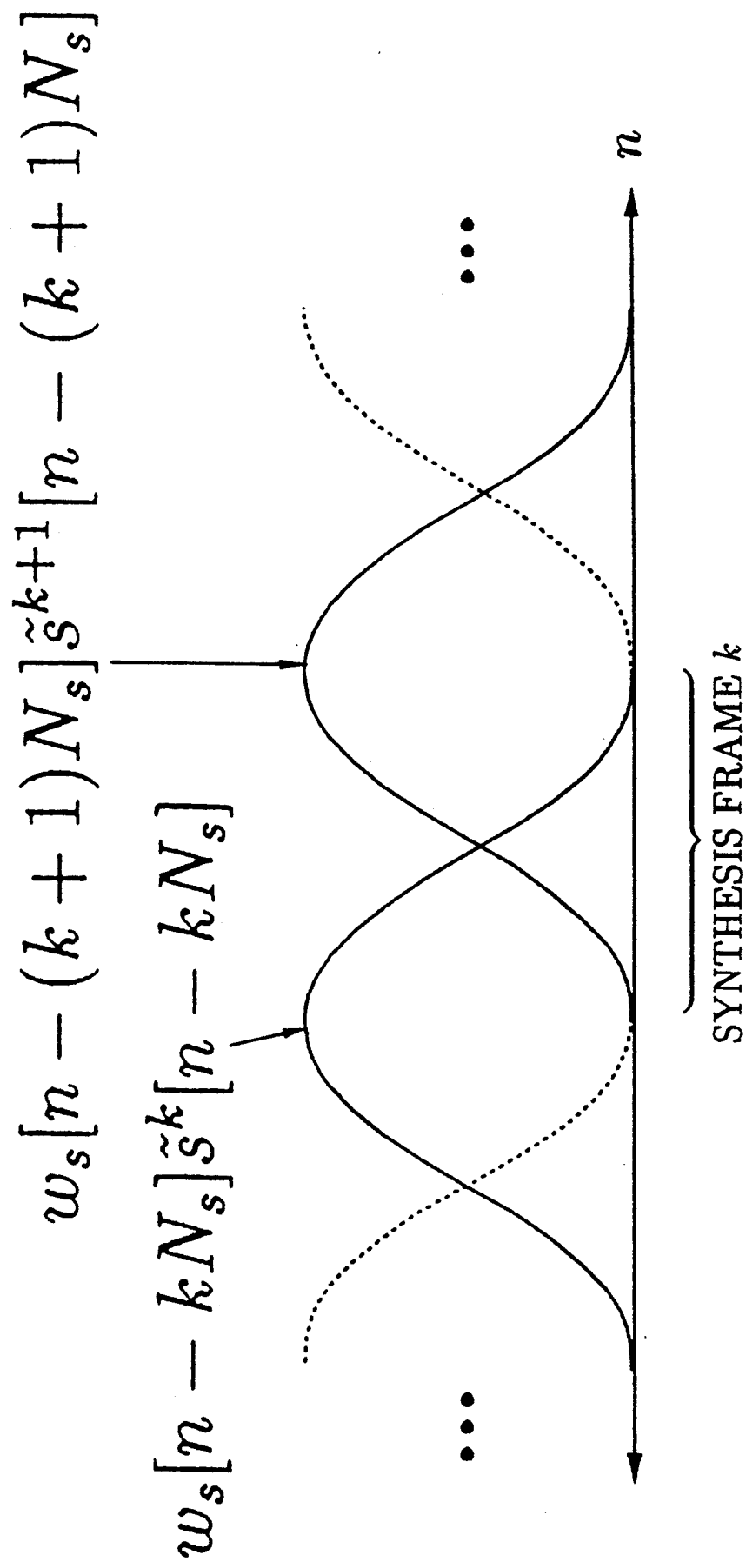
FIG. 3 is an illustration of overlap-add synthesis, showing the relationship of windowed synthetic contributions and their addition to form a synthesis frame of $\tilde{s}[n]$.

Consider now the operation of speech analyzer 100 in greater detail. The signal model used in the invention to represent s[n] is an overlap-add sinusoidal model formulation which produces an approximation to s[n] given by $$\tilde{s}[n] = \sigma[n] \sum_{k=-\infty}^{\infty} w_s[n - kN_s] \tilde{s}^k[n - kN_s], \quad (8)$$

where $\sigma[n]$ controls the time-varying intensity of $\tilde{s}[n]$, $w_s[n]$ is a complementary synthesis window which obeys the constraint $$\sum_{k=-\infty}^{\infty} w_s[n - kN_s] = 1, \quad (9)$$

and $\tilde{s}^k[n]$, the k-th synthetic contribution, is given by $$\tilde{s}^k[n] = \sum_{j=1}^{J[k]} A_j^k \cos(\omega_j^k n + \phi_j^k), \quad (10)$$

where $\omega_j^k = 2\pi f_j^k / F_s$ and where $0 \leq f_j^k \leq F_s/2$. The "synthesis frame length" $N_s$ typically corresponds to between 5 and 20 msec, depending on application requirements. While an arbitrary complementary window function may be used for $\omega_s[n]$, a symmetric, tapered window such as a Hanning window of the form $$w_s[n] = \begin{cases} \cos^2(n\pi/2N_s), & |n| \leq N_s \\ 0, & \text{otherwise} \end{cases} \quad (11)$$

is typically used. With this window, a synthesis frame of $N_s$ samples of $\tilde{s}[n]$ may be written as $$\tilde{s}[n+kN_s] = \sigma[n+kN_s](w_s[n]\tilde{s}^k[n] + w_s[n-N_s]\tilde{s}^{k+1}[n-N_s]), \quad (12)$$

for $0 \leq n < N_s$. FIG. 3 illustrates a synthesis frame and the overlapping synthetic sequences which produce it.

Given $\sigma[n]$, the objective of analysis is to determine amplitudes $\{A_j^k\}$, frequencies $\{\omega_j^k\}$ and phases $\{\phi_j^k\}$ for each $\tilde{s}^k[n]$ in Equation 8 such that $\tilde{s}[n]$ is a "closest approximation" to s[n] in some sense. An approach typically employed to solve problems of this type is to minimize the mean-square error $$E = \sum_{n=-\infty}^{\infty} \{s[n] - \tilde{s}[n]\}^2 \quad (13)$$

in terms of the parameters of $\tilde{s}[n]$. However, attempting to solve this problem simultaneously for all the parameters may not be practical.

Fortunately, if s[n] is approximately stationary over short time intervals, it is feasible to solve for the amplitude, frequency and phase parameters of $\tilde{s}^k[n]$ in isolation by approximating s[n] over an analysis frame of length $2N_a+1$ samples centered at $n=kN_s$. The overlapping frames of speech data and the accompanying frames of envelope data required for analysis are isolated from s[n] and $\sigma[n]$ respectively using frame segmenter blocks 103. The synthetic contribution $\tilde{s}^k[n]$ may then be determined by minimizing $$E^k = \sum_{n=-N_a}^{N_a} w_a[n]\{s[n + kN_s] - \sigma[n + kN_s]\tilde{s}^k[n]\}^2 \quad (14)$$

with respect to the amplitudes, frequencies and phases of $\tilde{s}^k[n]$.

The analysis window $w_a[n]$ may be an arbitrary positive function, but is typically a symmetric, tapered window which serves to force greater accuracy at the frame center, where the contribution of $\tilde{s}^k[n]$ to $\tilde{s}[n]$ is dominant. One example is the Hamming window, given by $$w_a[n] = \begin{cases} .54 + .46\cos(n\pi/N_a), & |n| \leq N_a \\ 0, & \text{otherwise.} \end{cases} \quad (15)$$

The analysis frame length may be a fixed quantity, but it is desirable in certain applications to have this parameter adapt to the expected pitch of a given speaker. For example, as discussed in U.S. Pat. No. 4,885,790, issued to R. J. McAulay et al, the analysis frame length may be set to 2.5 times the expected average pitch period of the speaker to provide adequate frequency resolution. In order to ensure the accuracy of $\tilde{s}[n]$, it is necessary that $N_a \geq N_s$.

Defining x[n] and g[n] by $$x[n] \triangleq (w_a[n])^{\frac{1}{2}} s[n + kN_s]$$

$$g[n] \triangleq (w_a[n])^{\frac{1}{2}} \sigma[n + kN_s], \quad (16)$$

and making use of Equation 10, $E^k$ may be rewritten as $$E = \sum_{n=-N_a}^{N_a} \left( x[n] - \sum_{j=1}^{J} A_j g[n]\cos(\omega_j n + \phi_j) \right)^2, \quad (17)$$

where frame notation has been omitted to simplify the equations. Unfortunately, without a priori knowledge of the frequency parameters, this minimization problem is highly nonlinear and therefore very difficult to solve.

As an alternative, a slightly suboptimal but relatively efficient analysis-by-synthesis algorithm may be employed to determine the parameters of each sinusoid successively. This algorithm operates as follows: Suppose the parameters of $l-1$ sinusoids have been determined previously, yielding the successive approximation to x[n], $$\tilde{x}_{l-1}[n] = g[n] \sum_{j=1}^{l-1} A_j \cos(\omega_j n + \phi_j), \quad (18)$$

and the successive error sequence $$e_{l-1}[n] = x[n] - \tilde{x}_{l-1}[n]. \quad (19)$$

Given the initial conditions $\tilde{x}_0[n] = 0$ and $e_0[n] = x[n]$, these sequences may be updated recursively by $$\tilde{x}_l[n] = \tilde{x}_{l-1}[n] + g[n]A_l\cos(\omega_l n + \Phi_l)$$
$$e_l[n] = e_{l-1}[n] - g[n]A_l\cos(\omega_l n + \Phi_l), \quad (20)$$

for $l \geq 1$. The goal is then to minimize the squared successive error norm $E_l$, given by $$E_l = \sum_{n=-N_a}^{N_a} \{e_l[n]\}^2 = \quad (21)$$

$$\sum_{n=-N_a}^{N_a} \{e_{l-1}[n] - g[n]A_l\cos(\omega_l n + \phi_l)\}^2$$

in terms of $A_l$, $\omega_l$, and $\phi_l$.

At this point it is still not feasible to solve simultaneously for the parameters due to the embedded frequency and phase terms. However, assuming for the moment that $\omega_l$ is fixed and recalling the trigonometric identity $\cos(\alpha + \beta) = \cos\alpha \cos\beta - \sin\alpha \sin\beta$, the expression for $E_l$ becomes $$E_l = \sum_{n=-N_a}^{N_a} \{e_{l-1}[n] - a_l g[n]\cos\omega_l n - b_l g[n]\sin\omega_l n\}^2. \quad (22)$$

In this case the problem is clearly in the form of a linear least-squares approximation which when optimized in terms of $a_l$ and $b_l$ yields "normal equations" of the form $$a_l\gamma_{11} + b_l\gamma_{12} = \psi_1 \quad a_l\gamma_{12} + b_l\gamma_{22} = \psi_2, \quad (23)$$

where $$\gamma_{11} = \sum_{n=-N_a}^{N_a} g^2[n]\cos^2\omega_l n \quad (24)$$

$$\gamma_{12} = \sum_{n=-N_a}^{N_a} g^2[n]\cos\omega_l n \sin\omega_l n$$

$$\gamma_{22} = \sum_{n=-N_a}^{N_a} g^2[n]\sin^2\omega_l n$$

$$\psi_1 = \sum_{n=-N_a}^{N_a} e_{l-1}[n]g[n]\cos\omega_l n$$

$$\psi_2 = \sum_{n=-N_a}^{N_a} e_{l-1}[n]g[n]\sin\omega_l n.$$

Solving for $a_l$ and $b_l$ gives $$a_l = (\gamma_{22}\psi_1 - \gamma_{12}\psi_2)/\Delta$$

$$b_l = (\gamma_{11}\psi_2 - \gamma_{12}\psi_1)/\Delta, \quad (25)$$

where $\Delta = \gamma_{11}\gamma_{22} - \gamma_{12}^2$. By the Principle of Orthogonality, given $a_l$ and $b_l$, $E_l$ can be expressed as $$E_l = E_{l-1} - a_l\psi_1 - b_l\psi_2. \quad (26)$$

Having determined $a_l$ and $b_l$, $A_l$ and $\Phi_l$ are then given by the relations $$A_l = (a_l^2 + b_l^2)^{\frac{1}{2}}$$

$$\Phi_l = -\tan^{-1}(b_l/a_l). \quad (27)$$

This establishes a method for determining the optimal amplitude and phase parameters for a single sinusoidal component of $\tilde{s}^k[n]$ at a given frequency. To determine an appropriate frequency for this sinusoid, an ensemble search procedure may be employed. While a variety of search strategies are possible, the most straightforward is an "exhaustive search." In this procedure, $\omega_l$ is varied over a set of uniformly spaced candidate frequencies given by $\omega_c[i] = 2i\pi/M$ for $0 \leq i \leq M/2$ (assuming that M is an even number). For each $\omega_c[i]$, the corresponding value of $E_l$ is calculated using Equation 26, and $\omega_l$ is chosen as that value of $\omega_c[i]$ which yields the minimum error. $A_l$ and $\phi_l$ are then chosen as the amplitude and phase parameters associated with that frequency value.

In order to guarantee that $\tilde{x}_l[n]$ converges to $x[n]$, it is necessary that $M > 2N_a$; furthermore, in order to guarantee a level of accuracy which is independent of the analysis frame length, M should be proportional to $N_a$, i.e.

$$M = \nu N_a,$$

where $\nu$ is typically greater than six. Finally, to facilitate computation it is often desirable to restrict M to be an integer power of two. For example, given the above conditions a suitable value of M for the case when $N_a = 80$ would be $M = 512$.

Figure 4:
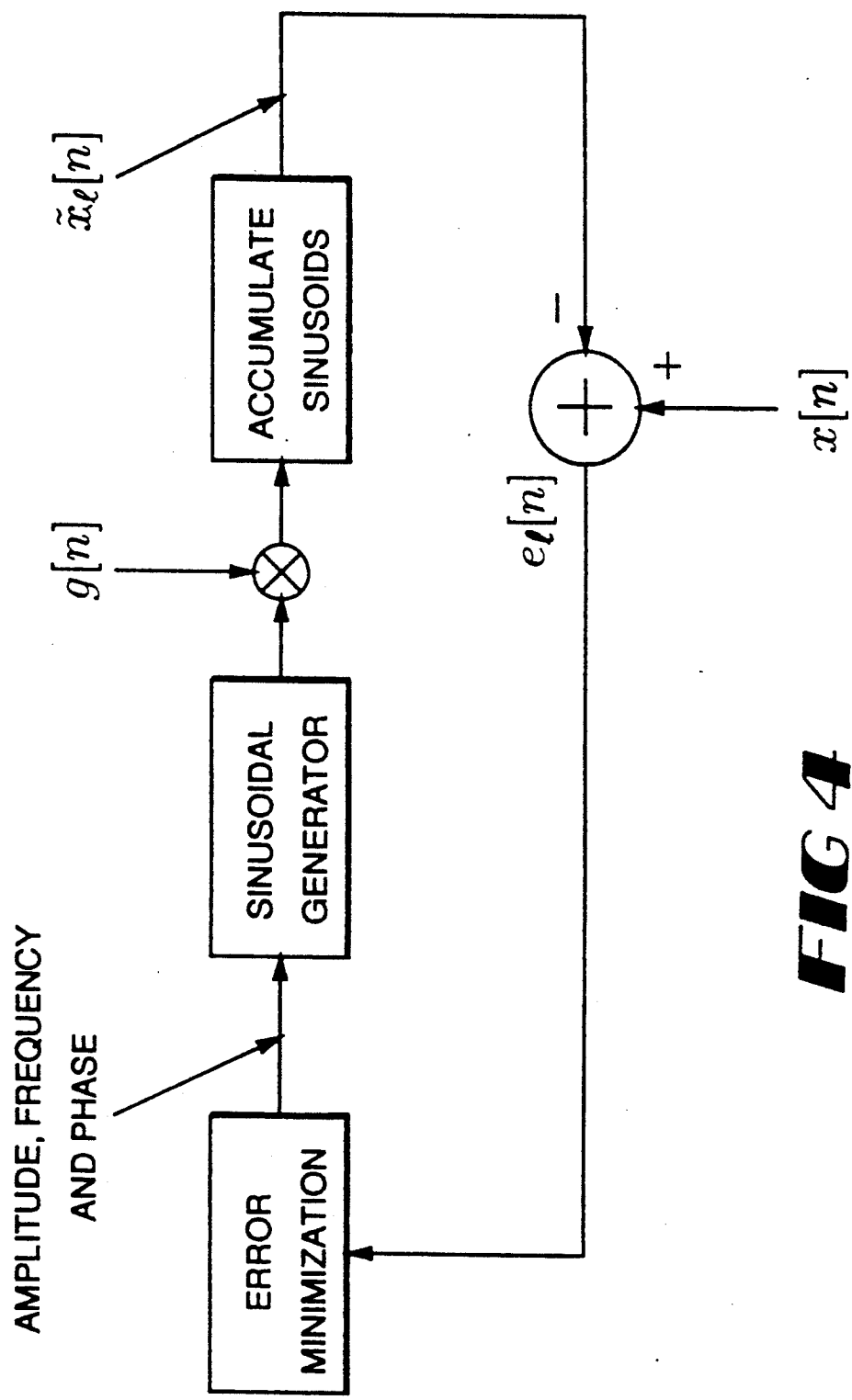
FIG. 4 is a functional block diagram illustrating the closed-loop analysis-by-synthesis procedure used in the invention.

Having determined the parameters of the l-th component, the successive proximation and error sequences are updated by Equation 20, and the procedure is repeated for the next component. The number of components, J[k], may be fixed or may be determined in the analysis procedure according to various "closeness of fit" criteria well known in the art. FIG. 4 shows a functional block diagram of the analysis procedure just described, illustrating its iterative, "closed-loop" structure.

Due to a natural high-frequency attenuation in the vocal tract referred to as "spectral tilt," speech signals often have energy concentrated in the low-frequency range. This phenomenon, combined with the tendency of analysis-by-synthesis to select components in order of decreasing amplitude and with the fact that slight mismatches exist between speech signals and their sinusoidal representations, implies that analysis-by-synthesis tends to first choose high-amplitude components at low frequencies, then smaller sinusoids immediately adjacent in frequency to the more significant components. This "clustering" behavior slows the analysis algorithm by making more iterations necessary to capture perceptually important high-frequency information in speech. Furthermore, low-amplitude components clustered about high-amplitude components are perceptually irrelevant, since they are "masked" by the larger sinusoids. As a result, expending extra analysis effort to determine them is wasteful.

Two approaches have been considered for dealing with the effects of clustering. First, since clustering is caused primarily because high-frequency components in speech have small amplitudes relative to low-frequency components, one solution is to apply a high-pass filter to s[n] before analysis to make high-frequency components comparable in amplitude to low-frequency components. In order to be effective, the high-pass filter should approximately achieve a 6 dB/octave gain, although this is not critical. One simple filter which works well is defined by $$s_p[n] = s[n] - 0.9s[n-1]. \quad (28)$$

Since in this approach the "prefiltered" signal $s_{pf}[n]$ is modeled instead of $s[n]$, the effects of prefiltering must be removed before producing synthetic speech. This may be done either by applying the inverse of the filter given by Equation 28 to $\hat{s}[n]$, or by removing the effects from the model parameters directly, using the formulas $$A_j' = A_j / |G(e^{j\omega_j})|$$

$$\phi_j' = \phi_j - \angle G(e^{j\omega_j}), \quad (29)$$

where $$G(e^{j\omega}) = 1 - 0.9 e^{-j\omega}.$$

A second approach to the problem of clustering is based on the observation that low-amplitude sinusoids tend to cluster around a high-amplitude sinusoid only in the frequency range corresponding to the main lobe bandwidth of $W_a(e^{j\omega})$, the frequency spectrum of $\omega_a[n]$. Thus, given a component with frequency $\omega_l$ determined by analysis-by-synthesis, it may be assumed that no perceptually important components lie in the frequency range $$\omega_l - B_{ml}/2 \leq \omega \leq \omega_l + B_{ml}/2, \quad (30)$$

where $B_{ml}$ is the main lobe bandwidth of $W_a(e^{j\omega})$. The frequency domain characteristics of a number of tapered windows are discussed by A. V. Oppenheim and R. W. Schafer in *Discrete-Time Signal Processing*, Englewood Cliffs, N.J.: Prentice-Hall, 1989, pp. 447–449. Therefore, the proposed analysis-by-synthesis algorithm may be modified such that once a component with frequency $\omega_l$ has been determined, frequencies in the range given by Equation 30 are eliminated from the ensemble search thereafter, which ensures that clustering will not occur.

The amount of computation required to perform analysis-by-synthesis is reduced greatly by recognizing that many of the required calculations may be performed using a Fast Fourier Transform (FFT) algorithm. The M-point discrete Fourier transform (DFT) of an M-point sequence $x[n]$ is defined by $$X[m] \overset{\Delta}{=} \sum_{n=0}^{M-1} x[n] W_M^{mn}, \quad 0 \leq m < M, \quad (31)$$

where $$W_M^{mn} = e^{-j(2\pi/M)mn}, \quad (32)$$

When $x[n]$ is a real-valued sequence the following identities hold:

$$\sum_{n=0}^{M-1} x[n]\cos((2\pi/M)mn) = \Re e\{X[m]\} \quad (33)$$

$$\sum_{n=0}^{M-1} x[n]\sin((2\pi/M)mn) = -\Im m\{X[m]\}.$$

For the purposes of analysis-by-synthesis the M-point DFT's of $e_{l-1}[n]g[n]$ and $g^2[n]$ are written as $$EG_{l-1}[m] = \sum_{n=-N_a}^{N_a} e_{l-1}[n]g[n] W_M^{mn} \quad (34)$$

-continued $$GG[m] = \sum_{n=-N_a}^{N_a} g^2[n] W_M^{mn}.$$

Noting that $W_M^{m(n+M)} = W_M^{mn}$, these DFT's may be cast in the form of Equation 31 (provided that $M > 2N_a$) by adding M to the negative summation index values and zero-padding the unused index values.

Consider now the inner product expressions which must be calculated in the analysis-by-synthesis algorithm. From Equation 24, for the case of $\omega_l = \omega_c[i] = -2i\pi/M$, $\gamma_{11}$ is given by $$\gamma_{11} = \sum_{n=-N_a}^{N_a} g^2[n]\cos^2((2\pi/M)in). \quad (35)$$

Using Equation 33 and recalling that $\cos^2\theta = \frac{1}{2} + \frac{1}{2}\cos 2\theta$, this becomes $$\gamma_{11} = \tfrac{1}{2} GG[0] + \tfrac{1}{2} \Re e\{GG[2i]\}. \quad (36)$$

Similarly, expressions for $\gamma_{12}$ and $\gamma_{22}$ can also be derived:

$$\gamma_{12} = -\tfrac{1}{2} \Im m\{GG[2i]\}$$

$$\gamma_{22} = \tfrac{1}{2} GG[0] - \tfrac{1}{2} \Re e\{GG[2i]\}. \quad (37)$$

The first three parameters may therefore be determined from the stored values of a single DFT which need only be calculated once per analysis frame using an FFT algorithm, provided that M is a highly composite number. Furthermore, if M is an integer power of 2, then the particularly efficient "radix-2" FFT algorithm may be used. A variety of FFT algorithms are described by A. V. Oppenheim and R. W. Schafer in *Discrete-Time Signal Processing*, Englewood Cliffs, N.J.: Prentice-Hall, 1989.

Similar expressions for $\psi_1$ and $\psi_2$ can be derived directly from the DFT identities given above:

$$\psi_1 = \Re e\{EG_{l-1}[i]\} \quad (38)$$

and $$\psi_2 = -\Im m\{EG_{l-1}[i]\}. \quad (39)$$

These parameters may thus be expressed in terms of the stored values of $EG_{l-1}[m]$. However, since $e_{l-1}[n]$ changes for each new component added to the approximation, $EG_{l-1}[m]$ must be computed $J[k]$ times per frame. In order to reduce the amount of computation further, the identities described above may be used to update this DFT sequence.

According to Equation 20, the updated error sequence after the l-th component, $e_l[n]$, is given by $$e_l[n] = e_{l-1}[n] - A_l g[n] \cos(\omega_l n + \phi_l). \quad (40)$$

From this it is clear that the updated DFT $EG_l[m]$ is then $$EG_l[m] = EG_{l-1}[m] - \quad (41)$$

$$A_l \sum_{n=-N_a}^{N_a} g^2[n] \left( \tfrac{1}{2} e^{j(\omega_l n + \phi_l)} + \tfrac{1}{2} e^{-j(\omega_l n + \phi_l)} \right) W_M^{mn}.$$

Figure 5:
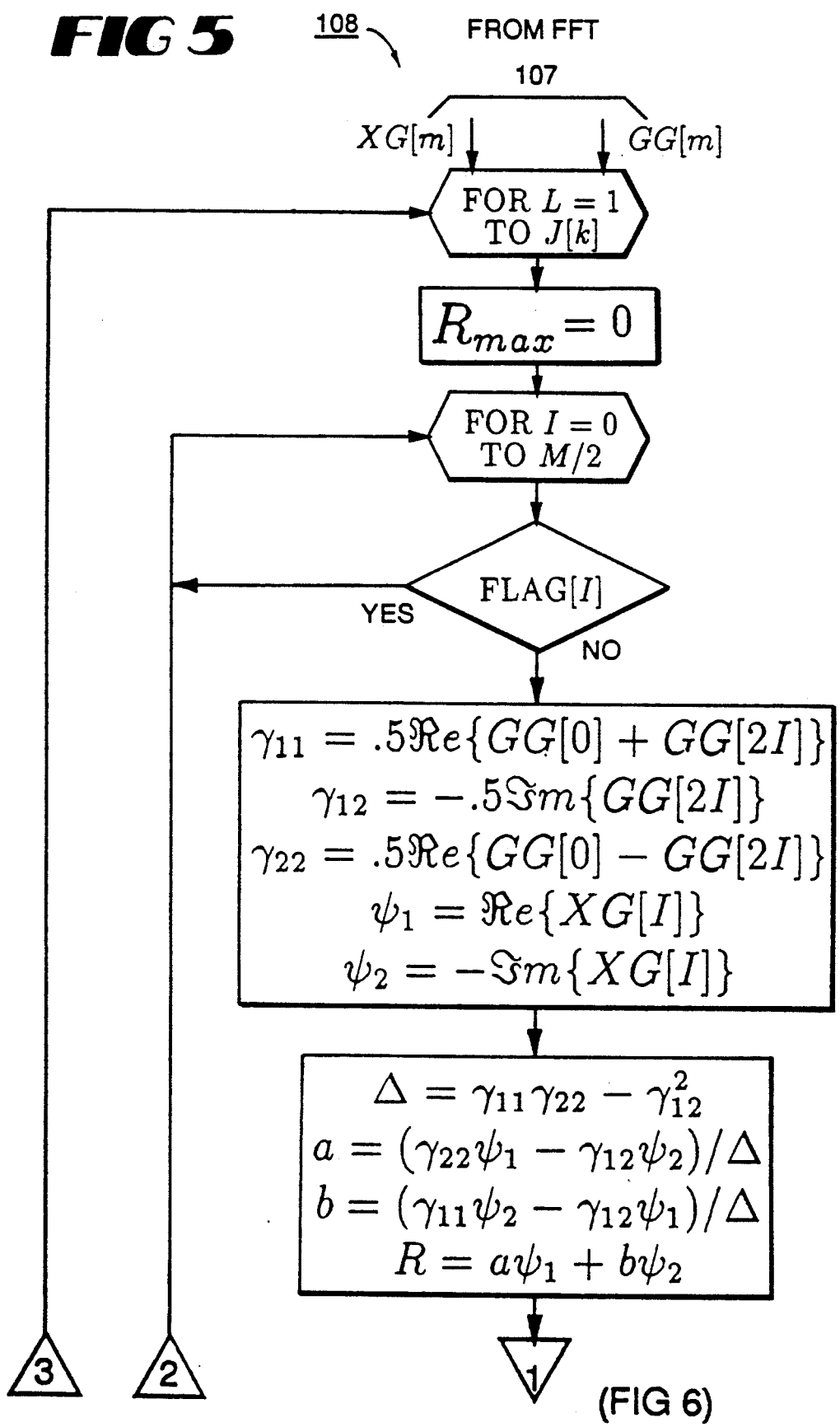
FIGS. 5 and 6 are flowcharts showing the information processing tasks achieved by the analysis-by-synthesis block of FIG. 1.
Figure 6:
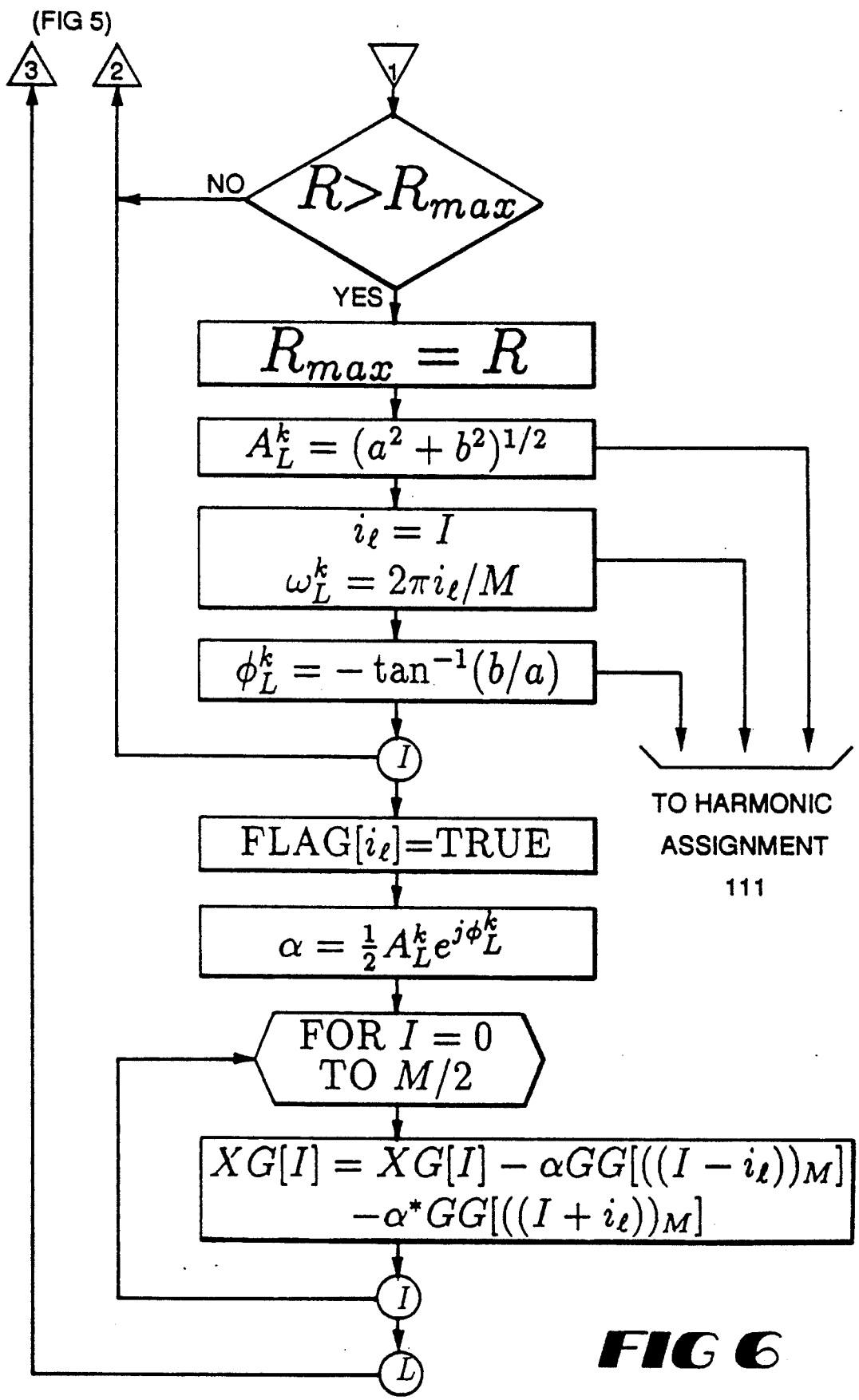

Recalling that $\omega_l = 2\pi i_l/M$, this becomes $$EG_l[m] = EG_{l-1}[m] - \tfrac{1}{2}A_l e^{j\phi_l}GG(((m-i_l))_M) - \tfrac{1}{2}A_l e^{-j\phi_l}GG(((m+i_l))_M), \quad (42)$$

where $((.))_M$ denotes the "modulo M" operator. $EG_l[m]$ can therefore be expressed as a simple linear combination of $EG_{l-1}[m]$ and circularly shifted versions of $GG[m]$; this establishes a fast method of analysis-by-synthesis which operates in the frequency domain. A flowchart of this algorithm is given in FIGS. 5 and 6.

Recalling that $e_0[n] = x[n]$, then according to Equation 34, $$EG_0[m] = XG[m] = \sum_{n=-N_a}^{N_a} x[n]g[n]W_M^{mn}. \quad (43)$$

Substituting the definitions of $x[n]$ and $g[n]$ from Equation 16, $XG[m]$ and $GG[m]$ may be written as $$XG[m] = \sum_{n=-N_a}^{N_a} w_a[n]s[n + kN_s]\sigma[n + kN_s]W_M^{mn} \quad (44)$$

$$GG[m] = \sum_{n=-N_a}^{N_a} w_a[n]\sigma^2[n + kN_s]W_M^{mn};$$

that is, $XG[m]$ and $GG[m]$, the two functions required for fast analysis-by-synthesis, are the zero-padded M-point DFT's of the sequences $x[n]g[n]$ and $g^2[n]$, respectively. This first sequence is the product of the speech data frame and the envelope data frame multiplied by the analysis window function $w_a[n]$; likewise, $g^2[n]$ is simply the square of the envelope data frame multiplied by $w_a[n]$.

Referring to FIG. 1, multiplier block 104 responds to a frame of speech data received via path 123 and a frame of envelope data received via path 122 to produce the product of the data frames. Analysis window block 106 multiplies the output of multiplier block 104 by the analysis window function $w_a[n]$, producing the sequence $x[n]g[n]$ described above. Squarer block 105 responds to a frame of envelope data to produce the square of the data frame; the resulting output is input to a second analysis window block to produce the sequence $g^2[n]$. At this point $x[n]g[n]$ and $g^2[n]$ are input to parallel Fast Fourier Transform blocks 107, which yield the M-point DFT's $XG[m]$ and $GG[m]$, respectively. Analysis-by-synthesis block 108 responds to the input DFT's $XG[m]$ and $GG[m]$ to produce sinusoidal model parameters which approximate the speech data frame, using the fast analysis-by-synthesis algorithm discussed above. The resulting parameters are the amplitudes $\{A_j^k\}$, frequencies $\{\omega_j^k\}$ and phases $\{\phi_j^k\}$ which produce $\tilde{s}^k[n]$, as shown in Equation 10.

System estimator 110 responds to a frame of speech data transmitted via path 123 to produce coefficients representative of $H(e^{j\omega})$, an estimate of the frequency response of the human vocal tract. Algorithms to determine these coefficients include linear predictive analysis, as discussed in U.S. Pat. No. 3,740,476, issued to B. S. Atal, and homomorphic analysis, as discussed in U.S. Pat. No. 4,885,790, issued to R. J. McAulay et al. System estimator 110 then transmits said coefficients via path 124 to parameter encoder 112 for subsequent transmission to storage element 113.

In order to perform speech modifications using a sinusoidal model it is necessary for the frequency parameters associated with a given speech data frame to reflect the pitch information embedded in the frame. To this end, $\tilde{s}^k[n]$ may be written in quasi-harmonic form:

$$\tilde{s}^k[n] = \sum_{j=0}^{J[k]} A_j^k \cos((j\omega_o^k + \Delta_j^k)n + \phi_j^k), \quad (45)$$

where $\omega_j^k = j\omega_o^k + \Delta_j^k$, and where $J[k]$ is now the greatest integer such that $J[k]\omega_o^k \leq \pi$. Note that only one component is associated with each harmonic number j. With this formulation, the fundamental frequency $w_o^k = 2\pi f_o^k/F_s$, must now be determined.

Fundamental frequency estimator 109 responds to the analyzed model parameter set from analysis-by-synthesis block 108 and to vocal tract frequency response coefficients received via path 124 to produce an estimate of the fundamental frequency $w_o^k$ of Equation 45. While many approaches to fundamental frequency estimation may be employed, a novel algorithm which makes use of the analyzed sinusoidal model parameters in a fashion similar to the algorithm disclosed by McAulay and Quatieri in "Pitch Estimation and Voicing Detection Based on a Sinusoidal Speech Model," *Proc. IEEE Int'l Conf. on Acoust., Speech and Signal Processing*, pp. 249–252, April 1990, is described here: If $\omega_o^k$ is defined as that value of $\omega$ which minimizes the error induced by quantizing the frequency parameters to harmonic values, $$E(\omega) = \quad (46)$$

$$\sum_{n=-N_a}^{N_a} \left\{ \sum_{j=0}^{J[k]} A_j^k [\cos(\omega_j^k n + \phi_j^k) - \cos(j\omega n + \phi_j^k)] \right\}^2,$$

then $\omega_o^k$ is approximately equal to $$\omega_o^k = \frac{\sum_{i=0}^{J[k]} (iA_i^k)^2 \omega_i^k/i}{\sum_{i=0}^{J[k]} (iA_i^k)^2}, \quad (47)$$

assuming that $N_a$ is on the order of a pitch period or larger. This estimate is simply the average of $\{\omega_i^k/i\}$ weighted by $(iA_i^k)^2$.

Again suppressing frame notation, given an initial fundamental frequency estimate $\omega_o' = 2\pi f_o'/F_s$, it is possible to arrange a subset of the analyzed sinusoidal model parameters in the quasi-harmonic form of Equation 45 and to update the fundamental frequency estimate recursively. This is accomplished by passing through the frequency parameters in order of decreasing amplitude and calculating each frequency's harmonic number, defined as $<\omega_j/\omega_o>$. If this equals the harmonic number of any previous component, the component is assigned to the set of parameters which are excluded from the quasi-harmonic representation; otherwise, the component is included in the quasi-harmonic set, and its parameters are used to update $\omega_o$ according to Equation 47. Any harmonic numbers left unassigned are associated with zero-amplitude sinusoids at appropriate multiples of the final value of $\omega_o$.

In the case of speech signals, the above algorithm must be refined, since a reliable initial estimate is usually not available. The following procedure is used to define and choose from a set of candidate fundamental frequency estimates: Since, in conditions of low-energy, wideband interference, high-amplitude components correspond to signal components, it may be assumed that the frequency $\hat{f}$ of the highest amplitude component whose frequency is in the range from 100 to 1000 Hz is approximately some multiple of the actual pitch frequency, i.e. $f_o \approx \hat{f}/i$ for some i.

In order to determine an appropriate value of i, a set of values of i are determined such that $\hat{f}/i$ falls in the range from 40 to 400 Hz, the typical pitch frequency range for human speech. For each i in this set the recursive fundamental frequency estimation algorithm is performed as described above, using an initial frequency estimate of $\omega_o'[i] = 2\pi f_o'[i]/F_s$, where $f_o'[i] = \hat{f}/i$. Given the resulting refined estimate, a measure of the error power induced over the speech data frame by fixing the quasi-harmonic frequencies to harmonic values may be derived, yielding $$P_f = \frac{N_a^2}{6} \left( \sum_{j=0}^{J} (A_j \omega_j)^2 - \omega_o[i] \sum_{j=0}^{J} A_j^2 j \omega_j \right). \quad (48)$$

Due to the inherent ambiguity of fundamental frequency estimates, a second error measure is necessary to accurately resolve which candidate is most appropriate. This second quantity is a measure of the error power induced by independently organizing the parameters in quasi-harmonic form and quantizing the amplitude parameters to an optimal constant multiple of the vocal tract spectral magnitude at the component frequencies, given by $$P_a = P_e + \frac{1}{2} \left( \sum_{j=0}^{J} A_j^2 - \frac{\mathcal{N}_a^2}{\mathcal{D}_a} \right), \quad (49)$$

where $P_e$ is the power of the parameter set $\mathcal{E}$ excluded from the quasi-harmonic representation, $$P_e = \frac{1}{2} \sum_{A_j \in \mathcal{E}} A_j^2, \quad (50)$$

and where $$\mathcal{N}_a = \sum_{l=0}^{J} A_l |H(e^{j\omega_l})|, \quad (51)$$

$$\mathcal{D}_a = \sum_{l=0}^{J} |H(e^{j\omega_l})|^2. \quad (52)$$

Figure 7:
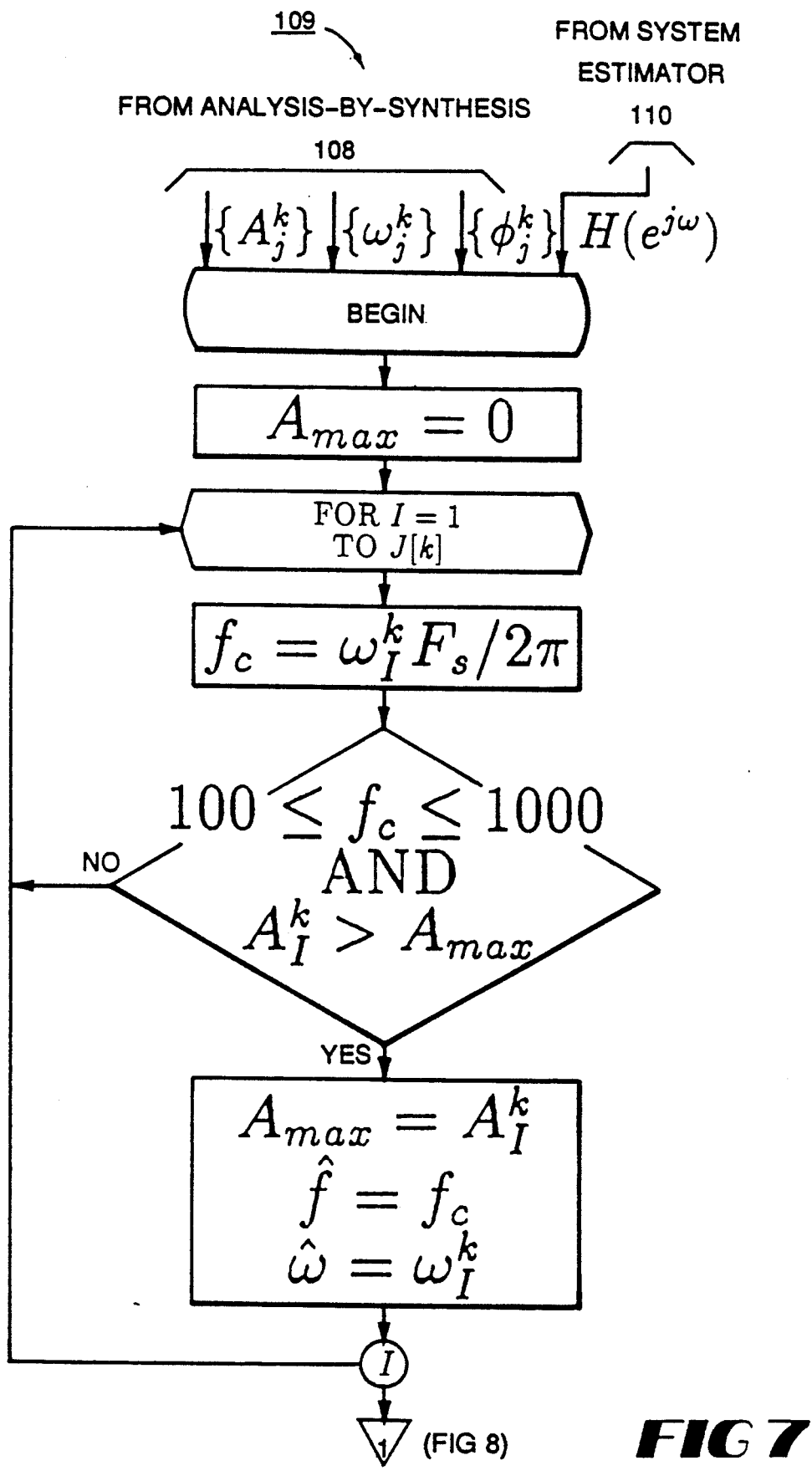
FIGS. 7-9 are flowcharts showing the information processing tasks achieved by the fundamental frequency estimator block of FIG. 1.
Figure 8:
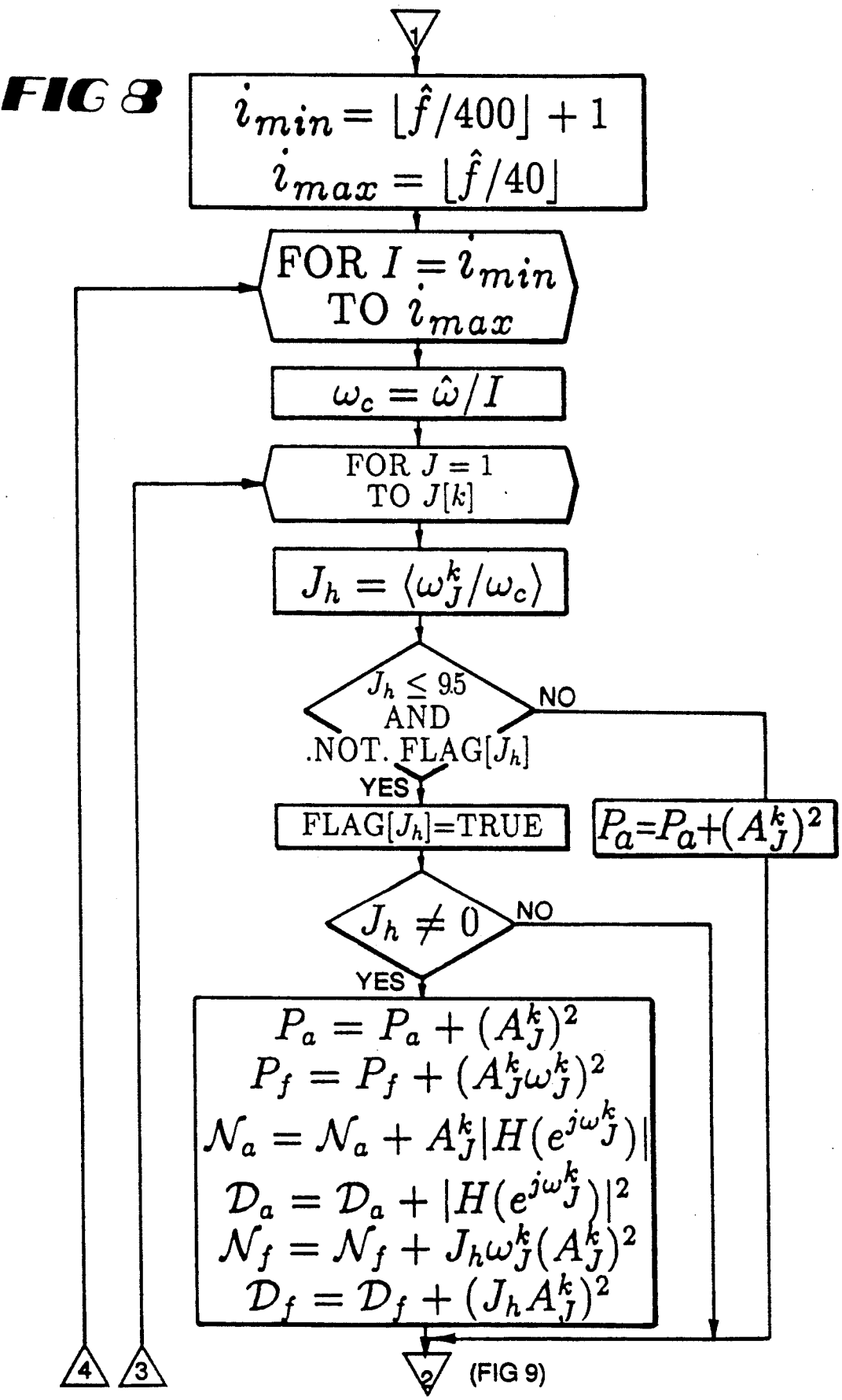
Figure 9:
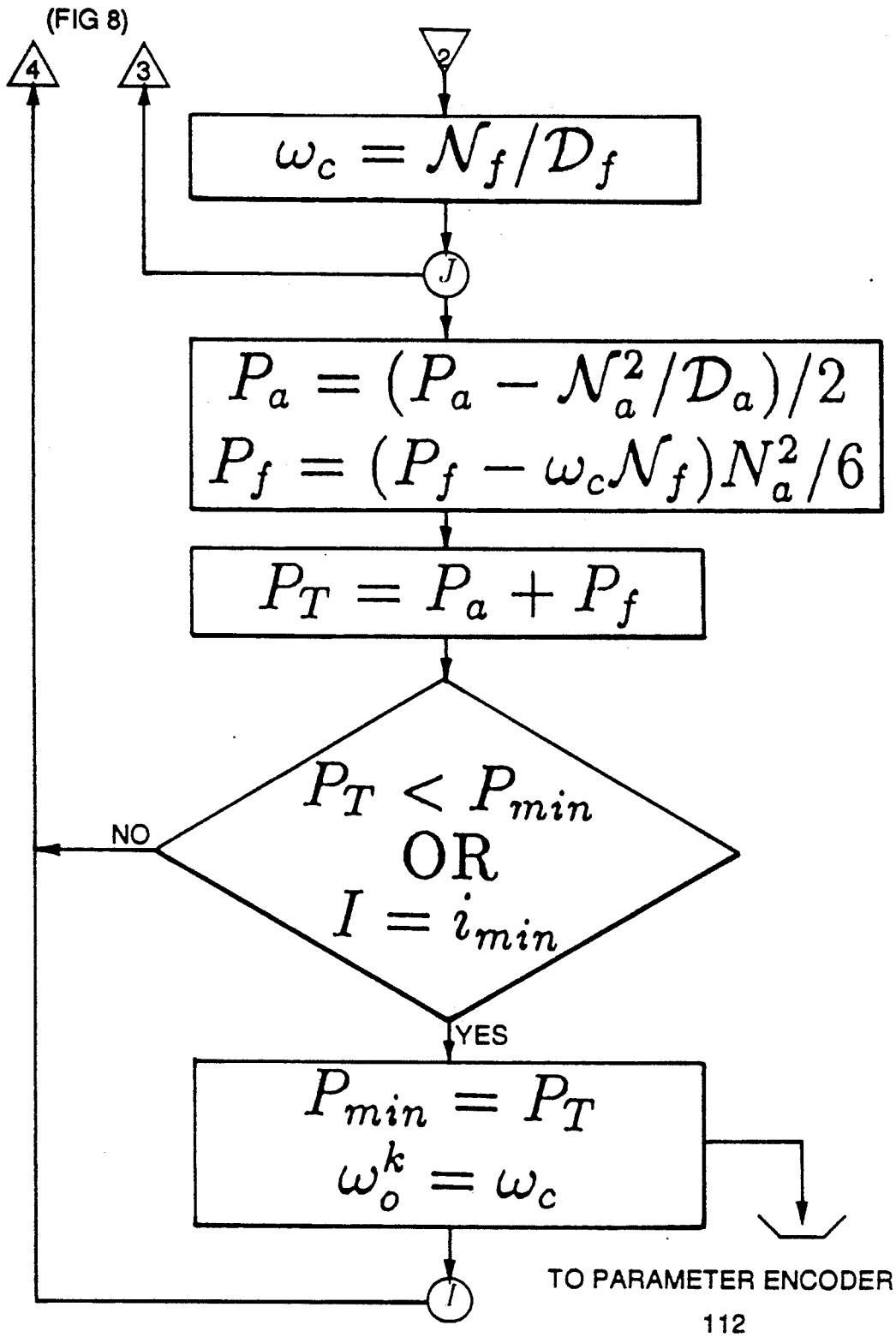

At this point a composite error function $P_T[i]$ is constructed as $P_T[i] = P_f + P_a$, and the refined estimate $\omega_o[i]$ corresponding to the minimum value of $P_T[i]$ is chosen as the final estimate $\omega_o$. This algorithm is illustrated in flowchart form by FIGS. 7 through 9. In the case where interference is sufficiently strong or narrowband that the analyzed component at frequency $\hat{f}$ cannot be assumed to be a signal component, then the algorithm described above may still be employed, using a predefined set of candidate frequencies which are independent of the analyzed parameters. Fundamental frequency estimator 109 then transmits $\omega_o$ via path 125 to parameter encoder 112 for subsequent transmission to storage element 113.

Figure 10:
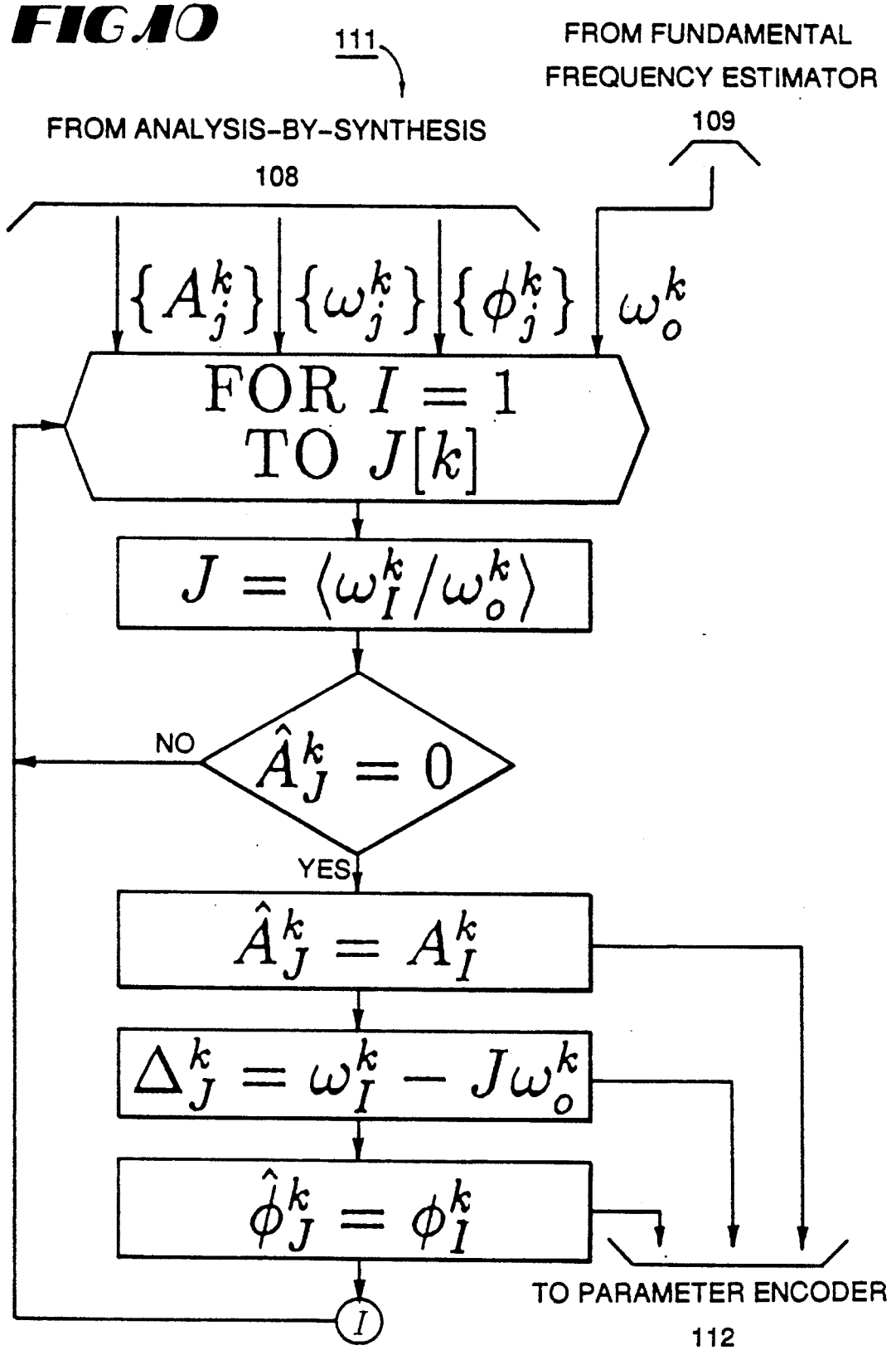
FIG. 10 is a flowchart showing the information processing tasks achieved by the harmonic assignment block of FIG. 1.

Harmonic assignment block 111 responds to the fundamental frequency estimate $\omega_o$ and the model parameters determined by analysis-by-synthesis to produce a quasi-harmonic parameter set as in Equation 45. This is accomplished by assigning each successive component a harmonic number given by $<\omega_j/\omega_o>$ in order of decreasing amplitude, refraining from assigning components whose harmonic numbers conflict with those of previously assigned components. The resulting parameter set thus includes as many high-amplitude components as possible in the quasi-harmonic parameter set. The harmonic assignment algorithm is illustrated in flowchart form by FIG. 10. Harmonic assignment block 111 then transmits the quasi-harmonic model amplitudes $\{A_j^k\}$, differential frequencies $\{\Delta_j^k\}$ and phases $\{\phi_j^k\}$ via paths 126, 127 and 128 respectively, to parameter encoder 112 for subsequent transmission to storage element 113.

Figure 11:
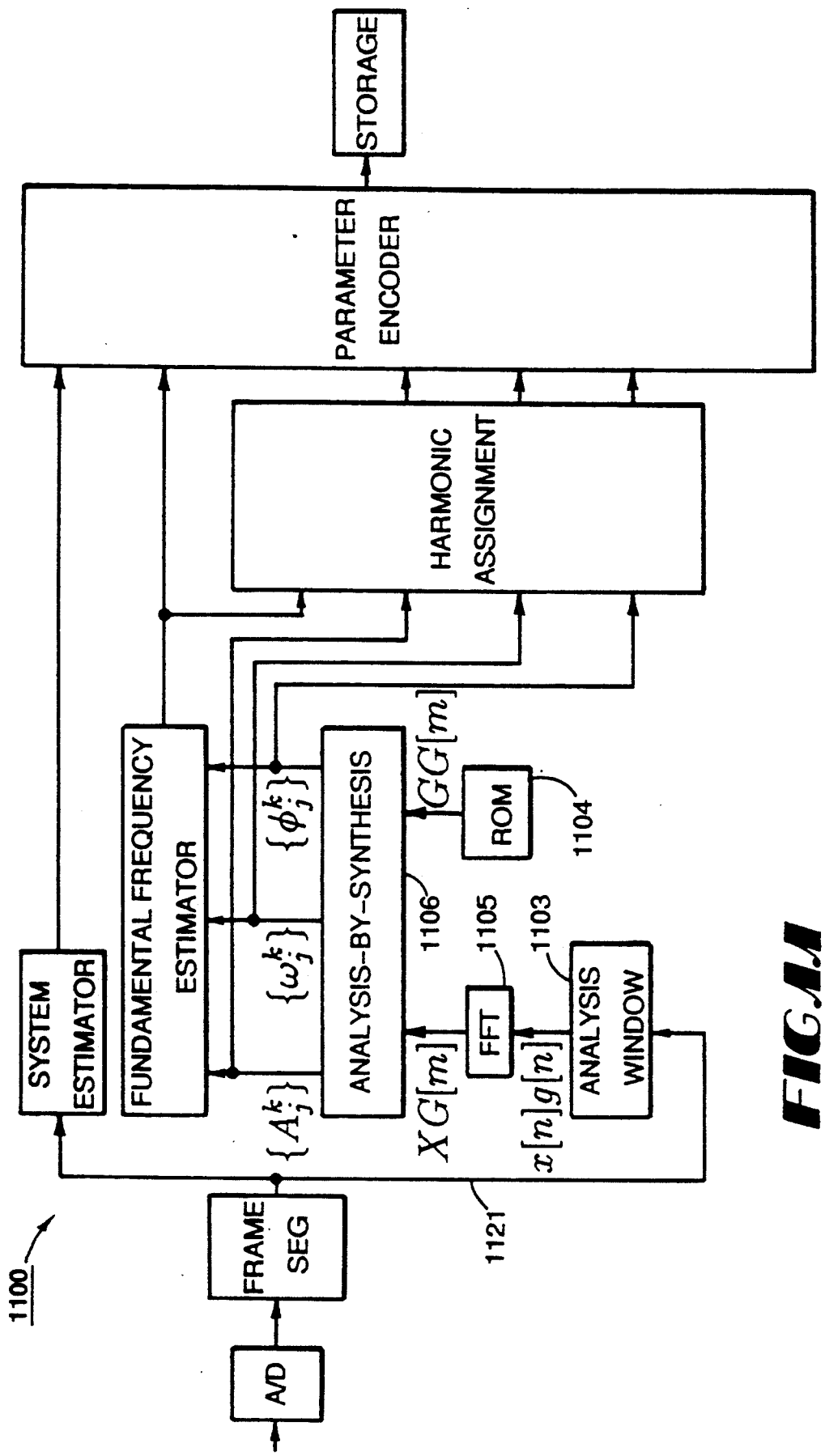
FIG. 11 is a system level block diagram of a speech analyzer according to the present invention similar in operation to the speech analyzer of FIG. 1 but which operates without incorporating time-varying gain sequence $\sigma[n]$.

While the time-varying gain sequence $\sigma[n]$ acts to increase model accuracy during transition regions of speech signals and improves the performance of analysis in these regions, it is not absolutely required for the model to function, and the additional computation required to estimate $\sigma[n]$ may outweigh the performance improvements for certain applications. Therefore, a second version of a speech analyzer which operates without said time-varying gain (equivalent to assuming that $\sigma[n] = 1$) is illustrated in FIG. 11.

Speech analyzer 1100 operates identically to speech analyzer 100 with the following exceptions: The signal path dedicated to calculating, transmitting and framing $\sigma[n]$ is eliminated, along with the functional blocks associated therewith. A second difference is seen by considering the formulas giving DFT's XG[m] and GG[m] in Equation 44 for the case when $\sigma[n] = 1$;

$$XG[m] = \sum_{n=-N_a}^{N_a} w_a[n]s[n + kN_s]W_M^{mn} \quad (53)$$

$$GG[m] = \sum_{n=-N_a}^{N_a} w_a[n]W_M^{mn}.$$

That is, XG[m] is now the DFT of the speech data frame multiplied by the analysis window, and GG[m] is simply the DFT of the analysis window function, which may be calculated once and used as a fixed function thereafter.

Analysis window block 1103 responds to a frame of speech data received via path 1121 to multiply said data frame by the analysis window function $\omega_a[n]$ to produce the sequence $x[n]g[n]$. Fast Fourier Transform block 1105 responds $x[n]g[n]$ to produce the M-point DFT XG[m] defined above. Read-only memory block 1104 serves to store the precalculated DFT GG[m] defined above and to provide this DFT to analysis-by-synthesis block 1106 as needed. All other algorithmic components of speech analyzer 1100 and their structural relationships are identical to those of speech analyzer 100.

Figure 12:
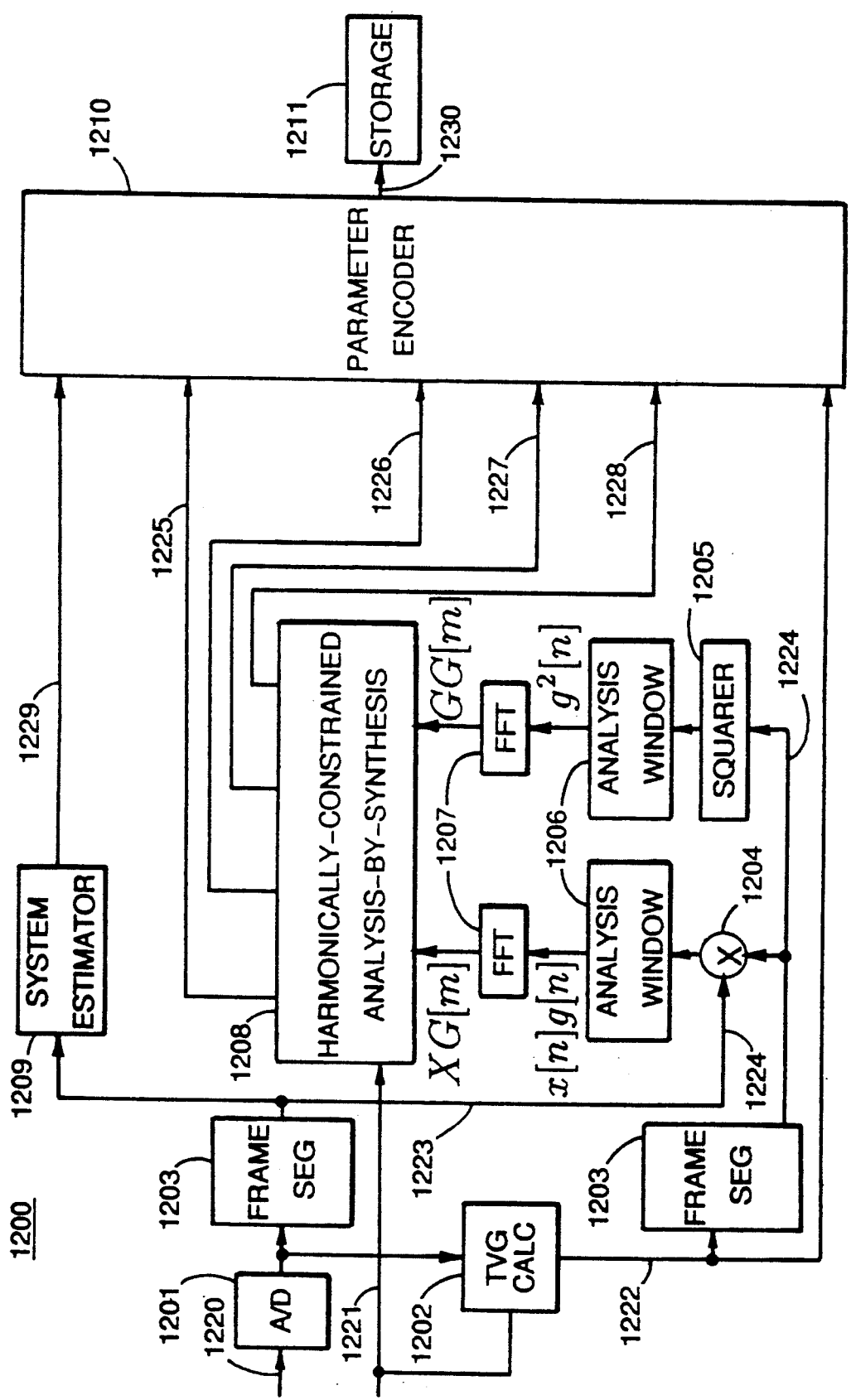
FIG. 12 is a system level block diagram of a musical tone analyzer according to the present invention showing the required signal processing elements and their relationship to the flow of the information signals.

FIG. 12 illustrates an analyzer embodiment of the present invention appropriate for the analysis of pitched musical tone signals. Musical tone analyzer 1200 of FIG. 12 responds to analog musical tone signals in order to determine sinusoidal model parameters in a fashion similar to speech analyzer 100. Musical tone analyzer 1200 digitizes and quantizes analog musical signals received via path 1220 using A/D converter 1201 in the same manner as A/D converter 101.

Time-varying gain calculator 1202 responds to the data scream produced A/D converter 1201 to produce an envelope sequence $\sigma[n]$ described in speech analyzer 100. The same filtering operation of Equation 2 is used; however, the filter parameters $\lambda$ and $n_\sigma$ are varied as a function of the nominal expected pitch frequency of the tone, $\omega_o'$, received via path 1221 according to the relation $$\lambda(\omega_o') = \xi - \sqrt{\xi^2 - 1}, \tag{54}$$

where $\xi = 2 - \cos \omega_o'$, and $n_\sigma$ is calculated using Equation 6. The purpose of this variation is to adjust the filter's selectivity to the expected pitch in order to optimize performance. Time-varying gain calculator 1202 transmits $\sigma[n]$ via path 1222 to parameter encoder 1210 for subsequent transmission to storage element 1211.

Overlapping frames of musical signal data and the accompanying frames of envelope data required for analysis are isolated from $s[n]$ and $\sigma[n]$ respectively using frame segmenter blocks 1203 in the same manner as in speech analyzer 100. Multiplier block 1204 responds to a musical signal data frame received via path 1223 and an envelope data frame received via path 1224 to produce the product of the data frames. Analysis window block 1206 multiplies the output of multiplier block 1204 by the analysis window function described in speech analyzer 100, producing the product of the sequences $x[n]$ and $g[n]$ defined by Equation 16. Squarer block 1205 responds to a frame of envelope data to produce the square of the envelope data frame; the resulting output is input to a second analysis window block to produce the sequence $g^2[n]$. At this point $x[n]g[n]$ and $g^2[n]$ are input to parallel Fast Fourier Transform blocks 1207, which yield the M-point DFT's $XG[m]$ and $GG[m]$ defined in Equation 44, respectively.

Figure 13:
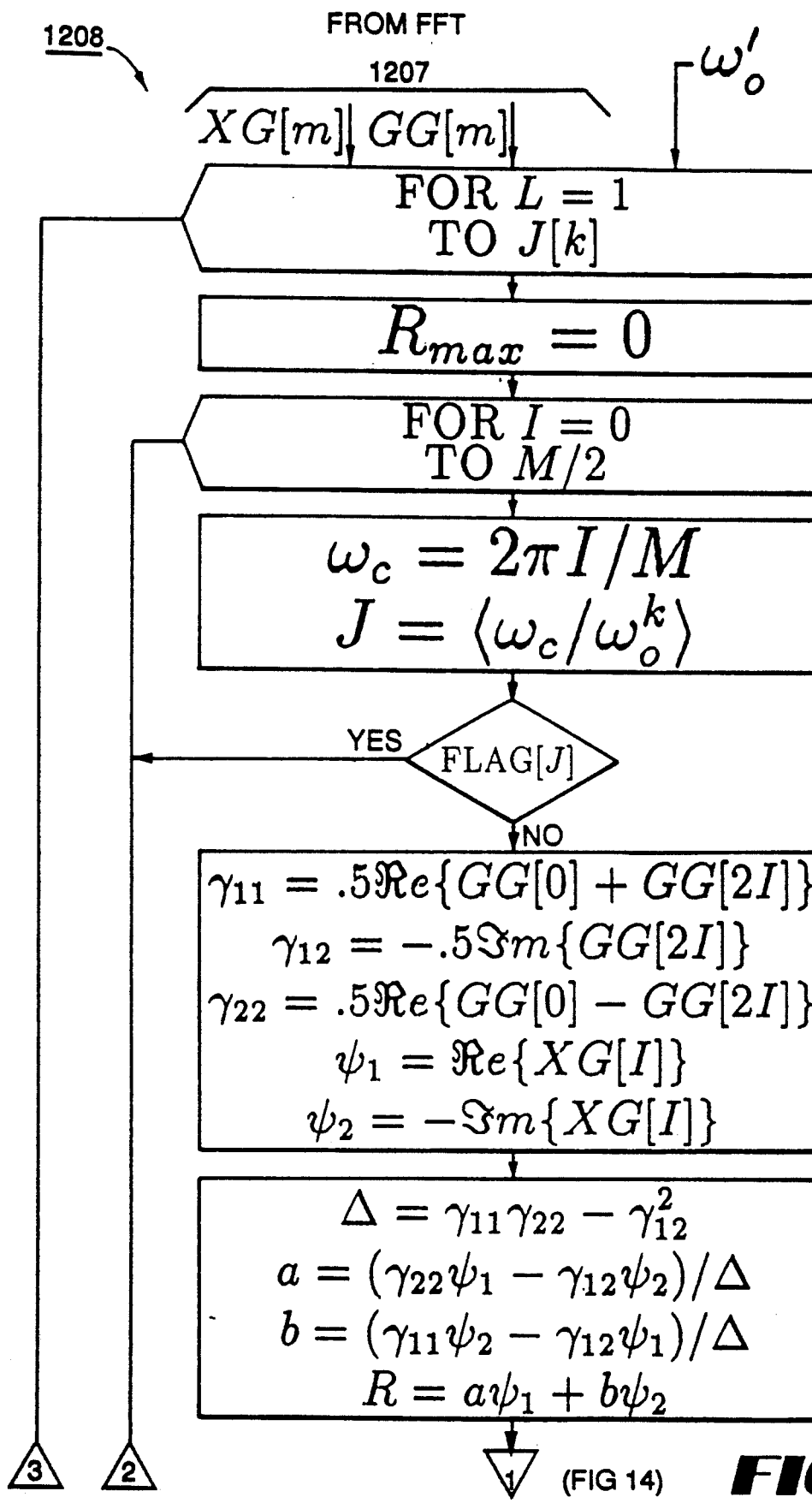
FIGS. 13-15 are flowcharts showing the information processing tasks achieved by the harmonically-constrained analysis-by-synthesis block of FIG. 12.
Figure 14:
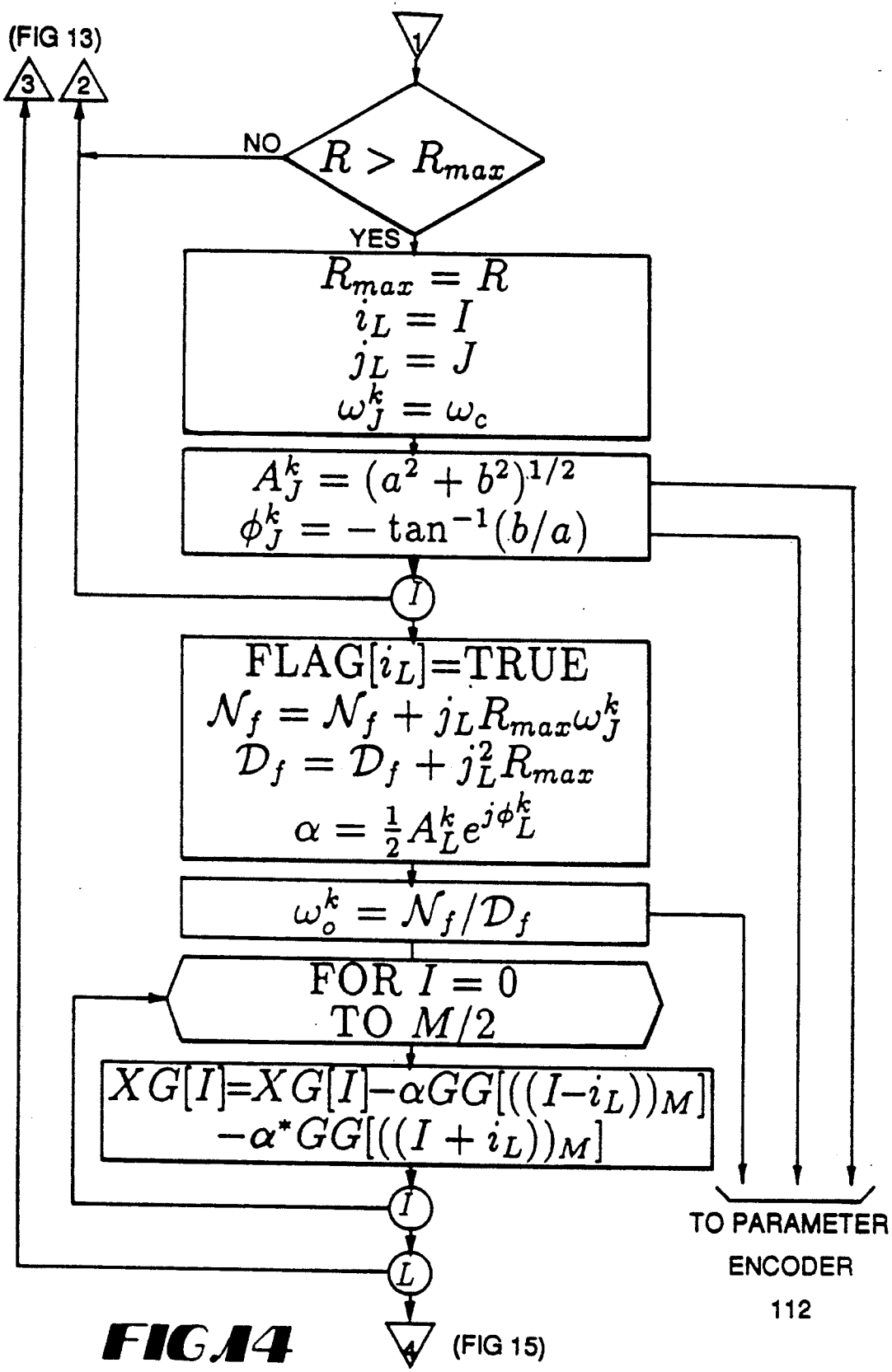
Figure 15:
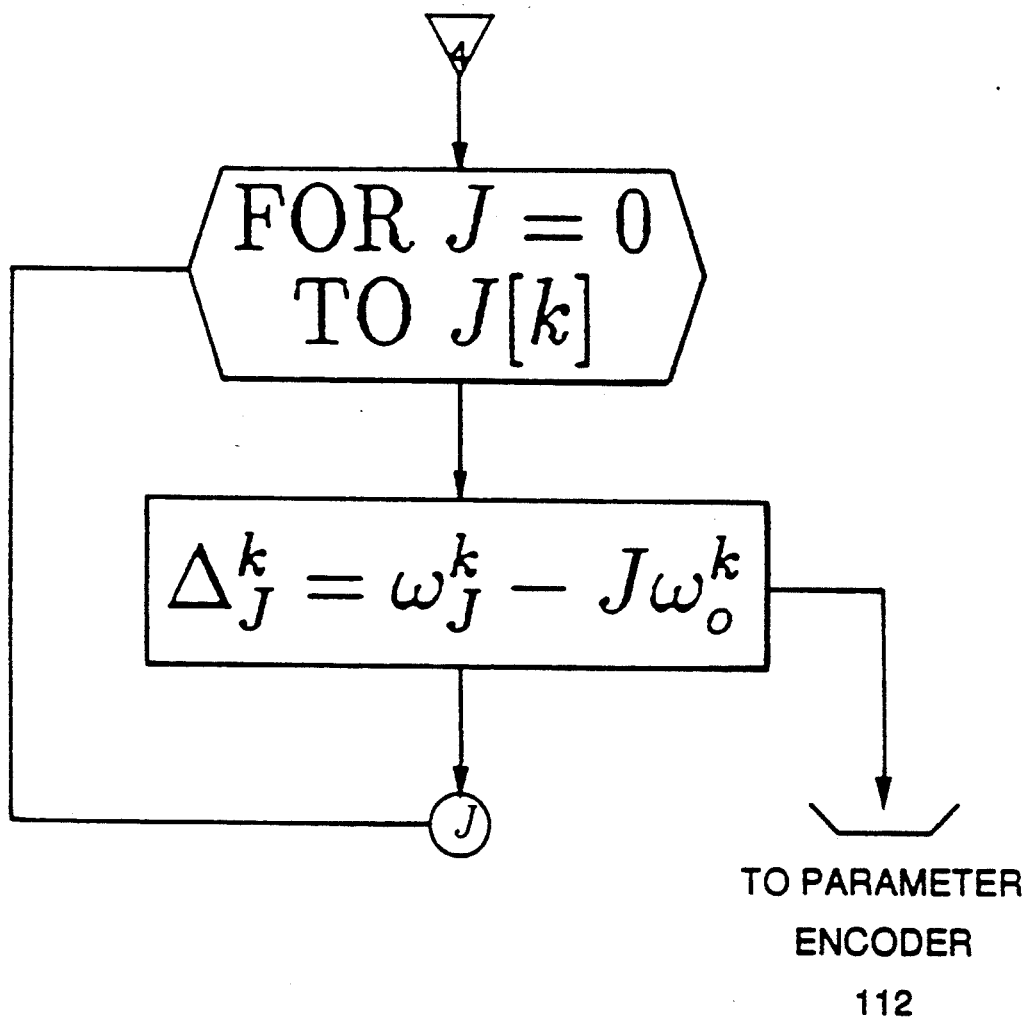

Harmonically-constrained analysis-by-synthesis block 1208 responds to the input DFT's $XG[m]$ and $GG[m]$ and to $\omega_o'$ to produce sinusoidal model parameters which approximate the musical signal data frame. These parameters produce $\hat{s}^k[n]$ using the quasi-harmonic representation shown in Equation 45. The analysis algorithm used is identical to the fast analysis-by-synthesis algorithm discussed in the description of speech analyzer 100, with the following exception: Since an unambiguous initial fundamental frequency estimate is available, as each candidate frequency $\omega_c[i]$ is tested to determine the l-th component of $\tilde{x}[n]$, its harmonic number is calculated as $<\omega_c[i]/\omega_o^k>$. If this equals the harmonic number of any of the previous $l-1$ components, the candidate is disqualified, ensuring that only one component is associated with each harmonic number. As each new component is determined, the estimate of $\omega_o^k$ is updated according to Equation 47. This algorithm is illustrated in flowchart form by FIGS. 13 through 15.

Harmonically-constrained analysis-by-synthesis block 1208 then transmits the fundamental frequency estimate $\omega_o^k$ and the quasi-harmonic model amplitudes $\{A_l^k\}$ differential frequencies $\{\Delta_l^k\}$ and phases $\{\phi_l^k\}$ via paths 1225, 1226, 1227 and 1228 respectively, to parameter encoder 1210 for subsequent transmission to storage clement 1211. System estimator 1209 responds to a musical signal data frame transmitted via path 1223 to produce coefficients representative of $H(e^{j\omega})$, an estimate of the spectral envelope of the quasi-harmonic sinusoidal model parameters. The algorithms which may be used to determine these coefficients are the same as those used in system estimator 110. System estimator 1209 then transmits said coefficients via path 1229 to parameter encoder 1210 for subsequent transmission to storage clement 1211.

Figure 16:
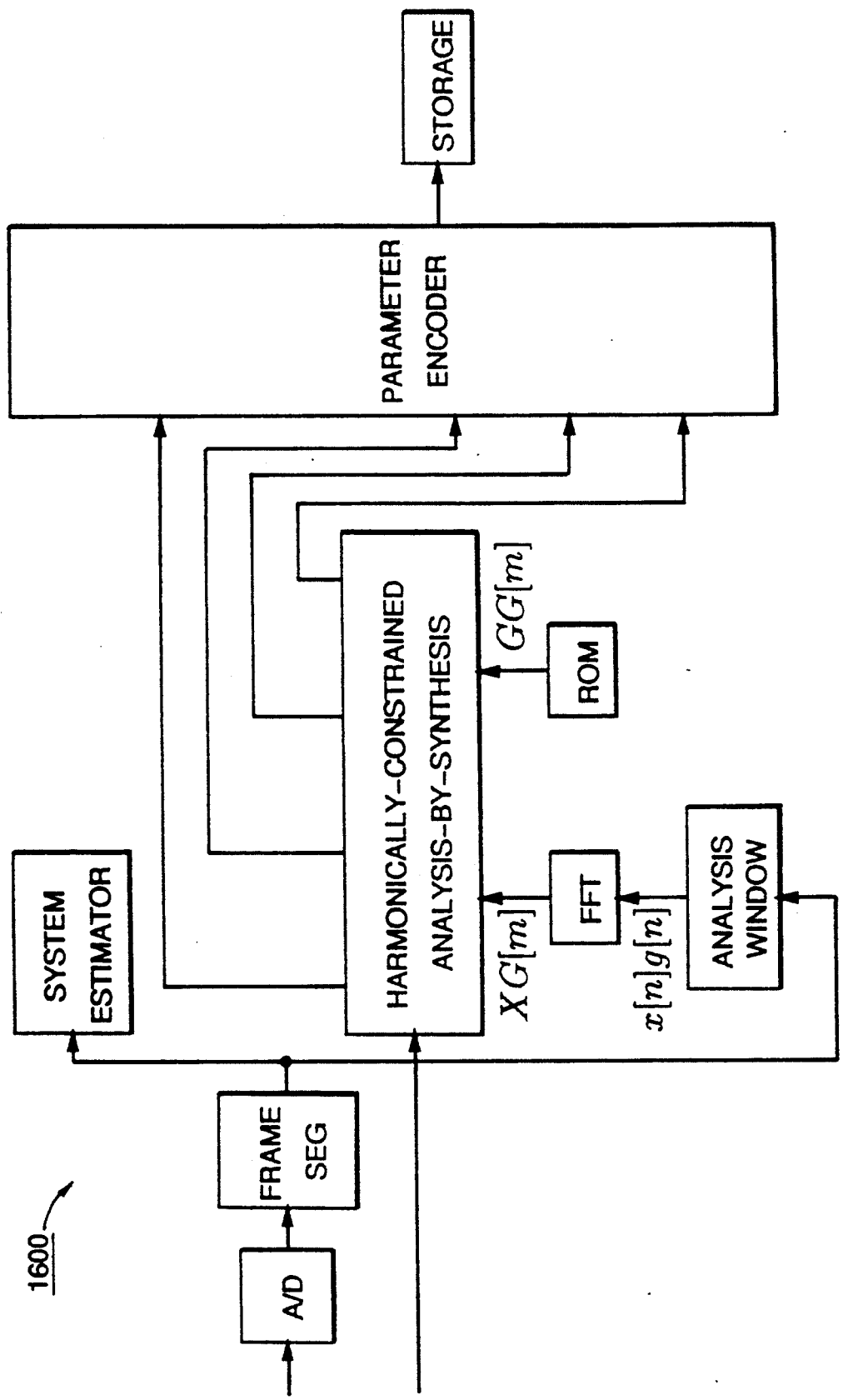
FIG. 16 is a system level block diagram of a musical tone analyzer according to the present invention similar in operation to the musical tone analyzer of FIG. 12 but which operates without incorporating time-varying gain sequence $\sigma[n]$.

As previously mentioned, the time-varying gain sequence $\sigma[n]$ is not required for the model to function; therefore, a second version of a musical tone analyzer that operates without said time-varying gain is illustrated in FIG. 16. Musical tone analyzer 1600 incorporates the same alterations as described in the discussion of speech analyzer 200. Furthermore, although the spectral envelope $H(e^{j\omega})$ is required to perform pitch-scale modification of musical signals, when this type of modification is not performed the spectral envelope is not required in musical tone analysis. In this case, the signal path and functional blocks dedicated to calculating said coefficients may be deleted from analyzers 1200 and 1600.

FIG. 17 illustrates a synthesizer embodiment of the present invention appropriate for the synthesis and modification of speech signals. Speech synthesizer 1700 of FIG. 17 responds to stored encoded quasi-harmonic sinusoidal model parameters previously determined by speech analysis in order to produce a synthetic facsimile of the original analog signal or alternately synthetic speech advantageously modified in time- and/or frequency-scale.

Parameter decoder 1702 responds to the stored encoded parameters transmitted from storage clement 1701 via path 1720 to yield the time-varying gain sequence $\sigma[n]$ of Equation 8 (if calculated in analysis), the coefficients associated with vocal tract frequency response estimate $H(e^{j\omega})$ discussed in the description of speech analyzer 100, and the fundamental frequency estimate $\omega_o^k$, quasi-harmonic differential frequencies $\{\Delta_l^k\}$ and phases $\{\phi_l^k\}$ used t generate a synthetic contribution according to Equation 45. Although storage element 1701 is shown to be distinct from storage clement 113 of speech analyzer 100, it should be understood that speech analyzer 100 and speech synthesizer 1700 may share the same storage element.

Consider now the operation of speech synthesizer 1700 in greater detail. Referring to Equations 12 and 45, time- and frequency-scale modification may be performed on isolated synthesis frames, using different time and frequency scale factors in each successive frame if desired. A simple approach to time-scale modification by a factor $p_k$ using the overlap-add sinusoidal model is to change the length of synthesis frame k from $N_s$ to $p_k N_s$ with corresponding time scaling of the envelope sequence $\sigma[n]$ and the synthesis window $w_s[n]$. Frequency-scale modification by a factor $\beta_k$ is accomplished by scaling the component frequencies of each synthetic contribution $\hat{s}^k[n]$. In either case, time shifts are introduced to the modified synthetic contributions to account for changes in phase coherence due to the modifications.

Unfortunately, this simple approach yields modified speech with reverberant artifacts as well as a noisy, "rough" quality. Examination of Equation 45 reveals why. Since the differential frequencies $\{\Delta_l^k\}$ are nonzero and independent, they cause the phase of each component sinusoid to evolve nonuniformly with respect to other components. This "phase evolution" results in a breakdown of coherence in the model as the time index deviates beyond analysis frame boundaries, as illustrated in FIG. 18. Time-shifting this extrapolated sequence therefore introduces incoherence to the modified speech.

The present invention overcomes the problem of uncontrolled phase evolution by altering the component frequencies of $\tilde{s}^k[n]$ in the presence of modifications according to the relation $$j\beta_k\omega_o^k + \Delta_j^k/\rho_k.$$

Figure 19A:
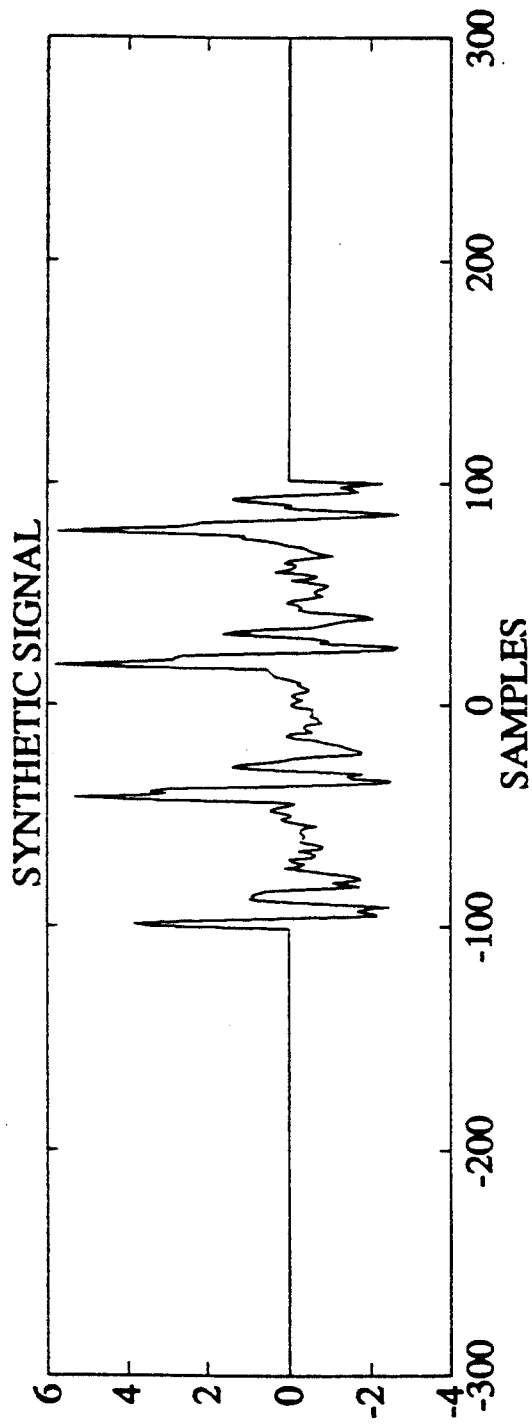
FIGS. 19A and 19B are an illustration of the effect of differential frequency scaling in the refined modification model. The phase coherence of the synthetic contribution breaks down more slowly due to "pulling in" the differential frequencies.
Figure 19B:
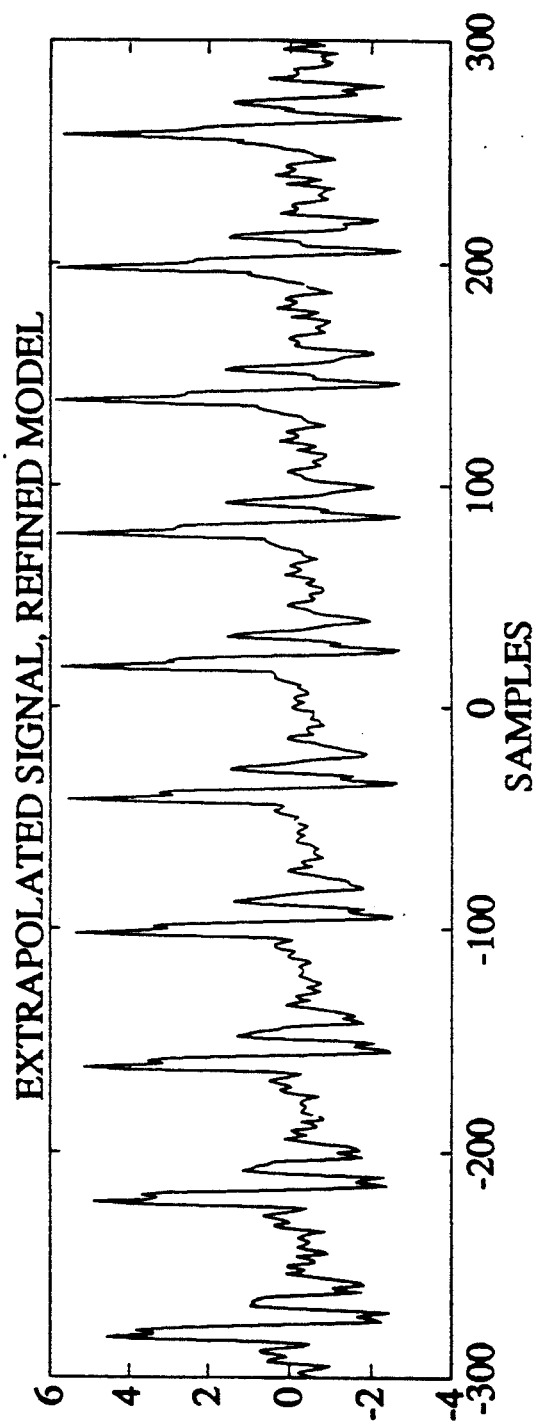

This implies that as the time scale factor $\rho_k$ is increased, the component frequencies "pull in" towards the harmonic frequencies, and in the limit the synthetic contributions become purely periodic sequences. The effect is to slow phase evolution, so that coherence breaks down proportionally farther from the analysis frame center to account for the longer synthesis frame length. The behavior of a synthetic contribution modified in this way is illustrated in FIG. 19.

Based on this new approach, a synthesis equation similar to Equation 12 may be constructed:

$$\tilde{s}[n + N_k] = \sigma\left[\frac{n}{\rho_k} + kN_s\right]\left(w_s\left[\frac{n}{\rho_k}\right]\tilde{s}_{\rho_k,\beta_k}^k[n] + \right. \tag{55}$$

$$\left. w_s\left[\frac{n}{\rho_k} - N_s\right]\tilde{s}_{\rho_k,\beta_k+1}^{k+1}[n - \rho_k N_s]\right),$$

for $0 \leq n < \rho_k N_s$, where $$N_k = N_s \sum_{i=0}^{k-1} \rho_i$$

is the starting point of the modified synthesis frame, and where $$\tilde{s}_{\rho_k,\beta_k}^k[n] = \sum_{j=0}^{J[k]} A_j^k \cos\left(j\beta_k\omega_o^k(n + \delta^k) + \frac{\Delta_j^k n}{\rho_k} + \phi_j^k\right) \tag{56}$$

$$\tilde{s}_{\rho_k,\beta_k+1}^{k+1}[n] = \sum_{j=0}^{J[k+1]} A_j^{k+1}\cos\left(j\beta_{k+1}\omega_o^{k+1}(n + \delta^{k+1}) + \frac{\Delta_j^{k+1} n}{\rho_k} + \phi_j^{k+1}\right).$$

Techniques for determining the time shifts $\delta^k$ and $\delta^{k+1}$ will be discussed later. It should be noted that when $\beta_k > 1$, it is possible for the component frequencies of $\tilde{s}_{\rho_k,\beta_k}[n]$ to exceed $\pi$, resulting in "aliasing." For this reason it is necessary to set the amplitude of any component whose modified frequency is greater than $\pi$ to zero.

Pitch onset time estimator 1703 responds to the coefficients representing $H(e^{j\omega})$ received via path 1721, the fundamental frequency estimate received via path 1722, and the quasi-harmonic model amplitudes, differential frequencies and phases received via paths 1723, 1724 and 1725 respectively in order to estimate the time relative to the center of an analysis frame at which an excitation pulse occurs. This function is achieved using an algorithm similar to one developed by McAulay and Quatieri in "Phase Modelling and its Application to Sinusoidal Transform Coding," *Proc. IEEE Int'l Conf. on Acoust., Speech and Signal Processing*, pp. 1713–1715, April 1986, and based on the observation that the glottal excitation sequence (which is ideally a periodic pulse train) may be expressed using the quasi-harmonic sinusoidal representation of Equations 8 and 45, where the synthetic contributions $\tilde{s}^k[n]$ are replaced by $$\tilde{e}^k[n] = \sum_{l=0}^{J[k]} b_l^k \cos(\omega_l^k n + \theta_l^k), \tag{57}$$

and where the amplitude and phase parameters of $\tilde{e}^k[n]$ are given by $$b_l^k = A_l^k/|H(e^{j\omega_l^k})|$$

$$\theta_l^k = \phi_l^k - \angle H(e^{j\omega_l^k}). \tag{58}$$

This process is referred to as "deconvolution." Assuming for simplicity that $\omega_l^k = l\omega_o^k$ and suppressing frame notation, Equation 57 may be rewritten as $$\tilde{e}[n] = \sum_{l=0}^{J} b_l \cos(l\omega_o(n - \tau_p) + \psi_l(\tau_p)), \tag{59}$$

where $$\psi_l(\tau_p) = \theta_l + l\omega_o\tau_p. \tag{60}$$

One of the properties of the vocal tract frequency response estimate $H(e^{j\omega})$ is that the amplitude parameters $A_l^k$ are approximately proportional to the magnitude of $H(e^{j\omega})$ at the corresponding frequencies $\omega_l^k$; thus, the deconvolved amplitude parameters $\{b_l^k\}$ are approximately constant. If, in addition, the "time-shifted" deconvolved phase parameters $\{\psi_l(\tau_p)\}$ are close to zero or $\pi$ for some value of $\tau_p$ (termed "maximal coherence"), then $\tilde{e}^k[n]$ is approximately a periodic pulse train with a "pitch onset time" of $\tau_p$. By assuming the condition of maximal coherence, an approximation to $\tilde{s}^k[n]$ may be constructed by reversing the deconvolution process of Equation 58, yielding $$\tilde{s}_{\tau_p}^k[n] = \sum_{l=0}^{J[k]} A_l^k \cos(l\omega_o^k(n - \tau_p) + \angle H(e^{j\omega_l^k}) + m\pi), \tag{61}$$

where m is either zero or one.

The pitch onset time parameter $\tau_p$ may then be defined as that value of $\tau$ which yields the minimum mean-square error between $\tilde{s}^k[n]$ and $\tilde{s}_\tau^k[n]$ over the original analysis frame, $$E(\tau) = \sum_{n=-N_a}^{N_a}\left\{\tilde{s}^k[n] - \sum_{l=0}^{J[k]} A_l^k\cos(l\omega_o^k(n - \tau) + \angle H(e^{j\omega_l^k}) + m\pi)\right\}^2. \tag{62}$$

Figure 20:
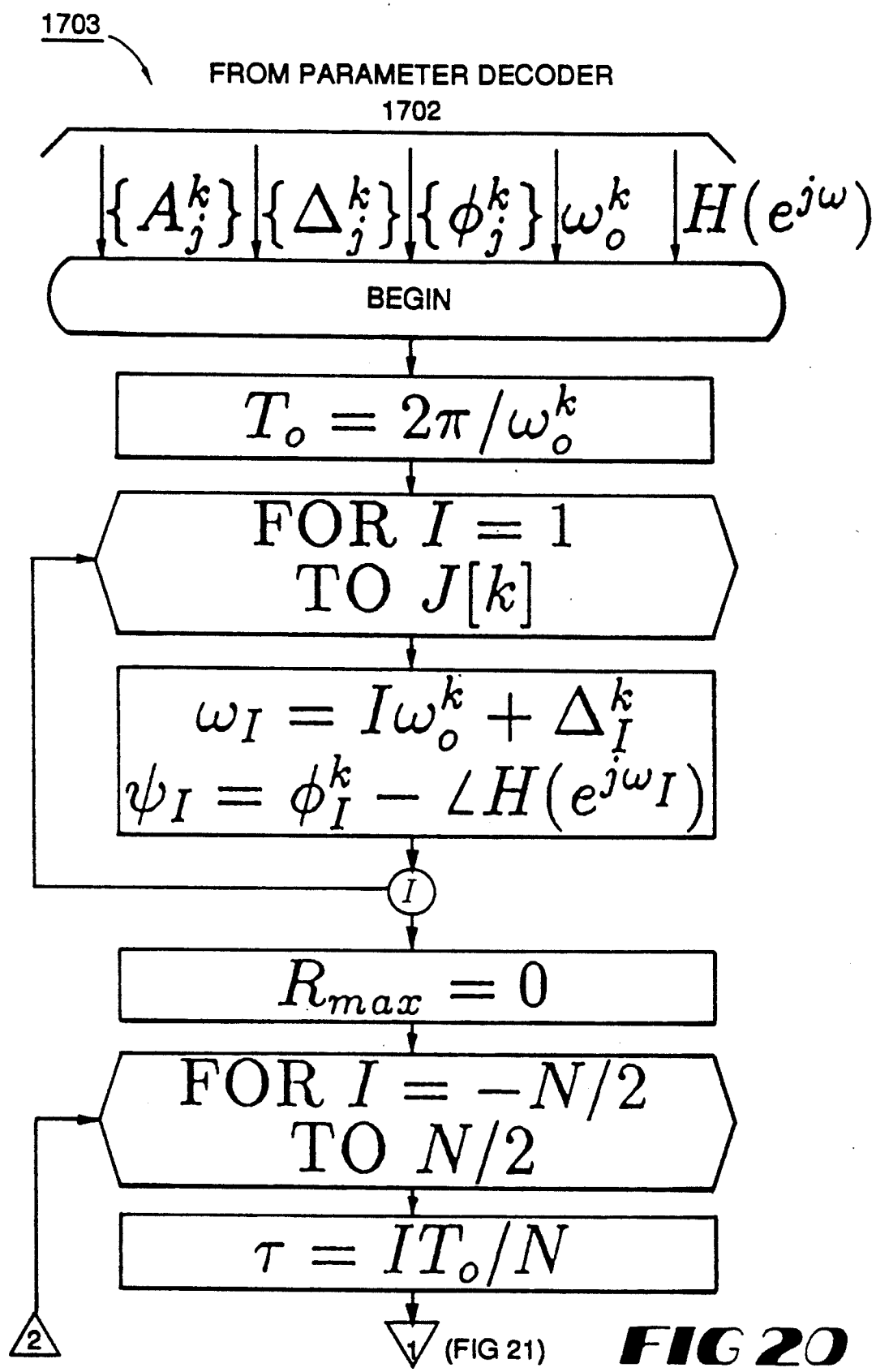
FIGS. 20 and 21 are flowcharts showing the information processing tasks achieved by the pitch onset time estimator block of FIG. 17.
Figure 21:
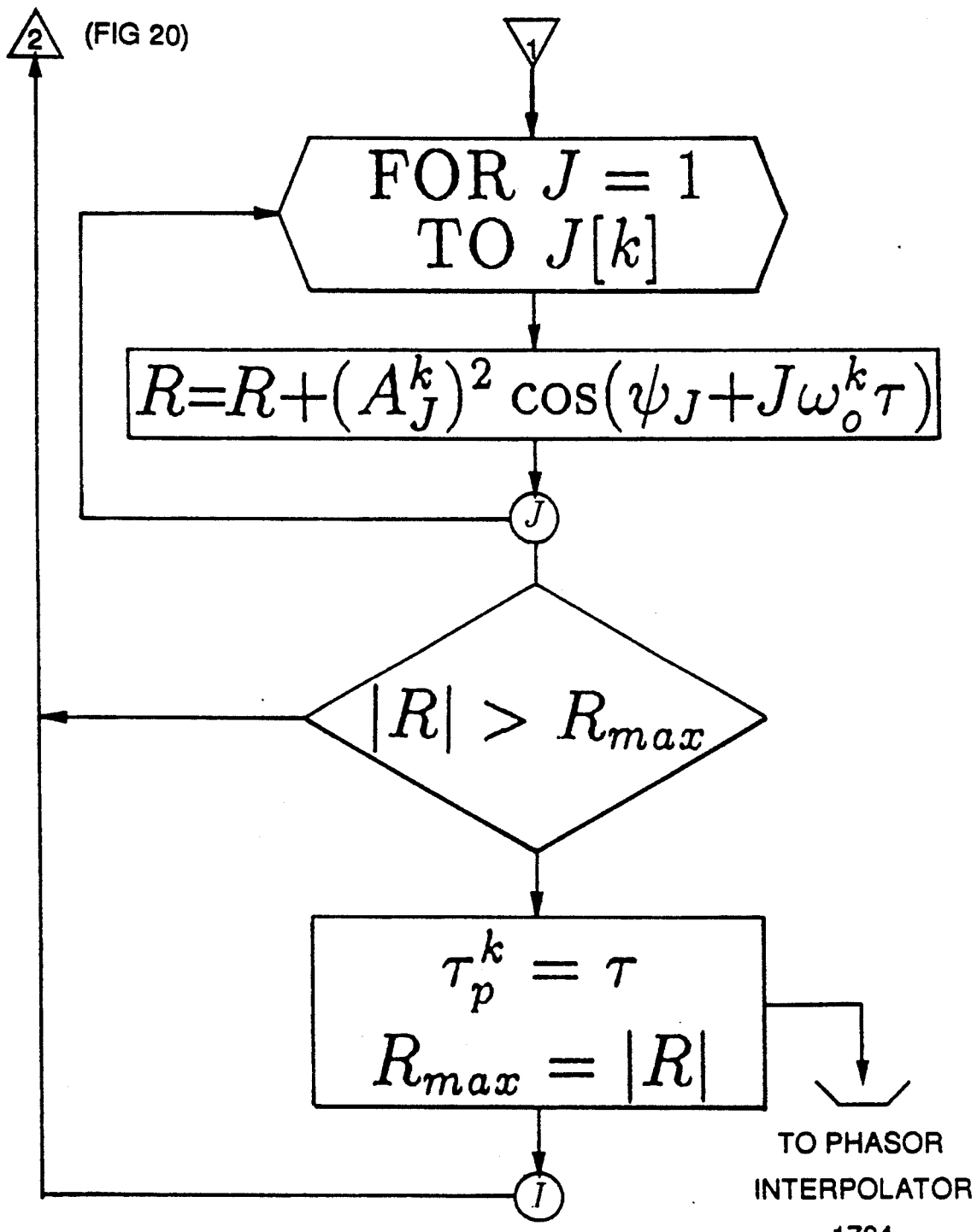

Assuming that $N_a$ is a pitch period or more, this is approximately equivalent to finding the absolute maximum of the pitch onset likelihood function $$L(\tau) = \sum_{l=0}^{J} A_l^2 \cos(\psi_l(\tau)) \tag{63}$$

in terms of $\tau$. Unfortunately, this problem does not have a closed-form solution; however, due to the form of $\psi_k(\tau)$, $L(\tau)$ is periodic with period $2\pi/\omega_o$. Therefore, the pitch onset time may be estimated by evaluating $L(\tau)$ at a number (typically greater than 128) of uniformly spaced points on the interval $[-\pi/\omega_o, \pi/\omega_o]$ and choosing $\tau_p$ to correspond to the maximum of $|L(\tau)|$. This algorithm is shown in flowchart form in FIGS. 20 and 21.

DFT assignment block 1704 responds to the fundamental frequency $\omega_o^k$ received via path 1722, the sets of quasi-harmonic model amplitudes, differential frequencies and phases received via paths 1723, 1724 and 1725 respectively, pitch onset time estimate $\tau_p^k$ received via path 1726, frequency-scale modification factor $\beta_k$ and time-scale modification factor $\rho_k$ received via paths 1727 and 1728, respectively, to produce a sequence $Z[i]$ which may be used to construct a modified synthetic contribution using an FFT algorithm.

Consider the operation of DFT assignment block 1704 in greater detail. Referring to Equation 10, since the component frequencies of $\tilde{s}^k[n]$ are given by $\omega_l^k = 2\pi i_l/M$, a synthetic contribution may be expressed as $$\tilde{s}^k[n] = \sum_{l=1}^{J[k]} A_l^k \cos(2\pi i_l m/M + \phi_l^k). \qquad (64)$$

Recognizing that $A_l^k \cos(2\pi i_l m/M + \phi_l^k) = \Re e\{A_l^k e^{-j(2\pi i l n/M + \phi l k)}\}$, this becomes $$\tilde{s}^k[n] = \Re e\left\{\sum_{l=1}^{J[k]} A_l^k e^{-j\phi_l^k} W_M^{i_l n}\right\}. \qquad (65)$$

Thus, by Equation 31, any sequence expressed as a sum of constant-amplitude, constant-frequency sinusoids whose frequencies are constrained to be multiples of $2\pi/M$ is alternately given as the real part of the M-point DFT of a sequence $Z[i]$ with values of $A_l^k e^{-j\phi_l^k}$ as $i = i_l$ and zero otherwise. This DFT may be calculated using an FFT algorithm.

According to Equation 56, in the presence of time- and frequency-scale modification a synthetic contribution is given by $$\tilde{s}^k_{\rho_k,\beta_k}[n] = \sum_{l=0}^{J[k]} A_l^k \cos(\hat{\omega}_l^k n + \zeta_l^k), \qquad (66)$$

where $$\hat{\omega}_l^k = \beta_k l\omega_o^k + \Delta_l^k/\rho_k, \qquad (67)$$

$$\zeta_l^k = \phi_l^k + \beta_k l\omega_o^k \delta^k. \qquad (68)$$

Except for the case when $\beta_k = \rho_k = 1$, the modified frequency terms no longer fall at multiples of $2\pi/M$; however, an FFT algorithm may still be used to accurately represent $\tilde{s}^k_{\rho_k,\beta_k}[n]$. Ignoring frame notation, this is accomplished by calculating the DFT indices whose corresponding frequencies are adjacent to $\hat{\omega}_l$:

$$i_{1,l} = \left\lfloor \frac{\hat{\omega}_l \hat{M}}{2\pi} \right\rfloor \qquad (69)$$

$$i_{2,l} = i_{1,l} + 1, \qquad (70)$$

where $\lfloor . \rfloor$ denotes the "greatest integer less than or equal to" operator.

The length of the DFT used in modification synthesis, $\hat{M}$, is adjusted to compensate for the longer frame lengths required in time-scale modification and is typically greater than or equal to $\rho_k M$. Each component of $\tilde{s}^k_{\rho_k,\beta_k}[n]$ is then approximated using two components with frequencies $\hat{\omega}_{1,l} = 2\pi i_{1,l}/\hat{M}$ and $\hat{\omega}_{2,l} = 2\pi i_{2,l}/\hat{M}$ in the following manner: Given a single sinusoidal component with an unconstrained frequency $\hat{\omega}_l$ of the form $$c_l[n] = A_l \cos(\hat{\omega}_l m + \zeta_l) = \hat{a}_l \cos \hat{\omega}_l m + b_l \sin \hat{\omega}_l m, \qquad (71)$$

two sinusoids with constrained frequencies are added together to form an approximation to $c_l[n]$:

$$\tilde{c}_l[n] = A_{1,l}\cos(\hat{\omega}_{1,l} m + \zeta_{1,l}) + A_{2,l}\cos(\hat{\omega}_{2,l} m + \zeta_{2,l}) \qquad (72)$$
$$= a_{1,l}\cos\hat{\omega}_{1,l} m + b_{1,l}\sin\hat{\omega}_{1,l} m + a_{2,l}\cos\hat{\omega}_{2,l} m + b_{2,l}\sin\hat{\omega}_{2,l} m.$$

Letting $\hat{N}_s = \rho_k N_s$ and using the squared error norm $$E_l = \sum_{n=-\hat{N}_s}^{\hat{N}_s} \{c_l[n] - \tilde{c}_l[n]\}^2, \qquad (73)$$

minimization of $E_l$ in terms of the coefficients of $\tilde{c}_l[n]$ leads to the conditions $$\frac{\partial E_l}{\partial a_{1,l}} = \frac{\partial E_l}{\partial a_{2,l}} = \frac{\partial E_l}{\partial b_{1,l}} = \frac{\partial E_l}{\partial b_{2,l}} = 0. \qquad (74)$$

Expanding the first condition using Equation 72 yields $$\sum_{n=-\hat{N}_s}^{\hat{N}_s} \tilde{c}_l[n]\cos\hat{\omega}_{1,l} m = \sum_{n=-\hat{N}_s}^{\hat{N}_s} c_l[n]\cos\hat{\omega}_{1,l} m. \qquad (75)$$

Equations 71 and 72 may be substituted into this equation; however, noting that $$\sum_{n=-N}^{N} \cos\alpha n \sin\beta n = 0$$

for all $\alpha$, $\beta$ and $N$, the resulting expression simplifies to $$a_{1,l} \sum_{n=-\hat{N}_s}^{\hat{N}_s} \cos^2\hat{\omega}_{1,l} m + a_{2,l} \sum_{n=-\hat{N}_s}^{\hat{N}_s} \cos\hat{\omega}_{1,l} m\cos\hat{\omega}_{2,l} m = \qquad (76)$$
$$\hat{a}_l \sum_{n=-\hat{N}_s}^{\hat{N}_s} \cos\hat{\omega}_l m\cos\hat{\omega}_{1,l} m.$$

Similarly, the other conditions of Equation 74 are given by the equations $$a_{1,l} \sum_{n=-\hat{N}_s}^{\hat{N}_s} \cos\hat{\omega}_{1,l} m\cos\hat{\omega}_{2,l} m + a_{2,l} \sum_{n=-\hat{N}_s}^{\hat{N}_s} \cos^2\hat{\omega}_{2,l} m = \qquad (77)$$
$$\hat{a}_l \sum_{n=-\hat{N}_s}^{\hat{N}_s} \cos\hat{\omega}_l m\cos\hat{\omega}_{2,l} m,$$

$$b_{1,l} \sum_{n=-\hat{N}_s}^{\hat{N}_s} \sin^2\hat{\omega}_{1,l} m + b_{2,l} \sum_{n=-\hat{N}_s}^{\hat{N}_s} \sin\hat{\omega}_{1,l} m\sin\hat{\omega}_{2,l} m = \qquad (78)$$

-continued $$b_{1,l} \sum_{n=-\hat{N}_s}^{\hat{N}_s} \sin\hat{\omega}_{1,m}\sin\hat{\omega}_{1,m},$$

and $$b_{1,l} \sum_{n=-\hat{N}_s}^{\hat{N}_s} \sin\hat{\omega}_{1,m}\sin\hat{\omega}_{2,m} + b_{2,l} \sum_{n=-\hat{N}_s}^{\hat{N}_s} \sin^2\hat{\omega}_{2,m} = \quad (79)$$

$$\hat{b}_l \sum_{n=-\hat{N}_s}^{\hat{N}_s} \sin\hat{\omega}_{n}\sin\hat{\omega}_{2,m}.$$

Equations 76 and 77 form a pair of normal equations in the form of Equation 23 which may be solved using the formulas of Equation 25 for $a_{1,l}$ and $a_{2,l}$; likewise, Equations 78 and 79 are a second, independent pair of normal equations yielding $b_{1,l}$ and $b_{2,l}$.

The inner product terms in Equations 76–79 may be calculated using the relations $$\sum_{n=-N}^{N} \cos\alpha n \cos\beta n = \frac{1}{2} F_N(\alpha - \beta) + \frac{1}{2} F_N(\alpha + \beta) \quad (80)$$

$$\sum_{n=-N}^{N} \sin\alpha n \sin\beta n = F_N(\alpha - \beta) - \sum_{n=-N}^{N} \cos\alpha n \cos\beta n, \quad (81)$$

where the function $F_N(\omega)$, defined as $$F_N(\omega) \triangleq \frac{\sin(2N+1)\omega/2}{\sin\omega/2}$$

may be precalculated and used as required. Given the parameters determined from the two sets of normal equations, the amplitude and phase parameters of $\mathcal{E}_l[n]$ are derived using the relationships of Equation 27. The resulting amplitude and phase parameters can then be assigned to the M-point sequence $\hat{Z}[i]$ as described previously at index values $i_{1,l}$ and $i_{2,l}$.

In speech signals, synthetic contributions are highly correlated from one frame to the next. In the presence of modifications, this correlation must be maintained if the resulting modified speech is to be free from artifacts. To accomplish this, the time shifts $\delta^k$ and $\delta^{k+1}$ in Equation 56 may be determined such that the underlying excitation signal obeys specific constraints in both the unmodified and modified cases. Examining Equation 59, if the component amplitudes are set to unity and the phases set to zero, a "virtual excitation" sequence, or an impulse train with fundamental frequency $\omega_0^k$ and shifted relative to the synthesis frame boundary by $\tau_p^k$ samples, results. In "Phase Coherence in Speech Reconstruction for Enhancement and Coding Applications," *Proc. IEEE Int'l Conf. on Acoust., Speech and Signal Processing*, pp. 207–210, May 1989, McAulay and Quatieri derive an algorithm to preserve phase coherence in the presence of modifications using virtual excitation analysis. The following is a description of a refined version of this algorithm.

As illustrated in FIG. 22, in synthesis frame k the unmodified virtual excitation of the k-th synthetic contribution has pulse locations relative to frame boundary A of $\tau_p^k + iT_o^k$, where $T_o^k = 2\pi/\omega_o^k$. These impulses are denoted by O's. Likewise, the pulse locations of the virtual excitation of the (k+1)-st synthetic contribution relative to frame boundary B are $\tau_p^{k+1} + iT_o^{k+1}$; these pulses are denoted by X's. For some integer $i_k$, a pulse location of the k-th contribution is adjacent to frame center C; likewise, for some $i_{k+1}$ a pulse location of the k+1-st contribution is adjacent to frame center C. The values of $i_k$ and $i_{k+1}$ can be found as $$i_k = \lfloor (N_s/2 - \tau_p^k)/T_o^k \rfloor$$

$$i_{k+1} = \lfloor -(N_s/2 + \tau_p^{k+1})/T_o^{k+1} \rfloor + 1. \quad (82)$$

The time difference between the pulses adjacent to frame center C is shown as $\Delta$.

In the presence of time- and frequency-scale modification, the relative virtual excitation pulse locations are changed to $n = (\tau_p^k + iT_o^k)/\beta_k - \delta^k$ and $n = (\tau_p^{k+1} + iT_o^{k+1})/\beta_{k+1} - \delta^{k+1}$ for modified synthetic contributions k and k+1, respectively. In order to preserve frame-to-frame phase coherence in the presence of modifications, the time shift $\delta^{k+1}$ must be adjusted such that the time difference between pulses adjacent to modified frame center C' is equal to $\Delta/\beta_{av}$, where $\beta_{av} = (\beta_k + \beta_{k+1})/2$. This condition is also shown in FIG. 22. The coherence requirement leads to an equation which can be solved for $\delta^{k+1}$, yielding the recursive relation $$\delta^{k+1} = \delta^k + (\rho_k - 1/\beta_{av})N_s + \quad (83)$$

$$\frac{\beta_k - \beta_{k+1}}{2\beta_{av}} \left( \frac{\tau_p^k}{\beta_k} + \frac{\tau_p^{k+1}}{\beta_{k+1}} \right) - \frac{\hat{i}_k}{\beta_k} T_o^k +$$

$$(i_k T_o^k - i_{k+1} T_o^{k+1})/\beta_{av},$$

where $$\hat{i}_k = \lfloor (\beta_k(\delta^k + \rho_k N_s/2) - \tau_p^k)/T_o^k \rfloor. \quad (84)$$

Figure 23:
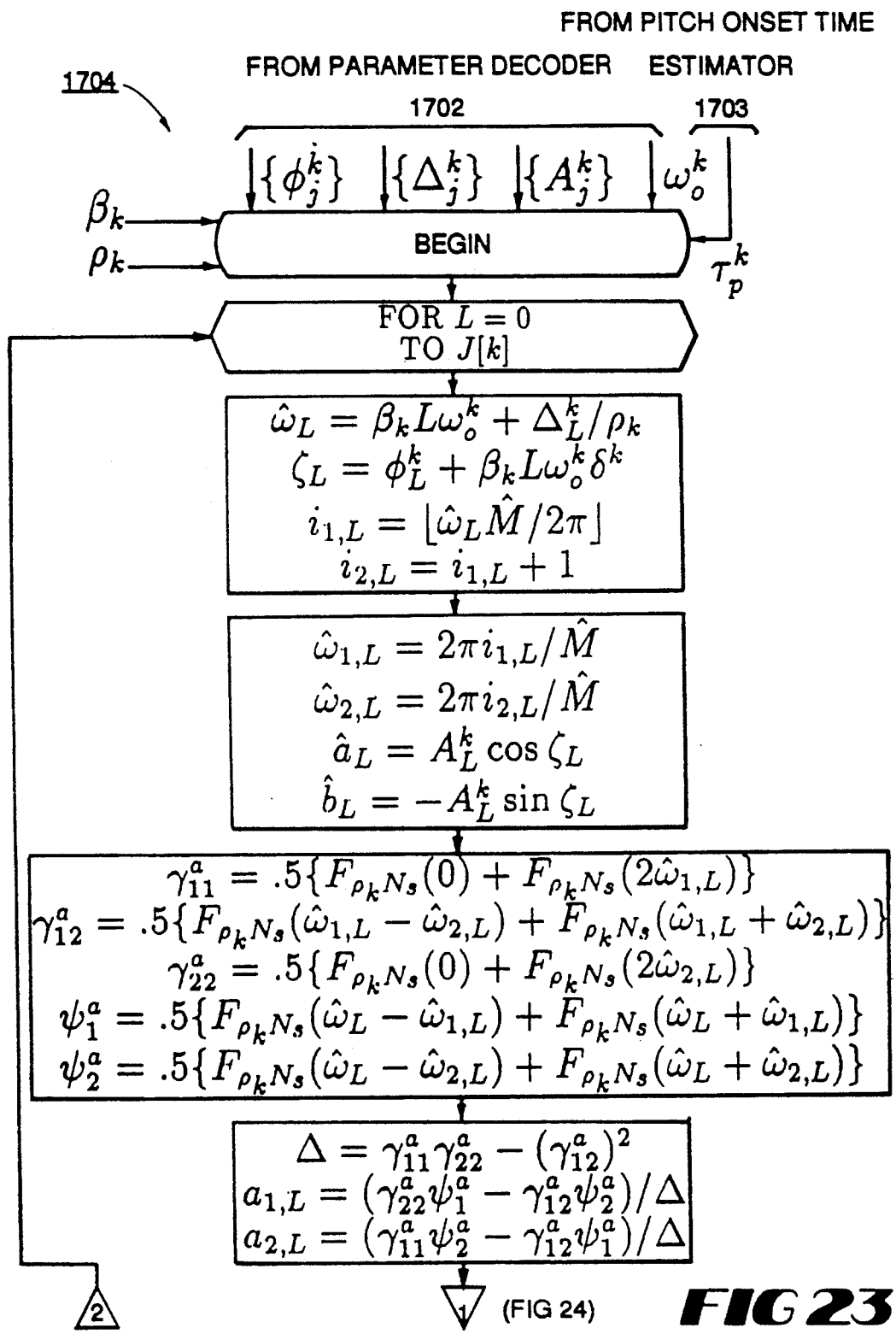
FIGS. 23 and 24 are flowcharts showing the information processing tasks achieved by the speech synthesizer DFT assignment block of FIG. 17.
Figure 24:
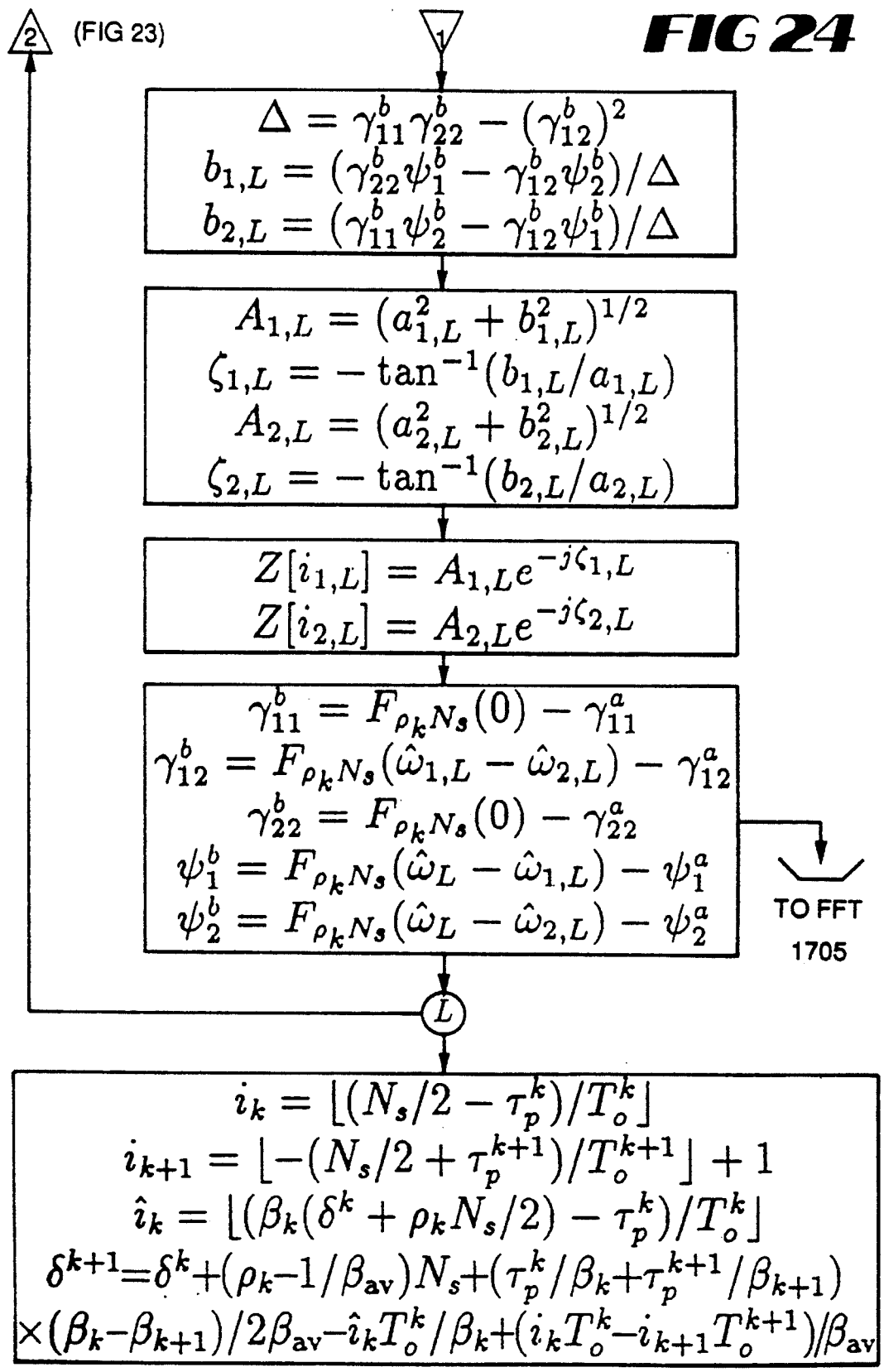

The algorithms involved in DFT assignment block 1704 are illustrated in flowchart form in FIGS. 23 and 24.

FFT block 1705 responds to the complex sequence $\hat{Z}[i]$ produced by DFT assignment block 1704 to produce a complex sequence $\hat{z}[n]$ which is the M-point DFT of $\hat{Z}[i]$ according to Equation 31. Overlap-add block 1706 responds to the complex sequence output by FFT block 1705, time-scale modification factor $\rho_k$ received via path 1728, and time-varying gain sequence $\sigma[n]$ received via path 1729 to produce a contiguous sequence $\hat{s}[n]$, representative of synthetic speech, on a frame-by-frame basis. This is accomplished in the following manner: Taking the real part of the input sequence $\hat{z}[n]$ yields the modified synthetic contribution sequence $\hat{s}_{\rho_k,\beta_k}[n]$ as in the discussion of DFT assignment block 1704. Using the relation expressed in Equation 55, a synthesis frame of $\hat{s}[n]$ is generated by taking two successive modified synthetic contributions, multiplying them by shifted and time scaled versions of the synthesis window $w_s[n]$, adding the two windowed sequences together, and multiplying the resulting sequence by the time scaled time-varying gain sequence or $\sigma[n]$.

It should be understood that if speech analysis was performed without the time-varying gain sequence, then data path 1729 may be deleted, and the overlapadd algorithm is implemented with $\sigma[n] = 1$. Given $\hat{s}[n]$, overlap-add block 1706 then produces an output data stream by quantizing the synthetic speech sequence using a quantization operator as in Equation 1. Digitalto-analog (D/A) converter 1707 responds to the data stream produced by overlap-add block 1706 to produce an analog signal $\hat{s}_c(t)$ which is output from speech synthesizer 1700 via path 1730.

While time- and frequency-scale modification of analyzed speech is sufficient for many applications, for certain applications other information must be accounted for when performing modifications. For instance, when speech is frequency-scale modified using speech synthesizer 1700, the component frequencies used in the sinusoidal model are changed, but the amplitude parameters are unaltered except as required to prevent aliasing; this results in compression or expansion of the "spectral envelope" of analyzed speech (of which $|H(e^{j\omega})|$ is an estimate). Since identifiable speech sounds are critically determined by this envelope, such "spectral distortion" may seriously degrade the intelligibility of synthetic speech produced by synthesizer 1700. Therefore, it is important to consider an approach to altering the fundamental frequency of speech while preserving its spectral envelope; this is known as pitch-scale modification.

Figure 25:
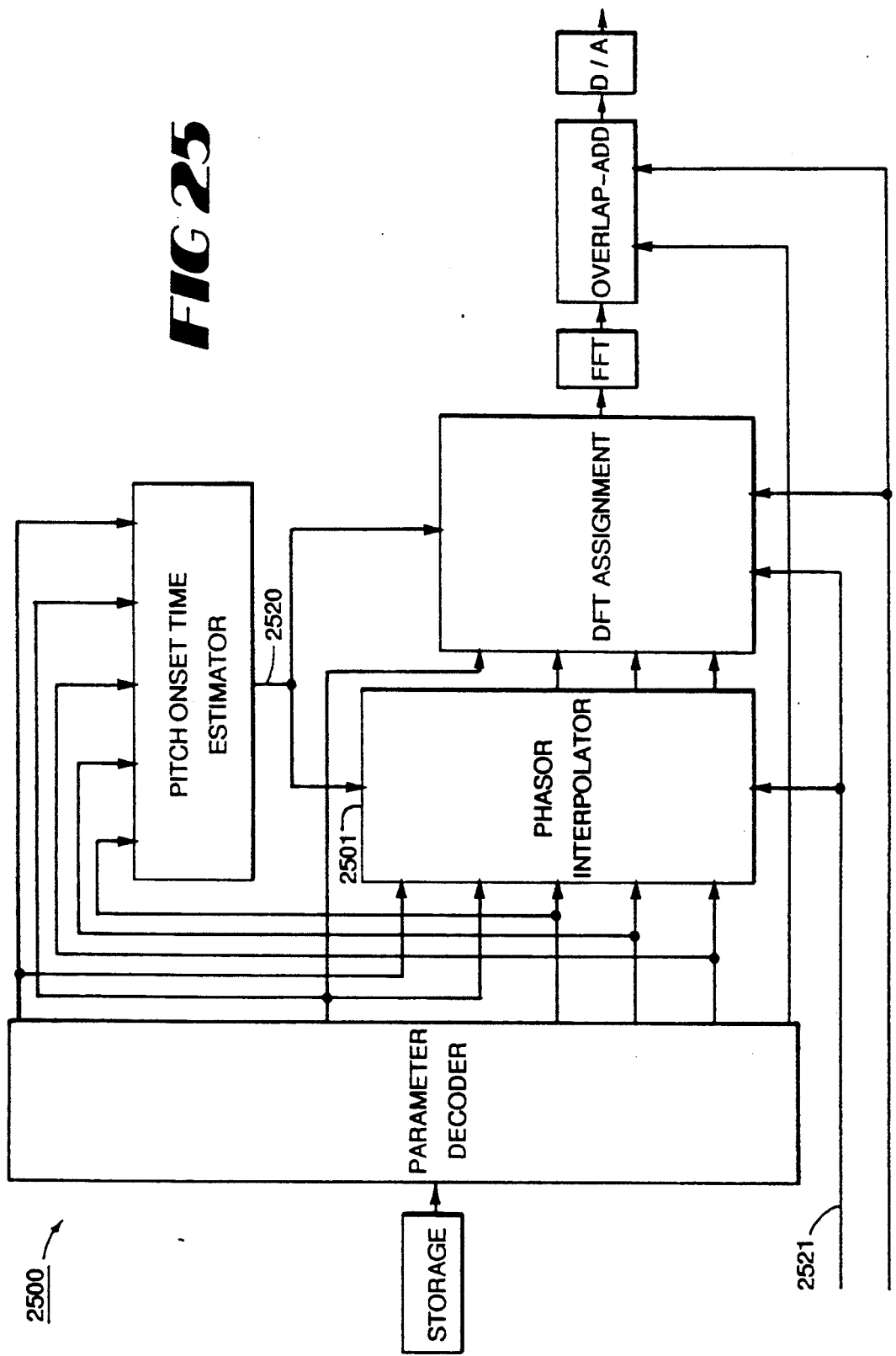
FIG. 25 is a system level block diagram of a speech synthesizer according to the present invention similar in operation to the speech synthesizer of FIG. 17 but which is capable of performing time- and pitch-scale modifications.

A second version of a speech synthesizer capable of performing time- and pitchscale modification on previously analyzed speech signals is illustrated in FIG. 25. Speech synthesizer 2500 operates identically to speech synthesizer 1700, except that an additional step, phasor interpolator 2501, is added to counteract the effects of spectral distortion encountered in speech synthesizer 1700.

Phasor interpolator 2501 responds to the same set of parameters input to pitch onset time estimator 1703, the pitch onset time $\tau_p^k$ determined by pitch onset time estimator 2502 received via path 2520, and the pitch-scale modification factor $\beta_k$ received via path 2521 in order to determine a modified set of amplitudes $\{\hat{A}_l^k\}$, harmonic differential frequencies $\{\hat{\Delta}_l^k\}$, and phases $\{\hat{\phi}_l^k\}$ which produce a pitchscale modified version of the original speech data frame.

Consider now the operation of phasor interpolator 2501 in greater detail: According to the discussion of pitch onset time estimator 1703, a synthetic contribution to the glottal excitation sequence as given in Equation 57 is approximately periodic pulse train whose fundamental frequency is $\omega_o^k$. In a manner similar to the pitch-excited LPC model, it might be expected that scaling the frequencies of $\tilde{e}^k[n]$ by $\beta_k$ and "reconvolving" with $H(e^{j\omega})$ at the scaled frequencies $\{\beta w_l^k\}$ would result in synthetic speech with a fundamental frequency of $\beta_k\omega_o^k$ that maintains the same spectral shape of $H(e^{j\omega})$, and therefore the same intelligibility, as the original speech. Unfortunately, since the frequencies of $\tilde{e}^k[n]$ span the range from zero to $\pi$, this approach results in component frequencies spanning the range from zero to $\beta_k\pi$. For pitch scale factors less than one, this "information loss" imparts a muffled quality to the modified speech.

To address this problem, consider the periodic sequence obtained from $\tilde{e}^k[n]$ by setting $\omega_l^k = l\omega_o^k$:

$$\tilde{e}_o^k[n] = \sum_{l=0}^{J[k]} b_l^k \cos(l\omega_o^k n + \theta_l^k). \tag{85}$$

The goal of modifying the fundamental frequency of $\tilde{e}_o^k[n]$ without information loss is to specify a set of modified amplitude and phase parameters for the modified residual $\tilde{e}_\beta[n]$, given by $$\tilde{e}_\beta^k[n] = \sum_{l=0}^{\hat{J}[k]} \hat{b}_l^k \cos(\beta_k l\omega_o^k n + \hat{\theta}_l^k), \tag{86}$$

(where $\hat{J}[k] = J[k]/\beta_k$) which span the frequency range from zero to $\pi$. Since as a function of frequency the pairs of amplitude and phase parameters are evenly spaced, a reasonable approach to this problem is to interpolate the complex "phasor form" of the unmodified amplitude and phase parameters across the spectrum and to derive modified parameters by resampling this interpolated function at the modified frequencies.

Again suppressing frame notation, this implies that given the interpolated function $\mathcal{E}(w)$, where $$\mathcal{E}(\omega) = \sum_{l=0}^{J} b_l e^{j\theta_l} I(\omega - l\omega_o), \tag{87}$$

the modified amplitudes are given by $\hat{b}_l = |\mathcal{E}(\beta l\omega_o)|$, and the modified phases by $\hat{\theta}_l = \angle\mathcal{E}(\beta l\omega_o)$.

While any interpolation function $I(\omega)$ with the properties $I(l\omega_o) = 0$ for $l \neq 0$ and $I(0) = 1$ may be employed, a raised-cosine interpolator of the form $$I(\omega) = \begin{cases} \cos^2(\pi\omega/2\omega_o), & |\omega| \leq \omega_o \\ 0, & \text{otherwise} \end{cases} \tag{88}$$

makes the computation of $\mathcal{E}(\omega)$ much simpler, since all but two terms drop out of Equation 87 at any given frequency. Furthermore, since $I(\omega)$ is bandlimited, the effect of any single noise-corrupted component of $\tilde{e}^k[n]$ on the modified parameters is strictly limited to the immediate neighborhood of that component's frequency. This greatly reduces the problem of inadvertently amplifying background noise during modification by assuring that noise effects concentrated in one part of the spectrum do not "migrate" to another part of the spectrum where the magnitude of $H(e^{j\omega})$ may be greatly different.

The discussion of phasor interpolation to this point has ignored one important factor: the interpolated function $\mathcal{E}(w)$ is seriously affected by the phase terms $\{\theta_l\}$. To see this, consider the case when $\theta_l = 0$ for all l; in this case, $\mathcal{E}(\omega)$ is simply a straightforward interpolation of the amplitude parameters. However, if every other phase term is $\pi$ instead, $\mathcal{E}(\omega)$ interpolates adjacent amplitude parameters with opposite signs, resulting in a very different set d modified amplitude parameters. It is therefore reasonable to formulate phasor interpolation such that the effects of phase on the modified amplitudes is minimized.

As mentioned above, when the phase terms are all close to zero, phasor interpolation approximates amplitude interpolation. Furthermore, examining Equation 87 reveals that when the phase terms are all close to $\pi$, phasor interpolation is approximately interpolation of amplitudes with a sign change, and that deviation from either of those conditions results in undesirable nonlinear amplitude interpolation. Recalling the description of pitch onset time estimator 1703, $\tau_p$ is estimated such that the "time-shifted" phase parameters $\{\psi_l(\tau_p)\}$ have exactly this property. Therefore, the phase interpolation procedure outlined above may be performed using $\{\psi_l(\tau_p)\}$ instead of $\{\theta_l\}$, yielding the modified amplitude parameters $\{\hat{b}_l\}$ and interpolated phases $\{\hat{\psi}_l(\tau_p)\}$. The modified phase terms may then be derived by reversing the time shift imparted to $\}\psi_j(\tau_p)\}$:

$$\hat{\theta}_l = \hat{\psi}_j(\tau_p) - l\omega_o \tau_p. \tag{89}$$

At this point all that remains is to specify appropriate differential frequency terms in the equation for $\tilde{e}^k[n]$. Although this task is somewhat arbitrary, it is reasonable to expect that the differential frequency terms may be interpolated uniformly in a manner similar to phasor interpolation, yielding $$\hat{\Delta}_l = \sum_{i=0}^{J} \Delta_i I(\beta l\omega_o - i\omega_o). \tag{90}$$

This interpolation has the effect that the modified differential frequencies follow the same trend in the frequency domain as the unmodified differentials, which is important both in preventing migration of noise effects and in modifying speech which possesses a noise-like structure in certain portions of the spectrum.

Figure 26:
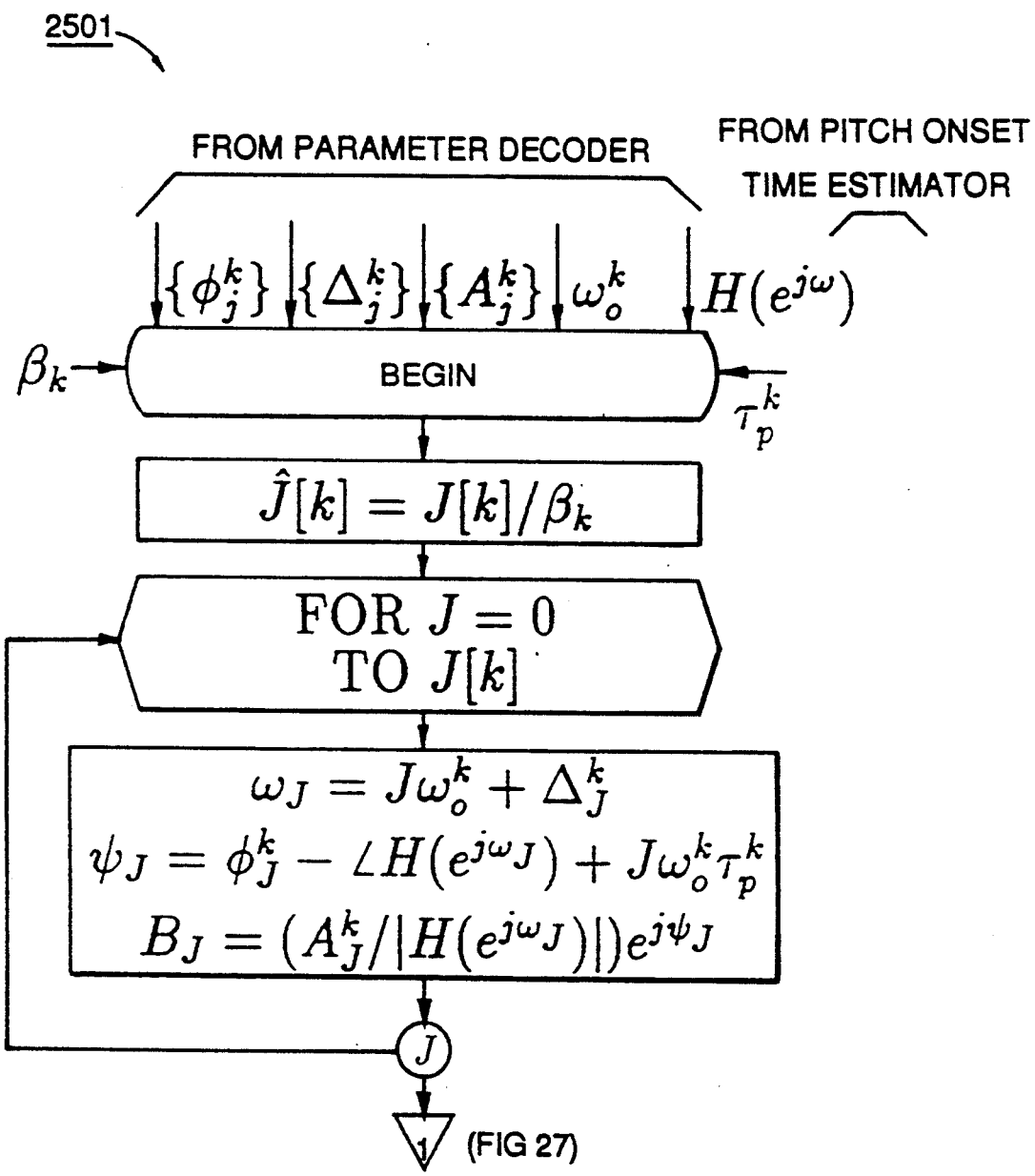
FIGS. 26 and 27 are flowcharts showing the information processing tasks achieved by the phasor interpolator block of FIG. 25.
Figure 27:
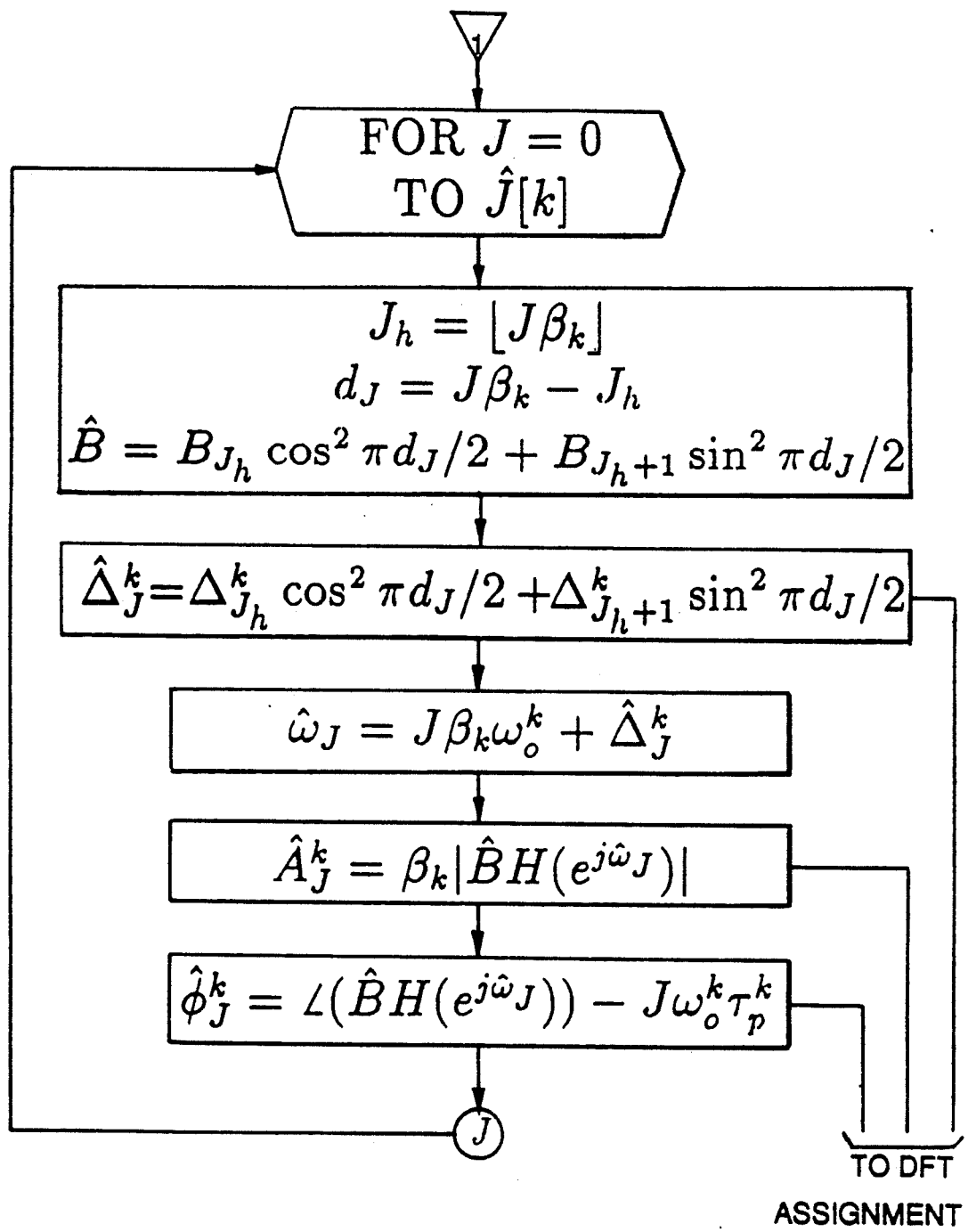

Given the amplitude, phase and differential frequency parameters of a modified excitation contribution, the specification of a synthetic contribution to pitch-scale modified speech may be completed by reintroducing the effects of the spectral envelope to the amplitude and phase parameters at the modified frequencies $\hat{\omega}_j^k = \beta_k l\omega_o^k + \hat{\Delta}_j^k$:

$$\hat{A}_j^k = \hat{b}_j^k \beta_k |H(e^{j\hat{\omega}_j^k})|$$

$$\hat{\phi}_j^k = \hat{\theta}_j^k + \angle H(e^{j\hat{\omega}_j^k}), \tag{91}$$

where the multiplicative factor of $\beta_k$ on the amplitude parameters serves to normalize the amplitude of the modified speech. The algorithm used in phasor interpolator 2501 is illustrated in flowchart form in FIGS. 26 and 27. All other algorithmic components of speech synthesizer 2500 and their structural relationships are identical to those of speech synthesizer 1700.

Figure 28:
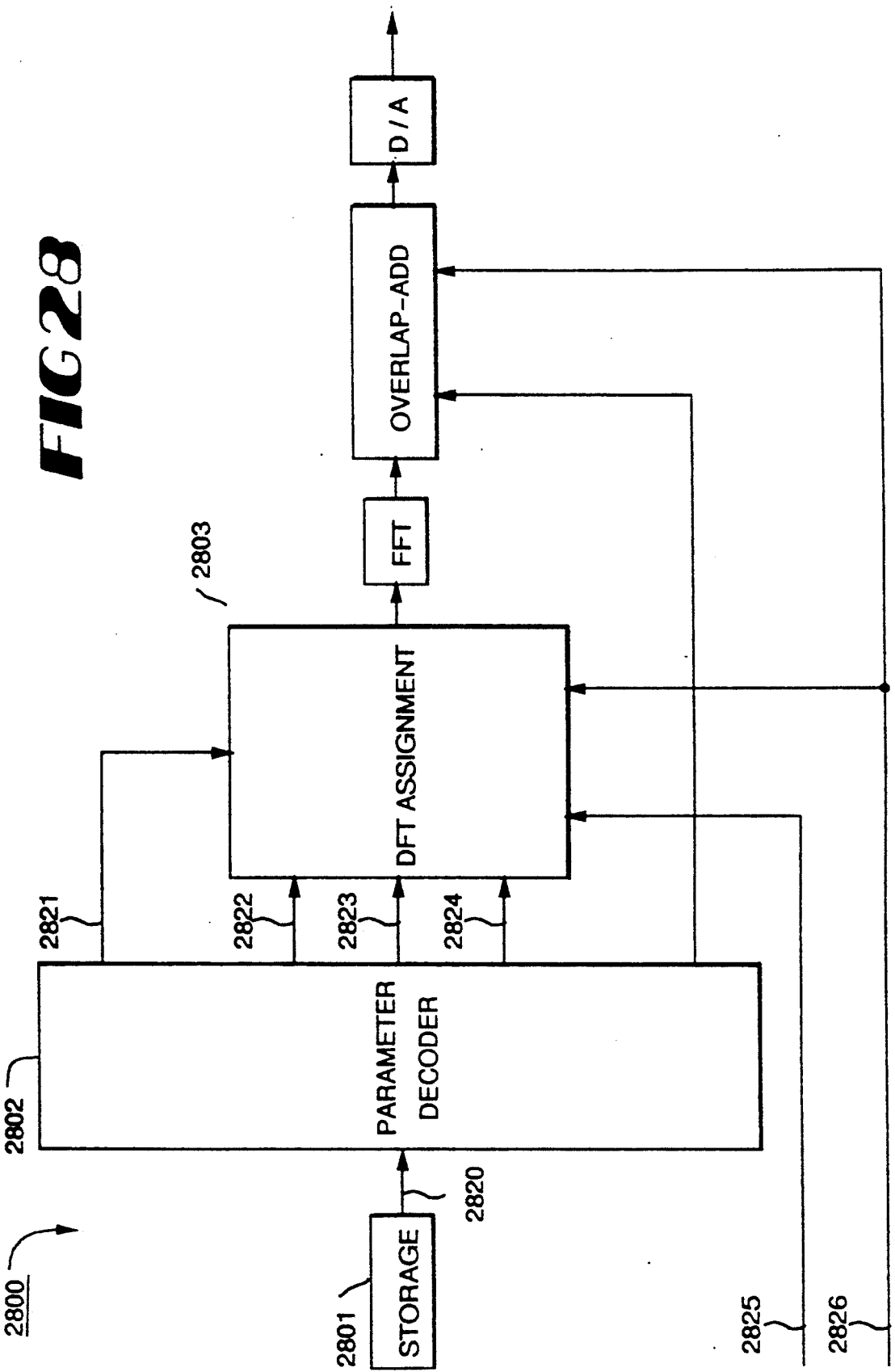
FIG. 28 is a system level block diagram of a musical tone synthesizer according to the present invention showing the required signal processing elements and their relationship to the flow of the information signals.

FIG. 28 illustrates a synthesizer embodiment of the present invention appropriate for the synthesis and modification of pitched musical tone signals. Music synthesizer 2800 of FIG. 28 responds to stored encoded quasi-harmonic sinusoidal model parameters previously determined by music signal analysis in order to produce a synthetic facsimile of the original analog signal or alternately synthetic speech advantageously modified in time- and/or frequency-scale. Parameter decoder 2802 responds to encoded parameters retrieved from storage element 2801 via path 2820 in a manner similar to parameter encoder 1702 to produce the time-varying gain sequence $\sigma[n]$ of Equation 8 (if calculated in analysis) and the fundamental frequency estimate $\omega_o^k$, quasi-harmonic model amplitudes $\{A_j^k\}$, differential frequencies $\{\Delta_j^k\}$ and phases $\{\phi_j^k\}$ used to generate a synthetic contribution according to Equation 45.

DFT assignment block 2803 responds to the fundamental frequency received via path 2821, the sets of quasi-harmonic model amplitudes, differential frequencies and phases received via paths 2822, 2823 and 2824 respectively, frequency-scale modification factor $\beta_k$ and time-scale modification factor $\rho_k$ received via paths 2825 and 2826, respectively, to produce a sequence $\hat{Z}[i]$ which may be used to construct a modified synthetic contribution using an FFT algorithm. The algorithm used in this block is identical to that of DFT assignment block 1704 of FIG. 17, with the following exception: The purpose of the excitation pulse constraint algorithm used to calculate time shifts $\delta^k$ and $\delta^{k+1}$ in DFT assignment block 1704 is that the algorithm is relatively insensitive to errors in fundamental frequency estimation resulting in an estimate which is the actual fundamental multiplied or divided by an integer factor.

However, for the case of pitched musical tones, such considerations are irrelevant since the fundamental frequency is approximately known a priori. Therefore, a simpler constraint may be invoked to determine appropriate time shifts. Specifically, denoting the phase terms of the sinusoids in Equation 56 by $\hat{\Phi}_j^k[n]$ and $\hat{\Phi}_j^{k+1}[n]$ respectively, where $$\hat{\Phi}_j^k[n] = j\beta_k \omega_o^k(n + \delta^k) + \frac{\Delta_j^k n}{\rho_k} + \phi_j^k \tag{92}$$

$$\hat{\Phi}_j^{k+1}[n] = j\beta_{k+1} \omega_o^{k+1}(n + \delta^{k+1}) + \frac{\Delta_j^{k+1} n}{\rho_k} + \phi_j^{k+1},$$

and denoting the unmodified phase terms from Equation 45 as $\phi_j^k[n]$ and $\phi_j^{k+1}[n]$, a reasonable constraint on the phase behavior of corresponding components from each synthetic contribution is to require that the differential between the unmodified phase terms at the center of the unmodified synthesis frame match the differential between the modified phase terms at the modified frame center. Formally, this requirement is given by $$\hat{\Phi}_j^{k+1}[-\rho_k N_s/2] - \hat{\Phi}_j^k[\rho_k N_s/2] = \Phi_j^{k+1}[-N_s/2] - \Phi_j^k[N_s/2], \text{ for all } j. \tag{93}$$

Solving this equation for $\delta^{k+1}$ using the phase functions just defined yields the recursion $$\delta^{k+1} = \frac{\beta_k \omega_o^k}{\beta_{k+1} \omega_o^{k+1}} (\delta^k + (\rho_k - 1/\beta_k)N_s/2) + (\rho_k - 1/\beta_{k+1})N_s/2. \tag{94}$$

Note that there is no dependence on j in this recursion, verifying that $\delta^{k+1}$ is a global time shift that needs to be calculated only once per frame. Furthermore, there is no dependence on the pitch onset time estimate $\tau_p^k$ as in DFT assignment block 1704; therefore, pitch onset time estimation as in speech synthesizer 1700 is not required for music synthesizer 2800. All other algorithmic components of music synthesizer 2800 and their structural relationships are identical to those of speech synthesizer 1700.

Figure 29:
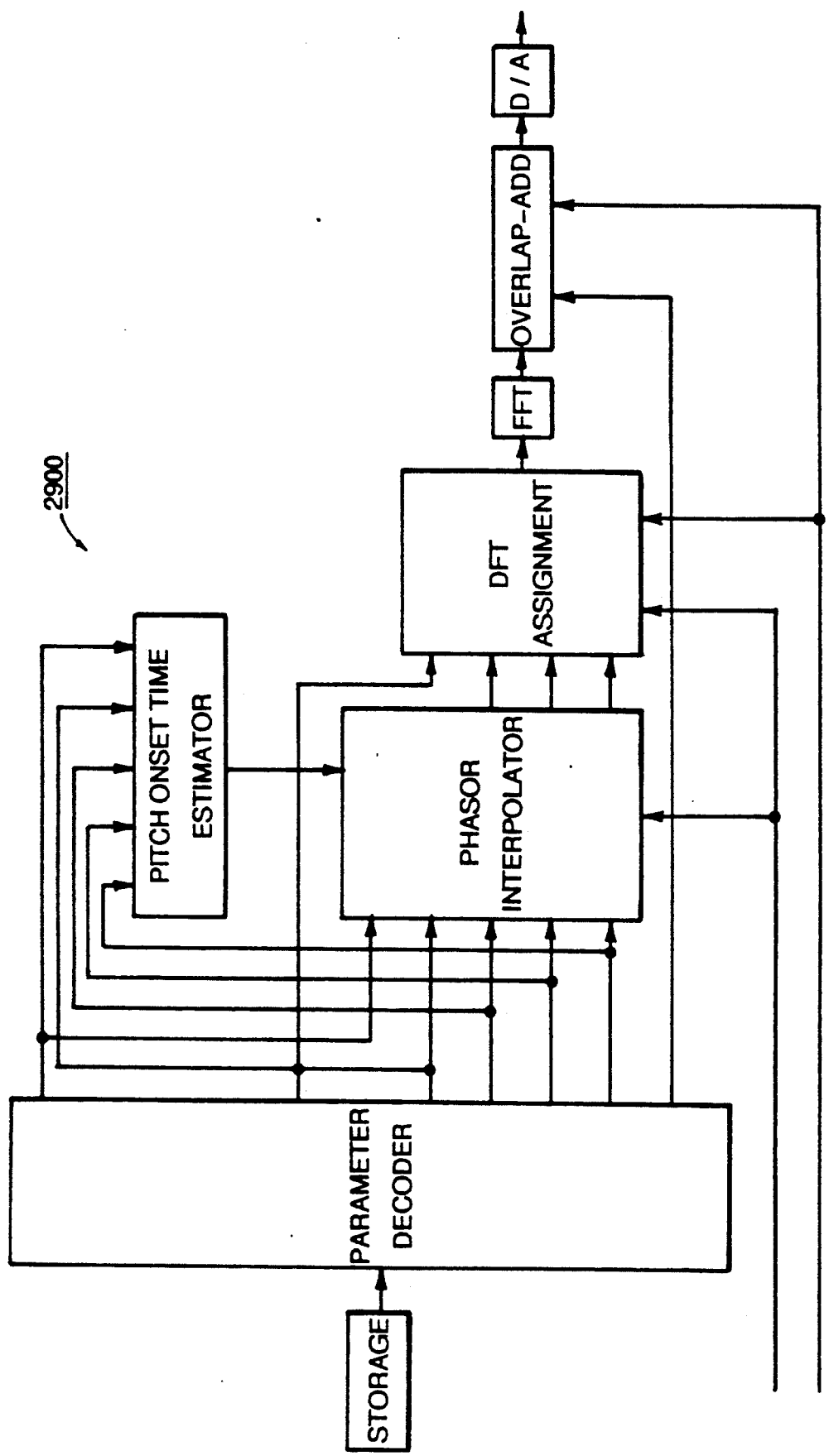
FIG. 29 is a system level block diagram of a musical tone synthesizer according to the present invention similar in operation to the musical tone synthesizer of FIG. 28 but which is capable of performing time- and pitch-scale modifications.

A second version of a music synthesizer capable of performing time- and pitchscale modification on previously analyzed musical tone signals is illustrated in FIG. 29. Music synthesizer 2900 operates identically to speech synthesizer 2500, with the exception that the time shift parameters used in modification synthesis are calculated according to Equation 94.

Figure 30:
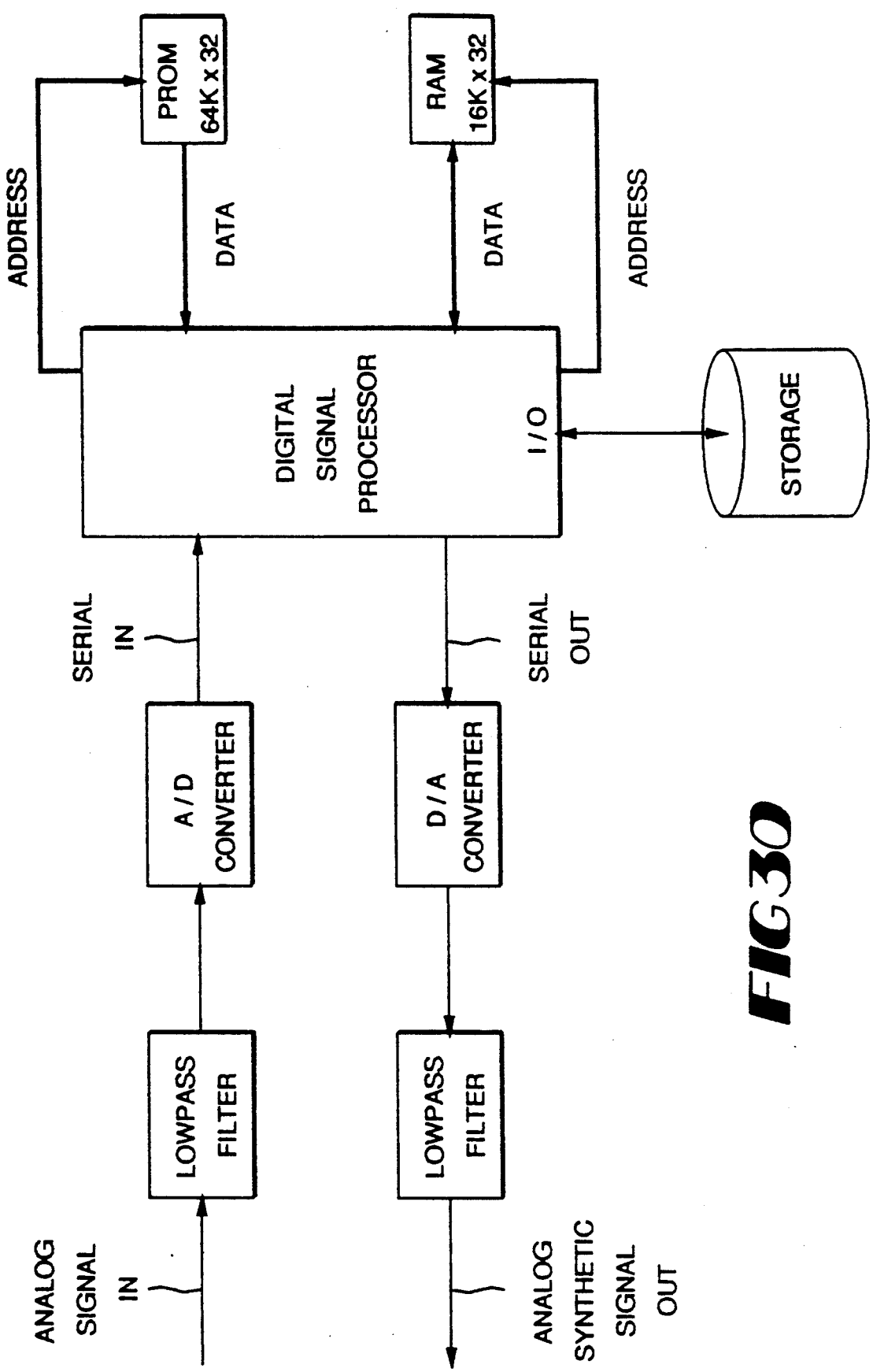
FIG. 30 is a system level block diagram showing the architecture of a microprocessor implementation of the audio synthesis system of the present invention.
Figure 3:
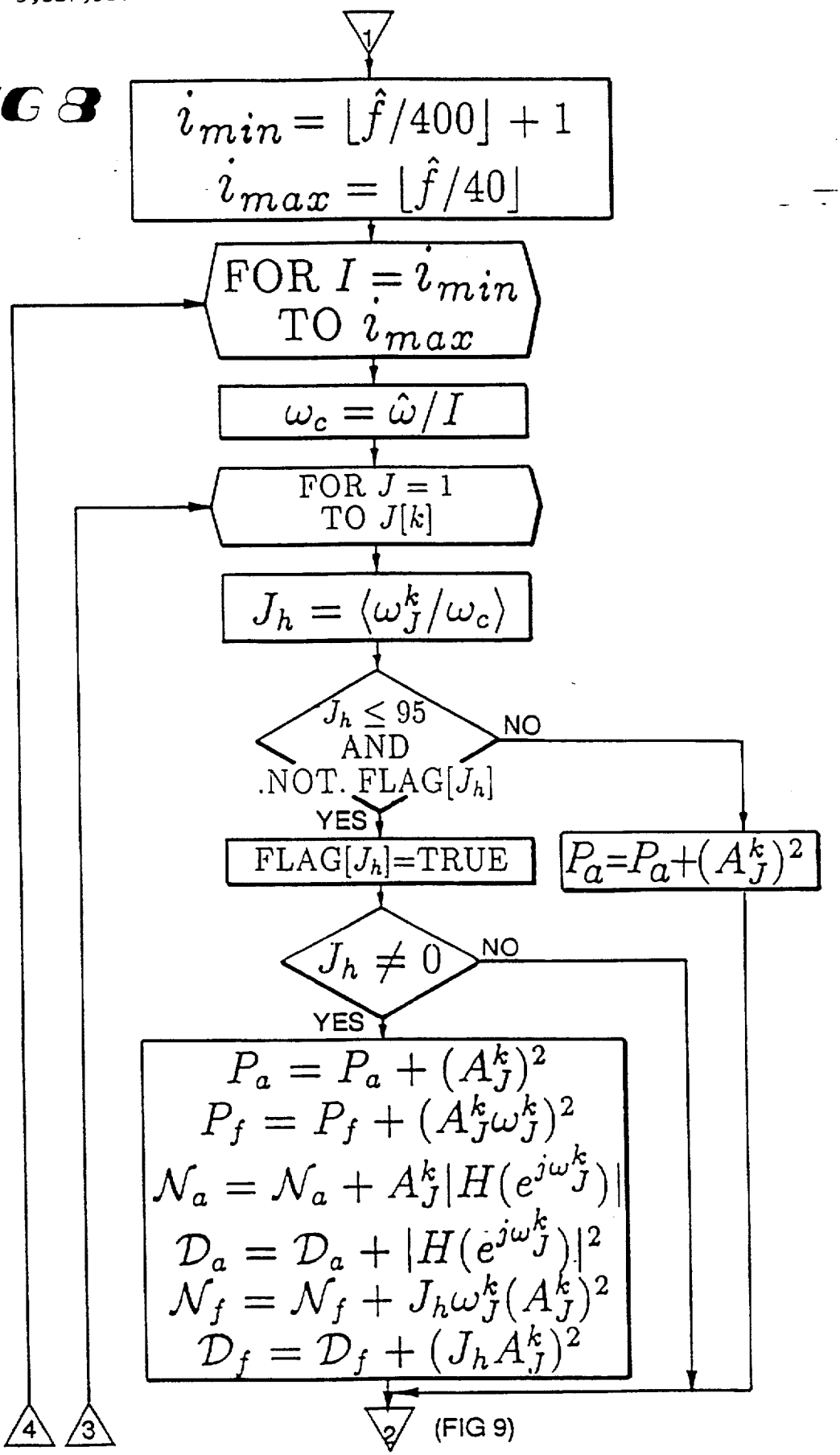
Figure 11:
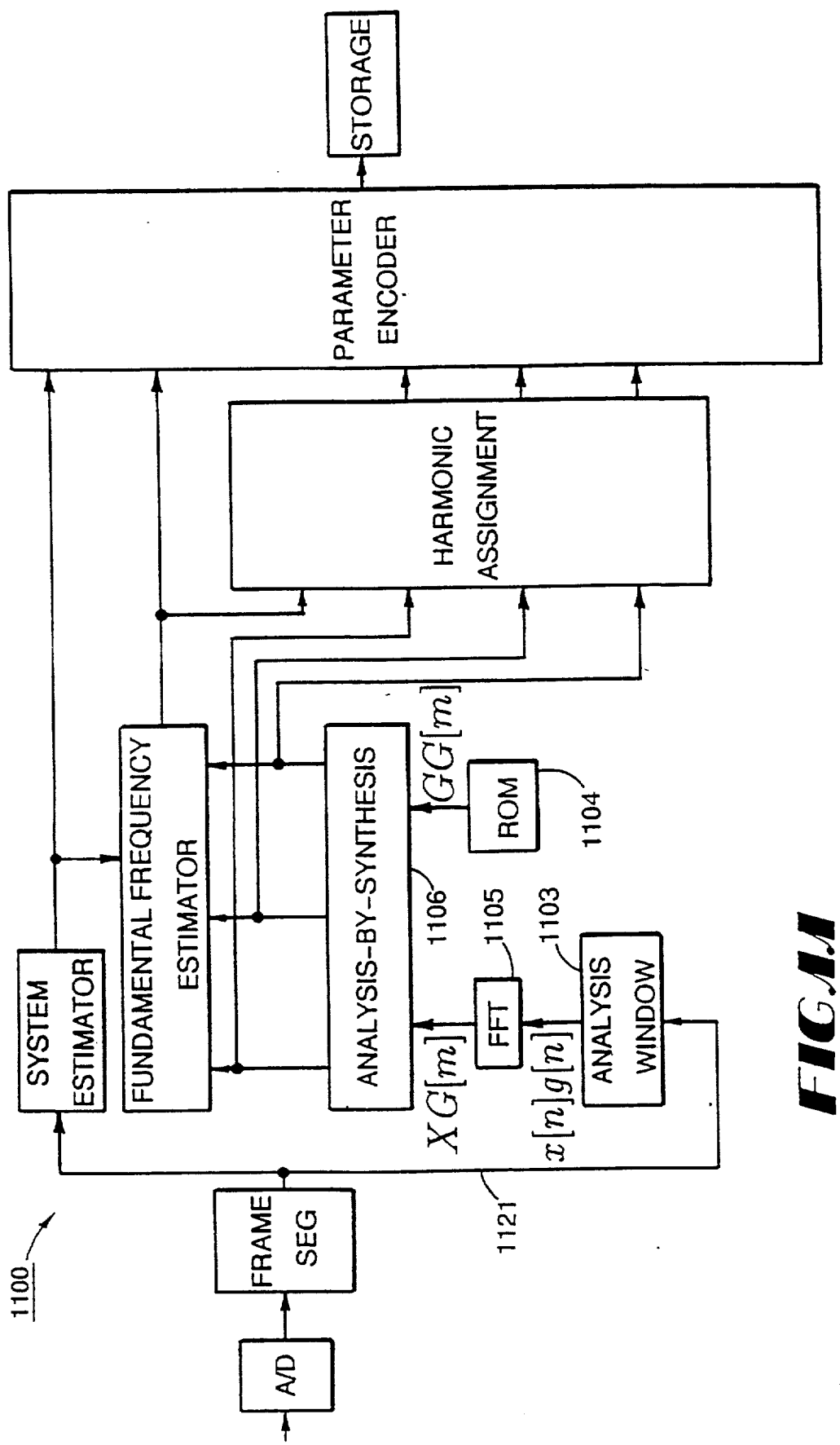
Figure 12:
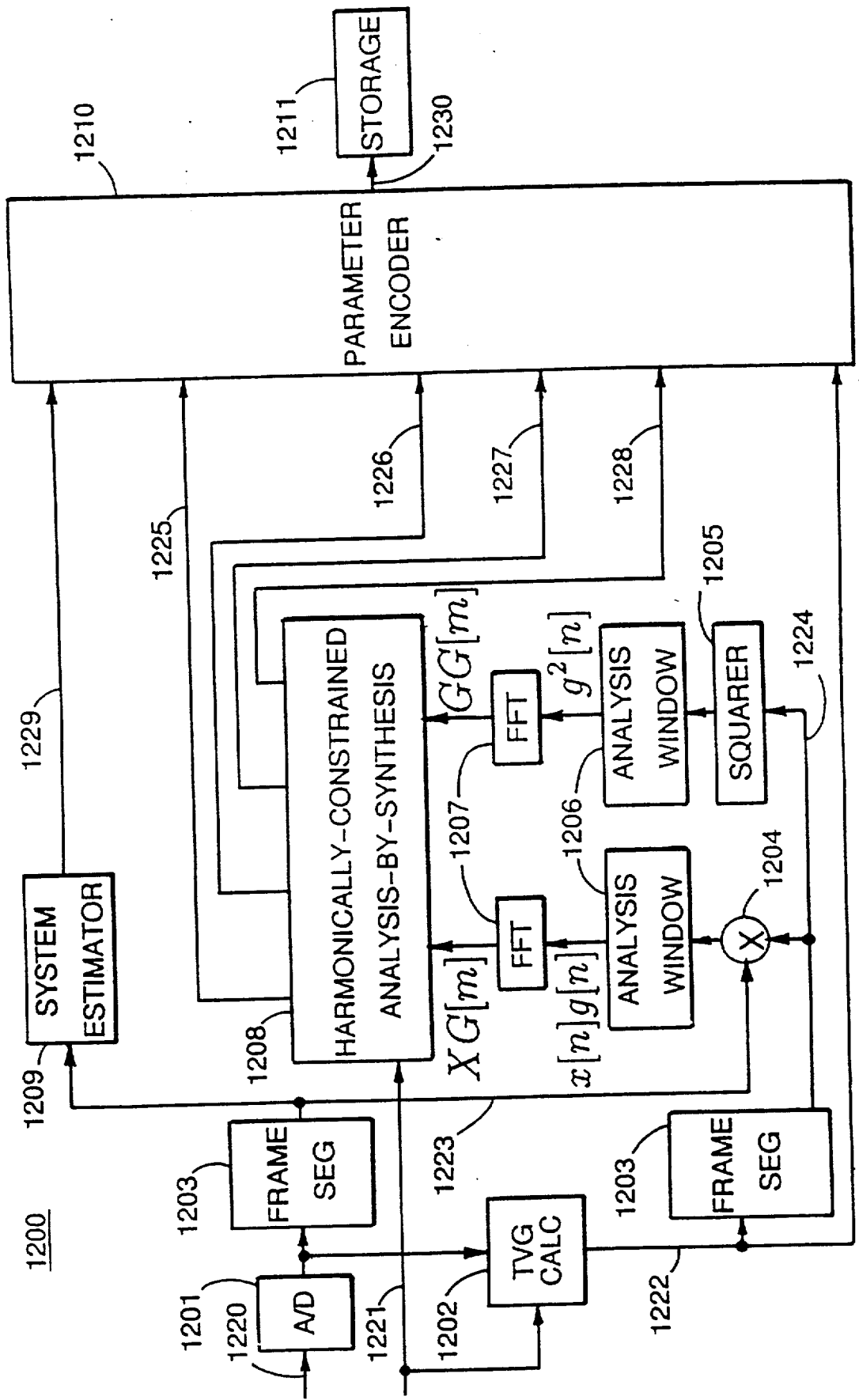
Figure 15:
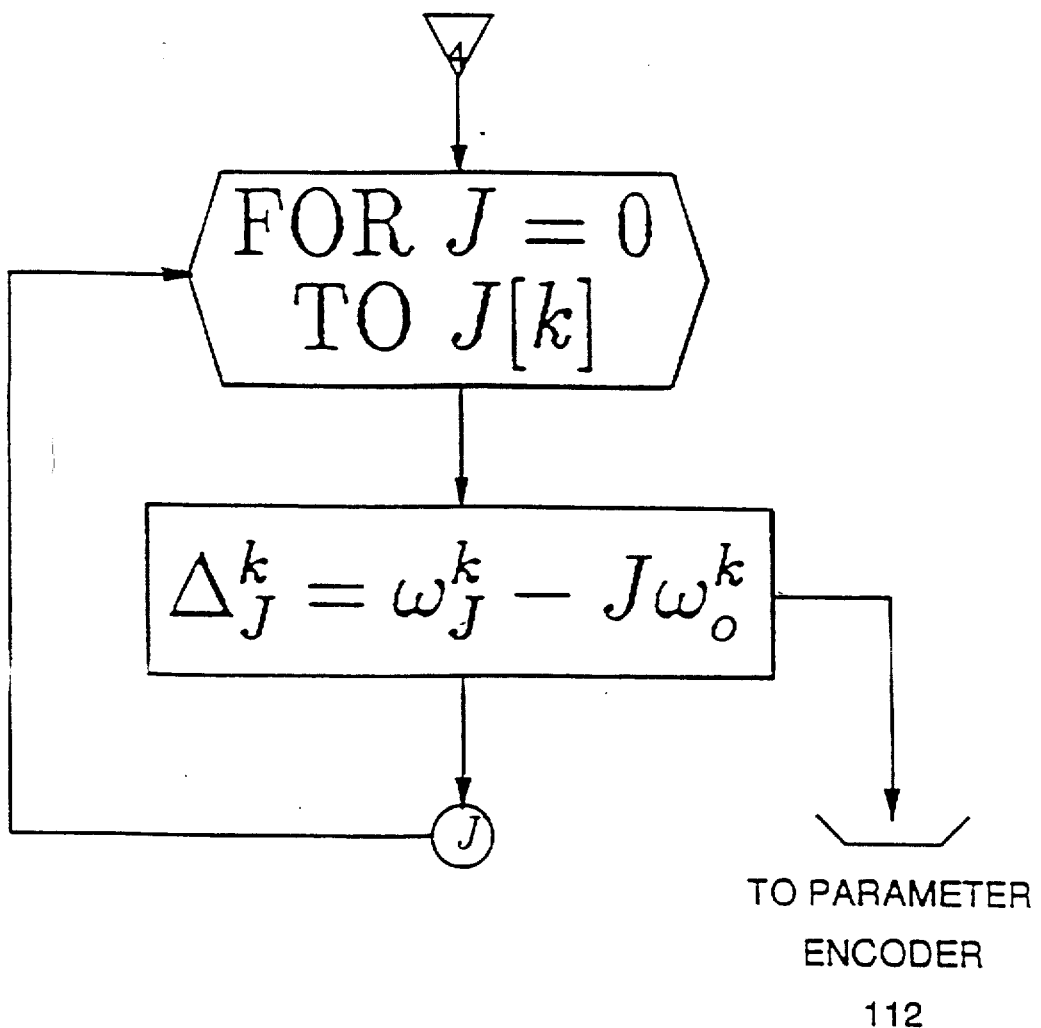
Figure 16:
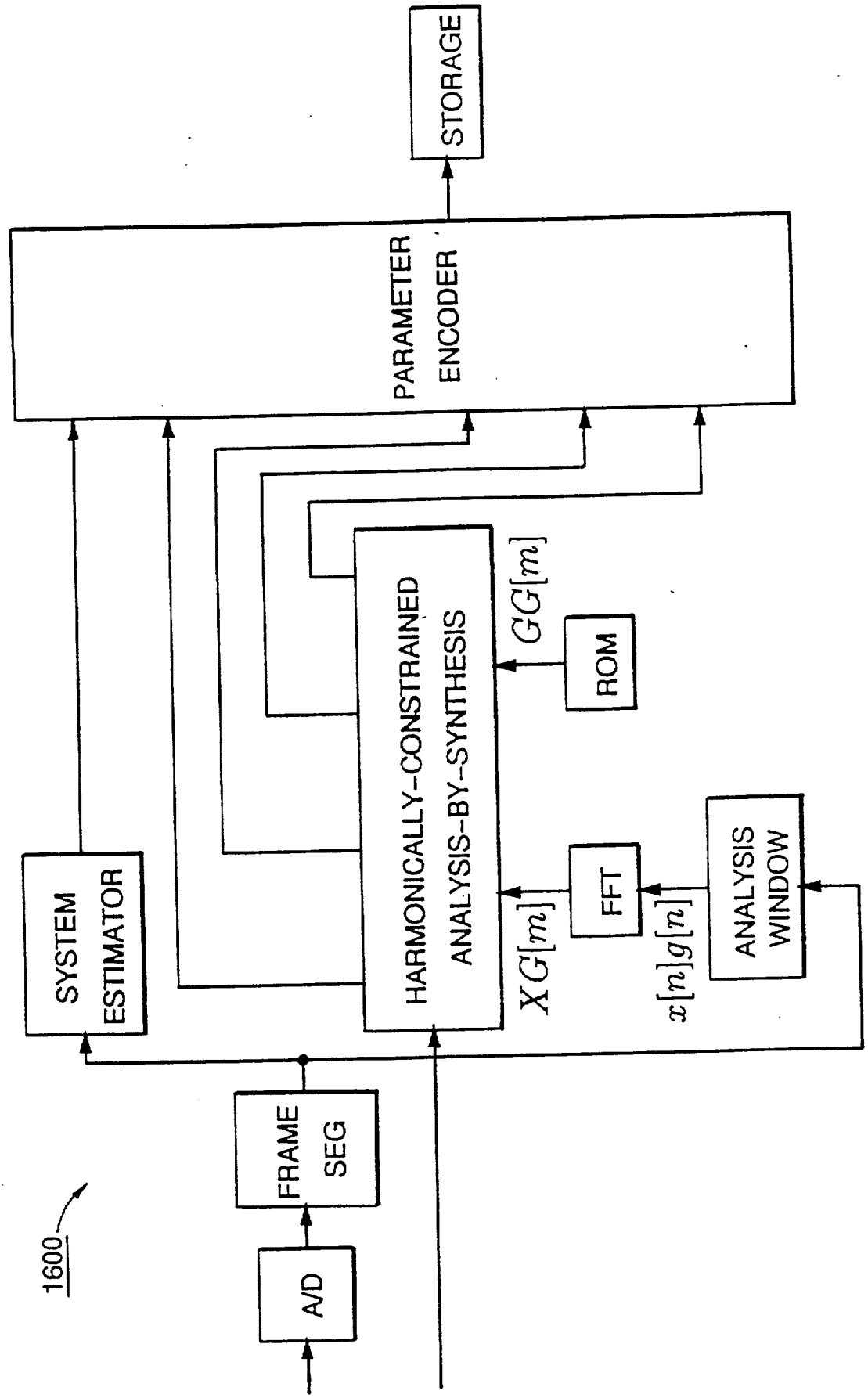
Figure 21:
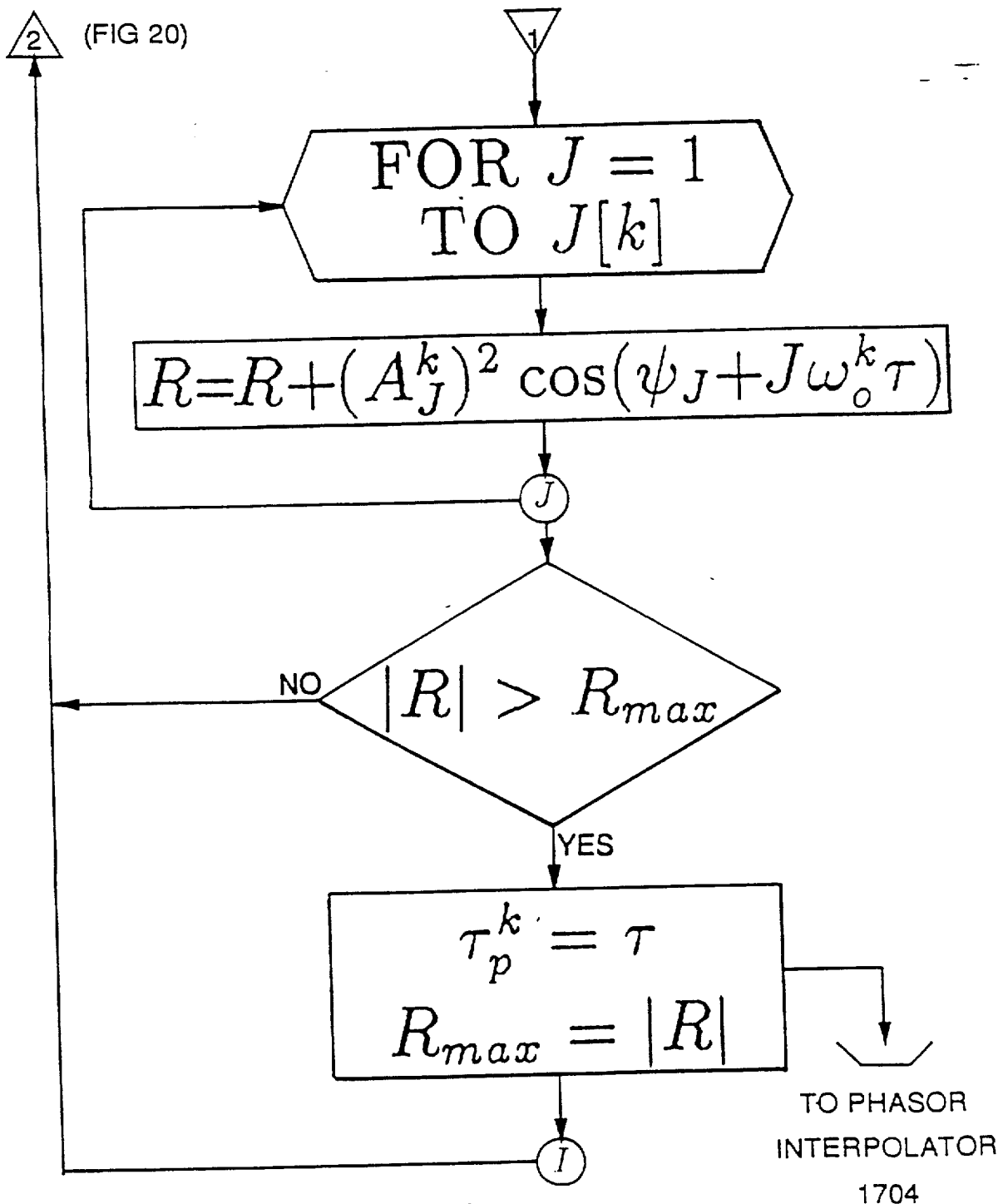
Figure 24:
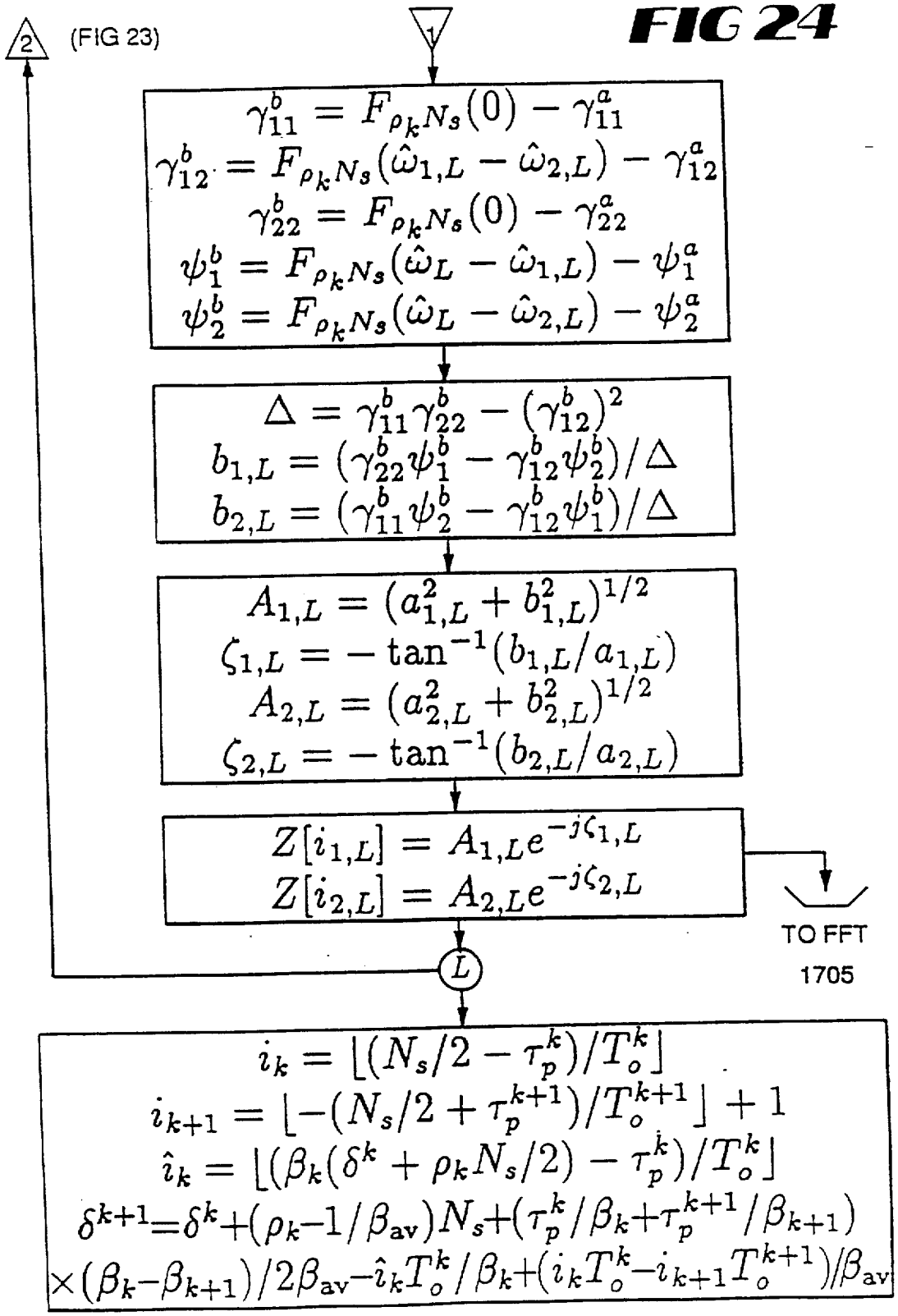
Figure 26:
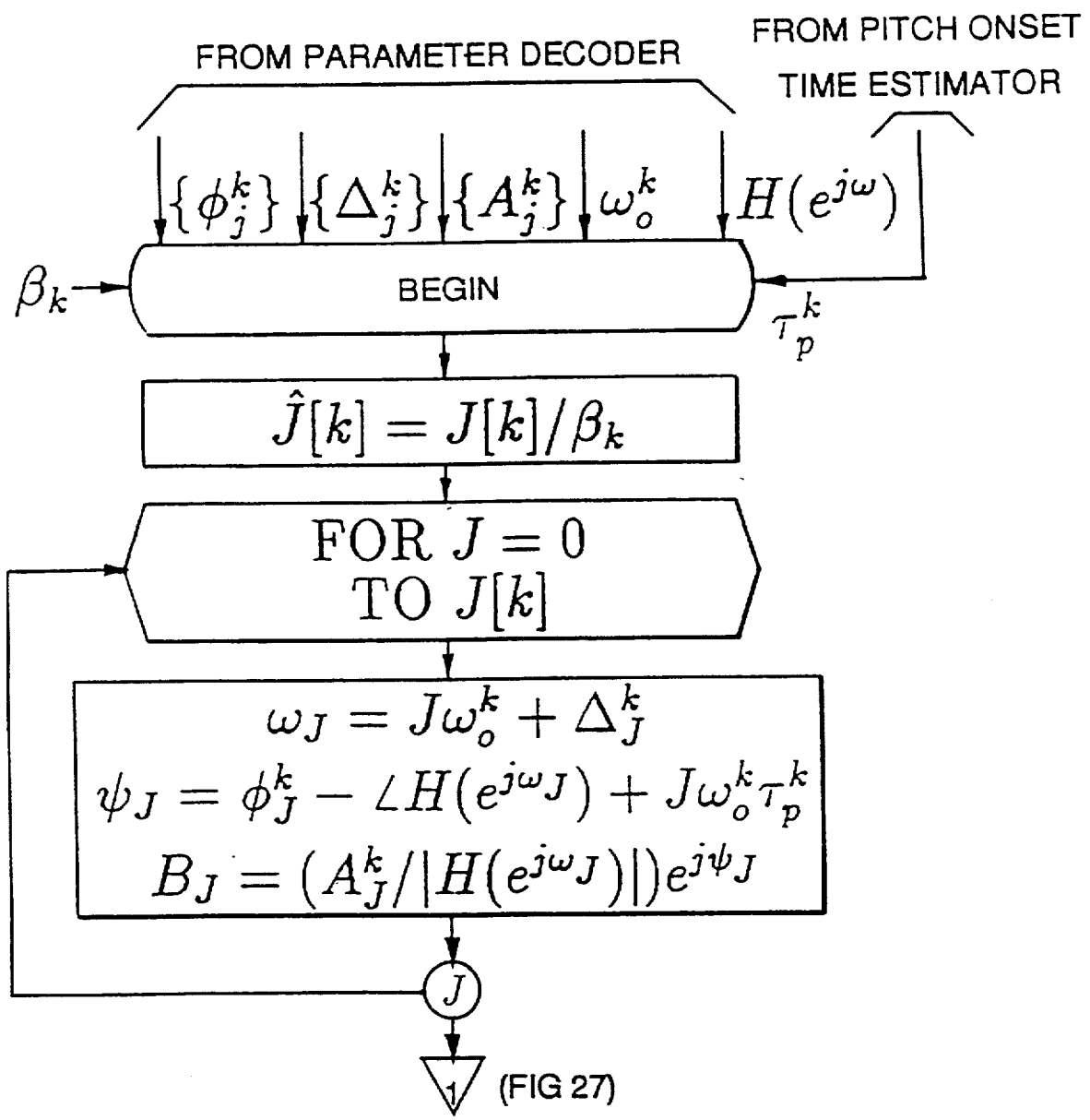

The architecture of a possible implementation of an audio analysis/synthesis system using a general purpose digital signal processing microprocessor is illustrated in FIG. 30. It should be noted that this implementation is only one of many alternative embodiments that will be readily apparent to those skilled in the art. For example, certain subgroups of the algorithmic components of the various systems may be implemented in parallel using application-specific IC's (ASIC's), standard IC's, or discrete components.

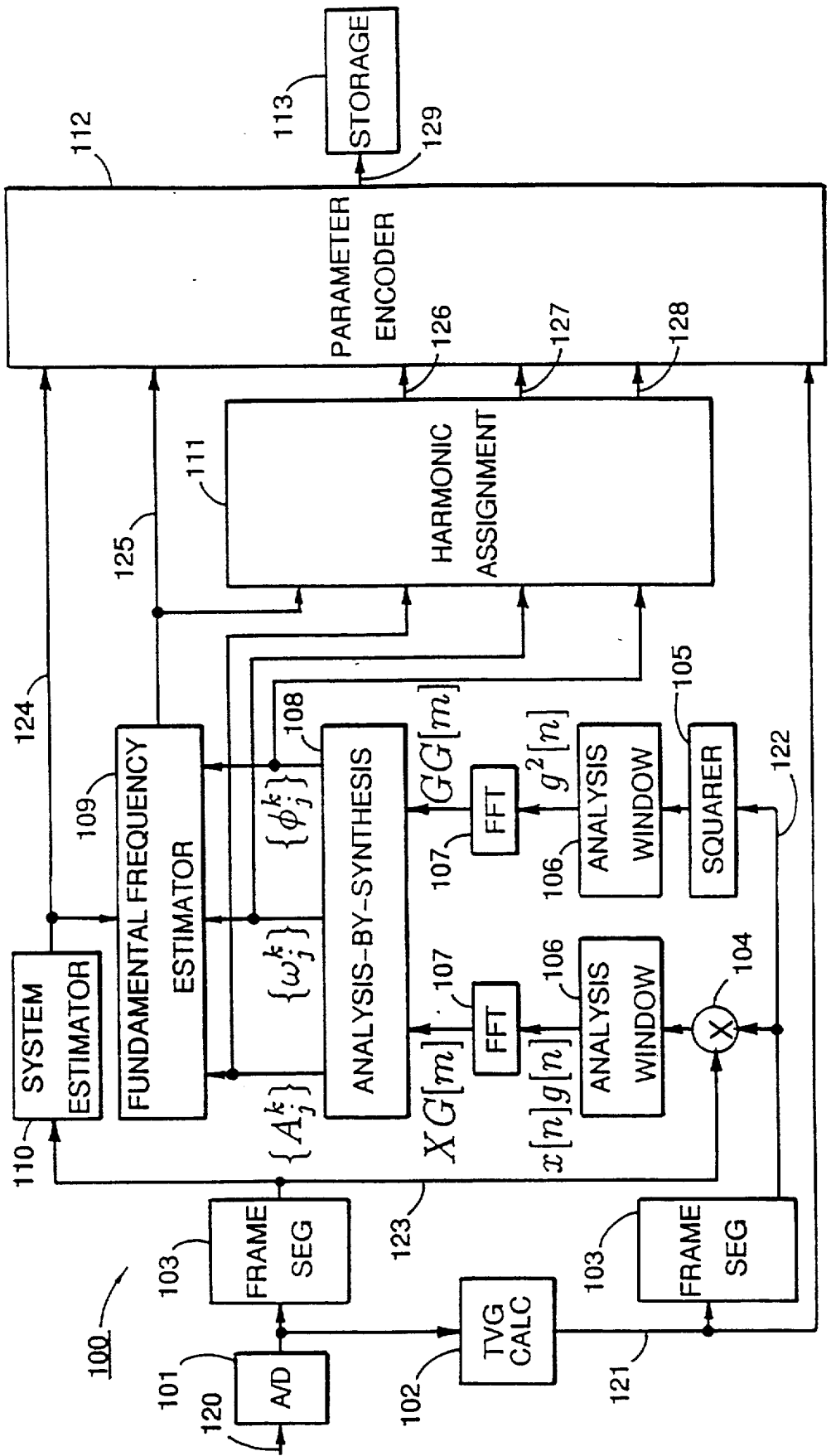

What we claim is:

1. A method of extracting a set of parameters representative of input speech signals representing speech from a human vocal tract, the vocal tract having a frequency response capable of representation as a set of coefficients, such that artifact-free, modified synthetic speech signals can be generated from said parameters, comprising the steps of:

(a) digitizing the input speech signals into a speech data stream;

(b) isolating a sequence of overlapping speech data frames from the speech data stream, each of said speech data frames having a fundamental frequency;

(c) analyzing the sequence of overlapping speech data frames to produce a corresponding sequence of coefficient sets representative of an estimate of the frequency response of the human vocal tract;

(d) multiplying each of the overlapping speech data frames by an analysis window function to create a corresponding sequence of windowed data frames;

(e) calculating the discrete Fourier transform of each of the windowed data frames to produce a corresponding sequence of transformed data frames;

(f) approximating the corresponding sequence of overlapping speech data frames with a sequence of sinusoidal parameter sets using a first iterative analysis-by-synthesis means responsive to the sequence of transformed data frames and a discrete Fourier transform of the analysis window function;

(g) analyzing the sequence of sinusoidal parameter sets and the corresponding sequence of coefficient sets with a fundamental frequency estimator means to produce a sequence of estimates of the fundamental frequency of the corresponding overlapping speech data frames; and (h) analyzing the sequence of fundamental frequency estimates and the corresponding sequence of sinusoidal parameter sets with a harmonic assignment means to produce a sequence of quasi-harmonic sinusoidal model parameter sets;

the set of parameters representative of the input speech signals comprising the sequence of coefficient sets representative of the estimate of the frequency response of the human vocal tract, the sequence of estimates of the fundamental frequency, and the sequence of quasi-harmonic sinusoidal model parameter sets.

2. The method of claim 1 wherein each of the quasi-harmonic sinusoidal model parameter sets comprises a set of amplitudes, a corresponding set of frequencies, and a corresponding set of phases.

3. A method of extracting a set of parameters representative of input speech signals having a time-varying average magnitude and representing speech from a human vocal tract, the vocal tract having a frequency response capable of representation as a set of coefficients, such that artifact-free, modified synthetic speech signals can be generated from said parameters, comprising the steps of:

(a) digitizing the input speech signals into a speech data stream having a time-varying average magnitude;

(b) isolating a sequence of overlapping speech data frames from the speech data stream, each of said speech data frames having a fundamental frequency;

(c) analyzing the sequence of overlapping speech data frames to produce a corresponding sequence of coefficient sets representative of an estimate of the frequency response of the human vocal tract;

(d) calculating an envelope stream reflective of the time-varying average magnitude from the speech data stream;

(e) isolating a sequence of overlapping envelope data frames from the envelope stream;

(f) multiplying each one of the sequence of overlapping envelope data frames with a corresponding one of the sequence of overlapping speech data frames to produce a corresponding sequence of first product frames;

(g) squaring each of the overlapping envelope data frames to produce a corresponding sequence of squared envelope data frames;

(h) multiplying each one of the sequence of first product frames by an analysis window function to produce a corresponding sequence of second product frames;

(i) multiplying each one of the sequence of squared envelope data frames by an analysis window function to produce a corresponding sequence of third product frames;

(j) calculating the discrete Fourier transform of each of the sequence of second product frames to produce a sequence of first transform frames;

(k) calculating the discrete Fourier transform of each of the sequence of third product frames to produce a sequence of second transform frames;

(l) approximating the corresponding sequence of overlapping speech data frames with a sequence of sinusoidal parameter sets produced from a first iterative analysis-by-synthesis means responsive to the sequence of first transform frames and the sequence of second transform frames;

(m) analyzing the sequence of sinusoidal parameter sets and the corresponding sequence of coefficient sets with a fundamental frequency estimator means to produce a sequence of estimates of the fundamental frequency of the corresponding overlapping speech data frames; and (n) analyzing the sequence of estimates of the fundamental frequency and the corresponding sequence of sinusoidal parameter sets with a harmonic assignment means to produce a sequence of quasi-harmonic sinusoidal model parameter sets;

the set of parameters representative of the input speech signals comprising the sequence of coefficient sets representative of the estimate of the frequency response of the human vocal tract, the sequence of estimates of the fundamental frequency, the sequence of quasi-harmonic sinusoidal model parameter sets, and the envelope stream.

4. The method of claim 3 wherein each of the quasi-harmonic sinusoidal model parameter sets comprises a set of amplitudes, a corresponding set of frequencies, and a corresponding set of phases.

5. A method of extracting a set of parameters representative of input musical tone signals having a time-varying average magnitude and a nominal expected pitch frequency, such that artifact-free, modified synthetic musical tones can be generated from said parameters, comprising the steps of:

(a) digitizing the input musical tone signals into a musical tone data stream having a time-varying average magnitude;

(b) isolating a sequence of overlapping musical tone data frames from the musical tone data stream, each of the musical tone data frames having a fundamental frequency;

(c) calculating an envelope stream reflective of the time-varying changes in the average magnitude of the musical tone from the musical tone data stream and the nominal expected pitch frequency;

(d) isolating a sequence of overlapping envelope data frames from the envelope stream;

(e) multiplying each one of the sequence of overlapping envelope data frames with a corresponding one of the sequence of overlapping musical tone data frames to produce a corresponding sequence of first product frames;

(f) squaring each of the overlapping envelope data frames to produce a corresponding sequence of squared envelope data frames;

(g) multiplying each one of the sequence of first product frames by an analysis window function to produce a corresponding sequence of second product frames;

(h) multiplying each one of the sequence of squared envelope data frames by an analysis window function to produce a corresponding sequence of third product frames;

(i) calculating the discrete Fourier transform of each of the sequence of second product frames to produce a sequence of first transform frames;

(j) calculating the discrete Fourier transform of each of the sequence of third product frames to produce a sequence of second transform frames;

(k) analyzing the sequence of first transform frames, the sequence of second transform frames, and the nominal expected pitch frequency with a harmonically constrained iterative analysis-by-synthesis means to produce a sequence of quasi-harmonic sinusoidal parameter sets that approximate the corresponding sequence of overlapping musical tone data frames, each of the quasi-harmonic sinusoidal parameter sets having a spectral envelope, and a sequence of fundamental frequency estimates of the corresponding overlapping musical tone data frames; and (l) analyzing the sequence of overlapping musical tone data frames with a system estimator means to produce a sequence of coefficient sets representative of the spectral envelope of the quasi-harmonic sinusoidal model parameters;

the set of parameters representative of the input musical tone signals comprising the envelope stream reflective of the time-varying changes in the average magnitude of the input musical tone signals; the sequence of sets of coefficients representative of the spectral envelope of the quasi-harmonic sinusoidal model parameters; the sequence of fundamental frequency estimates; and the sequence of sets of sinusoidal parameters that approximate the corresponding sequence of overlapping musical tone data frames.

6. The method of claim 5 wherein each of the quasi-harmonic sinusoidal model parameter sets comprises a set of amplitudes, a corresponding set of frequencies, and a corresponding set of phases.

7. A method of extracting a set of parameters representative of input musical tone signals having a nominal expected pitch frequency, such that artifact-free, modified synthetic musical tones can be generated from said parameters, comprising the steps of:

(a) digitizing the input musical tone signals into a musical tone data stream;

(b) isolating a sequence of overlapping musical tone data frames from the musical tone data stream;

(c) multiplying each one of the sequence of overlapping musical tone data frames with an analysis window function to produce a corresponding sequence of first product frames;

(d) calculating the discrete Fourier transform of each of the sequence of first product frames to produce a sequence of first transform frames;

(e) producing a sequence of sets of sinusoidal parameters that approximate the corresponding sequence of overlapping musical tone data frames and a sequence of fundamental frequency estimates from a first harmonically constrained iterative analysis-by-synthesis means responsive to the sequence of first transform frames, a discrete Fourier transform of the analysis window function, and the nominal expected pitch frequency; and (f) analyzing the sequence of overlapping musical tone data frames with a system estimator means to produce a sequence of coefficient sets representative of the spectral envelope of the quasi-harmonic sinusoidal model parameters;

the set of parameters representative of the input musical tone signals comprising the sequence of sets of coefficients representative of the spectral envelope of the quasi-harmonic sinusoidal model parameters; the sequence of fundamental frequency estimates; and the sequence of sets of sinusoidal parameters that approximate the corresponding sequence of musical tone data frames.

8. The method of claim 7 wherein each of the quasi-harmonic sinusoidal model parameter sets comprises a set of amplitudes, a corresponding set of frequencies, and a corresponding set of phases.

9. A method of synthesizing artifact-free modified speech signals from a parameter set, a sequence of frequency-scale modification factors and a sequence of time-scale modification factors, the parameter set comprising a sequence of coefficient sets representative of a sequence of estimates of the frequency response of a human vocal tract, a corresponding sequence of estimates of a fundamental frequency, and a corresponding sequence of quasi-harmonic sinusoidal model parameter sets;

each one of the estimates of a fundamental frequency and the corresponding quasi-harmonic sinusoidal model parameter set comprising a representation of one of a sequence of overlapping speech data frames;

the method comprising the steps of:

(a) estimating, with a pitch onset time estimator means responsive to the sequence of coefficient sets, the sequence of estimates of a fundamental frequency, and the sequence of quasi-harmonic sinusoidal model parameter sets, a sequence of excitation times relative to the centers of each one of the corresponding overlapping speech data frames in the sequence of speech data frames at which an excitation pulse occurs;

(b) generating a frequency-domain sequence of data frames from a discrete Fourier transform assignment means responsive to the sequence of excitation times, the corresponding sequence of quasi-harmonic sinusoidal model parameter sets, the sequence of frequency-scale modification factors, the sequence of estimates of a fundamental frequency, and the sequence of time-scale modification factors;

(c) transforming the frequency-domain sequence of data frames with an inverse discrete Fourier transform means to produce a time-domain sequence of data frames;

(d) generating a contiguous sequence of speech data representative of the modified speech signal from an overlap-add means responsive to the time-domain sequence of data frames and the sequence of time-scale modification factors; and (e) converting the contiguous sequence of speech data into an analog signal using a digital-to-analog converter means to produce the modified speech signal.

10. The method of claim 9 wherein the parameter set further comprises an envelope stream representative of time-varying average magnitude, the sequence of overlapping speech data frames is further represented by the envelope stream, and the overlap-add means is additionally responsive to the envelope stream.

11. A method of synthesizing artifact-free modified speech signals from a parameter set, a sequence of pitch-scale modification factors and a sequence of time-scale modification factors, the parameter set comprising a sequence of coefficient sets representative of a sequence of estimates of the frequency response of a human vocal tract, a corresponding sequence of estimates of a fundamental frequency, and a corresponding sequence of unmodified quasi-harmonic sinusoidal model parameter sets;

each one of the estimates of a fundamental frequency and the corresponding quasi-harmonic sinusoidal model parameter set comprising a representation of one of a sequence of overlapping speech data frames;

the method comprising the steps of:

(a) estimating, with a pitch onset time estimator means responsive to the sequence of coefficient sets, the sequence of estimates of a fundamental frequency, and the sequence of unmodified quasi-harmonic sinusoidal model parameter sets, a sequence of excitation times relative to the centers of each one of the corresponding overlapping speech data frames in the sequence of speech data frames at which an excitation pulse occurs;

(b) generating a sequence of modified quasi-harmonic sinusoidal model parameter sets with a phasor interpolator means responsive to the sequence of excitation times, the sequence of pitch-scale modification factors, the sequence of estimates of the fundamental frequency, the sequence of coefficient sets, and the sequence of unmodified quasi-harmonic sinusoidal model parameter sets, each of the modified quasi-harmonic sinusoidal model parameter sets comprising a set of modified amplitudes, a corresponding set of modified frequencies, and a corresponding set of modified phases;

(c) generating a frequency-domain sequence of data frames from a discrete Fourier transform assignment means responsive to the sequence of excitation times, the corresponding sequence of modified quasi-harmonic sinusoidal model parameter sets, the sequence of pitch-scale modification factors, the sequence of estimates of a fundamental frequency, and the sequence of time-scale modification factors;

(d) transforming the frequency-domain sequence of data frames with an inverse discrete Fourier transform means to produce a time-domain sequence of data frames;

(e) generating a contiguous sequence of speech data representative of the modified speech signal from an overlap-add means responsive to the time-domain sequence of data frames and the sequence of time-scale modification factors; and (f) converting the contiguous sequence of speech data into an analog signal using a digital-to-analog converter means to produce the modified speech signal.

12. The method of claim 11 wherein the parameter set further comprises an envelope stream representative of time-varying average magnitude, and the overlap-add means is additionally responsive to the envelope stream.

13. A method of synthesizing artifact-free modified musical tone signals from a parameter set, a sequence of frequency-scale modification factors, and a sequence of time-scale modification factors;

the parameter set comprising a sequence of fundamental frequency estimates and a sequence of quasi-harmonic sinusoidal model parameter sets;

the method comprising the steps of:

(a) generating a frequency-domain sequence of data frames from a discrete Fourier transform assignment means responsive to the sequence of fundamental frequency estimates, the corresponding sequence of quasi-harmonic sinusoidal model parameter sets, the sequence of frequency-scale modification factors, and the sequence of time-scale modification factors;

(b) transforming the frequency-domain sequence of data frames with an inverse discrete Fourier transform means to produce a time-domain sequence of data frames;

(c) generating a contiguous sequence of music data representative of the modified musical tone signals from an overlap-add means responsive to the time-domain sequence of data frames and the sequence of time-scale modification factors; and (d) converting the contiguous sequence of music data into an analog signal using a digital-to-analog converter means to produce the modified musical tone signal.

14. The method of claim 13 wherein the parameter set further comprises an envelope stream representative of time-varying average magnitude, and the overlap-add means is additionally responsive to the envelope stream.

15. A method of synthesizing artifact-free modified musical tone signals from a parameter set, a sequence of pitch-scale modification factors and a sequence of time-scale modification factors, the parameter set comprising, a sequence of coefficient sets representative of a sequence of estimates of a spectral envelope, a corresponding sequence of estimates of a fundamental frequency, and a corresponding sequence of unmodified quasi-harmonic sinusoidal model parameter sets;

each one of the estimates of a fundamental frequency and the corresponding quasi-harmonic sinusoidal model parameter set comprising a representation of one of a sequence of overlapping musical tone data frames;

the method comprising the steps of:
(a) estimating, with a pitch onset time estimator means responsive to the sequence of coefficient sets, the sequence of estimates of a fundamental frequency, and the sequence of unmodified quasi-harmonic sinusoidal model parameter sets, a sequence of excitation times relative to the centers of each one of the corresponding musical tone data frames in the sequence of musical tone data frames at which an excitation pulse occurs;
(b) generating a sequence of modified quasi-harmonic sinusoidal model parameter sets with a phasor interpolator means responsive to the sequence of excitation times, the sequence of pitch-scale modification factors the sequence of estimates of the fundamental frequency, the sequence of coefficient sets and the sequence of unmodified quasi-harmonic sinusoidal model parameter sets;
(c) generating a frequency-domain sequence of data frames from a discrete Fourier transform assignment means responsive to the sequence of modified quasi-harmonic sinusoidal model parameter sets, the sequence of pitch-scale modification factors, the sequence of estimates of a fundamental frequency, and the sequence of time-scale modification factors;
(d) transforming the frequency-domain sequence of data frames with an inverse discrete Fourier transform means to produce a time-domain sequence of data frames;
(e) generating a contiguous sequence of musical data representative of the modified musical tone signal from an overlap-add means responsive to the time-domain sequence of data frames and the sequence of time-scale modification factors; and
(f) converting the contiguous sequence of musical data into an analog signal using a digital-to-analog converter means to produce the modified musical tone signal.

16. The method of claim 15 wherein the parameter set further comprises an envelope stream representative of time-varying average magnitude, and the overlap-add means is additionally responsive to the envelope stream.

17. An apparatus for analyzing a stream of digital signals representing a speech waveform, the speech waveform having characteristics including a frequency response of a human vocal tract; the apparatus comprising:
(a) frame segmenting means responsive to the stream of digital signals for segmenting the stream of digital signals into a sequence of overlapping speech data frames;
(b) system estimator means responsive to the sequence of overlapping speech data frames for producing a sequence of coefficient sets representative of a sequence of estimates of the frequency response of the human vocal tract;
(c) analysis windowing means characterized by an analysis window function and responsive to the sequence of overlapping speech data frames for producing a sequence of windowed data frames;
(d) discrete Fourier transform means responsive to the windowed data frames for producing a sequence of transformed data frames;
(e) a first memory means for storing and retrieving a sequence of precomputed data representative of the discrete Fourier transform of the window function;
(f) iterative analysis-by-synthesis means responsive to the sequence of transformed data frames and the retrieved sequence of precomputed data for generating a sequence of sinusoidal model parameter sets approximating the corresponding overlapping speech data frames;
(g) fundamental frequency estimator means responsive to the sequence of sinusoidal model parameter sets and the sequence of coefficient sets for generating a sequence of estimates of fundamental frequency;
(h) harmonic assignment means responsive to the sequence of fundamental frequency estimates and the sinusoidal model parameter sets to produce a sequence of quasi-harmonic sinusoidal model parameter sets; and
(i) a second memory means for storing the sequence of quasi-harmonic sinusoidal model parameter sets, the sequence of coefficient sets, and the sequence of fundamental frequency estimates.

18. An apparatus for analyzing a stream of digital signals representing a speech waveform, the speech waveform having characteristics including a time-varying average magnitude and a frequency response of a human vocal tract; the apparatus comprising:
(a) a first frame segmenting means responsive to the stream of digital signals for segmenting the stream of digital signals into a sequence of overlapping speech data frames;
(b) a time-varying average magnitude calculating means responsive to the stream of digital signals to produce an envelope stream representative of the time-varying changes in the average magnitude of the speech waveform;
(c) a second frame segmenting means responsive to the envelope stream for segmenting the envelope stream into a sequence of overlapping envelope data frames;
(d) a multiplying means responsive to the sequence of overlapping envelope data frames and the sequence of overlapping speech data frames for generating a sequence of first product frames;
(e) a squaring means responsive to the sequence of overlapping envelope data frames for producing a sequence of squared envelope data frames;
(f) a first analysis window means responsive to the sequence of first product frames for generating a first sequence of windowed frames;
(g) a second analysis window means responsive to the sequence of squared envelope data frames for producing a second sequence of windowed frames;
(h) a first discrete Fourier transform means responsive to the first sequence of windowed frames for generating a first sequence of transformed windowed frames;
(i) a second discrete Fourier transform means responsive to the second sequence of windowed frames for generating a second sequence of transformed windowed frames;
(j) an iterative analysis-by-synthesis means responsive to the first and the second sequence of transformed windowed frames to produce a sequence of sinusoidal model parameter sets;
(k) system estimator means responsive to the sequence of overlapping speech data frames for producing a sequence of coefficient sets representative of the frequency response of the human vocal tract;

(l) fundamental frequency estimator means responsive to the sequence of sinusoidal model parameter sets and the sequence of coefficient sets for generating a sequence of fundamental frequency estimates;

(m) harmonic assignment means responsive to the sequence of fundamental frequency estimates and the sinusoidal model parameter sets to produce a sequence of quasi-harmonic sinusoidal model parameter sets; and (n) a memory means for storing the sequence of quasi-harmonic sinusoidal model parameter sets, the sequence of coefficient sets, the sequence of fundamental frequency estimates, and the envelope stream.

19. An apparatus for generating a synthetic speech waveform from a set of parameters representative of overlapping speech data frames stored in a memory means, a sequence of frequency scale modification factors, and a sequence of time-scale modification factors, the set of parameters comprising a sequence of quasi-harmonic sinusoidal model parameter sets, a sequence of coefficient sets representative of a frequency response of a human vocal tract, and a sequence of fundamental frequency estimates, the apparatus comprising:

(a) a pitch onset time estimator means electrically coupled to the memory means and responsive to the sequence of coefficient sets, the sequence of fundamental frequency estimates, and the sequence of quasi-harmonic sinusoidal model parameter sets to generate a first signal representative of a sequence of excitation times relative to the center of each of the corresponding speech data frames at which an excitation pulse occurs;

(b) a discrete Fourier transform assignment means electrically coupled to the memory means and responsive to the sequence of fundamental frequency estimates, the sequence of quasi-harmonic sinusoidal model parameter sets, the first signal, the sequence of time-scale modification factors, and the sequence of frequency-scale modification factors to produce a second signal from which a modified synthetic contribution may be generated using a discrete Fourier transform algorithm;

(c) a discrete Fourier transform means responsive to the second signal to generate a transformed signal; and (d) an overlap-add means responsive to the transformed signal and the sequence of time-scale modification factors to generate a third signal representative of the synthetic speech waveform.

20. The apparatus of claim 19, wherein the speech information further comprises an envelope stream representative of time-varying average magnitude, and the overlap-add means is electrically coupled to the memory means and is additionally responsive to the envelope stream.

21. An apparatus for generating a synthetic speech waveform from a set of parameters representative of overlapping speech data frames stored in a memory means, a sequence of pitch-scale modification factors, and a sequence of time-scale modification factors, the speech information comprising a sequence of quasi-harmonic sinusoidal model parameter sets, a sequence of coefficient sets representative of a frequency response of a human vocal tract, and a sequence of fundamental frequency estimates, the apparatus comprising:

(a) a pitch onset time estimator means electrically coupled to the memory means and responsive to the sequence of coefficient sets, the sequence of fundamental frequency estimates, and the sequence of quasi-harmonic sinusoidal model parameter sets to generate a first signal representative of a sequence of time estimates relative to the center of each of the frames at which an excitation pulse occurs;

(b) a phasor interpolator means electrically coupled to the memory means and the pitch onset time estimator means and responsive to the sequence of coefficient sets, the sequence of fundamental frequency estimates, the sequence of quasi-harmonic sinusoidal model parameter sets, the first signal, and the sequence of pitch-scale modification factors to generate a sequence of modified quasi-harmonic sinusoidal model parameter sets;

(c) a discrete Fourier transform assignment means electrically coupled to the phasor interpolator means and the pitch onset time estimator means and responsive to the sequence of fundamental frequency estimates, the sequence of modified quasi-harmonic sinusoidal model parameter sets, the first signal, the sequence of time-scale modification factors, and the sequence of pitch-scale modification factors to produce a second signal from which a modified synthetic contribution may be generated using a discrete Fourier transform algorithm;

(d) a discrete Fourier transform means responsive to the second signal to generate a transformed signal; and (e) an overlap-add means responsive to the transformed signal and the sequence of time-scale modification factors to generate a third signal representative of the synthetic speech waveform.

22. The apparatus of claim 21, wherein the speech information further comprises an envelope stream representative of time-varying average magnitude, and the overlap-add means is electrically coupled to the memory means and is additionally responsive to the envelope stream.

23. An apparatus for generating a synthetic musical waveform from a set of parameters representative of overlapping musical tone data frames stored in a memory means, a sequence of frequency scale modification factors, and a sequence of time-scale modification factors, the parameter set comprising a sequence of quasi-harmonic sinusoidal model parameter sets and a sequence of fundamental frequency estimates, the apparatus comprising:

(a) a discrete Fourier transform assignment means electrically coupled to the memory means and responsive to the sequence of fundamental frequency estimates, the sequence of quasi-harmonic sinusoidal model parameter sets, the sequence of time-scale modification factors, and the sequence of frequency-scale modification factors to produce a first signal from which a modified synthetic contribution may be generated using a discrete Fourier transform algorithm;

(b) a discrete Fourier transform means responsive to the first signal to generate a transformed signal; and (c) an overlap-add means responsive to the transformed signal and the sequence of time-scale modification factors to generate a second signal representative of the synthetic musical waveform.

24. The apparatus of claim 23 wherein the musical information further comprises an envelope stream representative of time-varying average magnitude, and the overlap-add means is electrically coupled to the memory means and is additionally responsive to the envelope stream.

25. An apparatus for generating a synthetic musical tone waveform from a set of parameters representative of overlapping frames of musical data stored in a memory means, a sequence of pitch-scale modification factors, and a sequence of time-scale modification factors, the musical information comprising a sequence of quasi-harmonic sinusoidal model parameter sets, a sequence of coefficient sets representative of estimates of a spectral envelope, and a sequence of fundamental frequency estimates, the apparatus comprising:

(a) a pitch onset time estimator means electrically coupled to the memory means and responsive to the sequence of coefficient sets, the sequence of fundamental frequency estimates, and the sequence of quasi-harmonic sinusoidal model parameter sets to generate a first signal representative of a sequence of time estimates relative to the center of each of the frames at which an excitation pulse occurs;

(b) a phasor interpolator means electrically coupled to the memory means and the pitch onset time estimator means and responsive to the sequence of coefficient sets, the sequence of fundamental frequency estimates, the sequence of quasi-harmonic sinusoidal model parameter sets, the first signal, and the sequence of pitch-scale modification factors to generate a sequence of modified quasi-harmonic sinusoidal model parameter sets;

(c) a discrete Fourier transform assignment means electrically coupled to the phasor interpolator means and responsive to the sequence of fundamental frequency estimates, the sequence of modified quasi-harmonic sinusoidal model parameter sets, the sequence of time-scale modification factors, and the sequence of pitch-scale modification factors to produce a second signal from which a modified synthetic contribution may be generated using a discrete Fourier transform algorithm;

(d) a discrete Fourier transform means responsive to the second signal to generate a transformed signal; and (e) an overlap-add means responsive to the transformed signal and the sequence of time-scale modification factors to generate a third signal representative of the synthetic musical tone waveform.

26. The apparatus of claim 25, wherein the musical information further comprises an envelope stream representative of time-varying average magnitude, and the overlap-add means is electrically coupled to the memory means and is additionally responsive to the envelope stream.

27. An apparatus for analyzing a stream of digital signals representing input musical tones, the input musical tones having a time-varying average magnitude and a nominal expected pitch frequency represented by a nominal expected pitch frequency signal; the apparatus comprising:

(a) a first frame segmenting means responsive to the stream of digital signals for segmenting the stream of digital signals into a sequence of overlapping musical tone data frames each having a fundamental frequency;

(b) a time-varying average magnitude calculating means responsive to the stream of digital signals to produce an envelope stream representative of the time-varying changes in the average magnitude of the musical tones;

(c) a second frame segmenting means responsive to the envelope stream for segmenting the envelope stream into a sequence of overlapping envelope data frames;

(d) a first multiplying means responsive to the sequence of overlapping envelope data frames and the sequence of overlapping musical tone data frames for generating a sequence of first product frames;

(e) a squaring means responsive to the sequence of overlapping envelope data frames for generating a sequence of squared envelope data frames;

(f) a second multiplying means responsive to the sequence of first product frames for multiplying each one of the sequence of first product frames by an analysis window function to produce a sequence of second product frames;

(g) a third multiplying means responsive to the sequence of squared envelope data frames for multiplying each one of the sequence of squared envelope data frames by an analysis window function to produce a corresponding sequence of third product frames;

(h) a first discrete Fourier transform means responsive to the sequence of second product frames for calculating the discrete Fourier transform of each of the sequence of second product frames to produce a sequence of first transform frames;

(i) a second discrete Fourier transform means responsive to the sequence of third product frames for calculating the discrete Fourier transform of each of the sequence of third product frames to produce a sequence of second transform frames;

(j) a harmonically-constrained iterative analysis-by-synthesis means responsive to the sequence of first transform frames, the sequence of second transform frames, and the nominal expected pitch frequency signal for analyzing the sequence of first transform frames and the nominal expected pitch frequency signal to produce a sequence of fundamental frequency estimates, and to produce a sequence of quasi-harmonic sinusoidal parameter sets that approximate the sequence of musical tone data frames; and (k) a system estimator means responsive to the sequence of musical tone data frames for producing a sequence of coefficient sets representative of the spectral envelope of the quasi-harmonic sinusoidal model parameters.

28. An apparatus for analyzing a stream of digital signals representing input musical tones having a nominal expected pitch frequency represented by a nominal expected pitch frequency signal; the apparatus comprising:

(a) a first frame segmenting means responsive to the stream of digital signals for segmenting the stream of digital signals into a sequence of overlapping musical tone data frames;

(b) a multiplying means responsive to the sequence of overlapping musical tone data frames for multiplying each of the sequence of overlapping musical tone data frames with an analysis window function to produce a sequence of first product frames;

(c) a discrete Fourier transform means responsive to the sequence of first product frames for calculating the discrete Fourier transform of each of the sequence of first product frames to produce a sequence of first transform frames;

(d) a harmonically constrained iterative analysis-by-synthesis means responsive to the sequence of first transform frames, a discrete Fourier transform of the analysis window function, and the nominal expected pitch frequency signal for analyzing the sequences of first transform frames, the discrete Fourier transform of the analysis window function, and the nominal expected pitch frequency signal to produce a sequence of fundamental frequency estimates and a sequence of sets of sinusoidal parameters that approximate the corresponding sequence of musical tone data frames;

(e) a system estimator means responsive to the sequence of musical tone data frames for producing a sequence of coefficient sets representative of the spectral envelope of the quasi-harmonic sinusoidal model parameters.

* * * * *

UNITED STATES PATENT AND TRADEMARK OFFICE
CERTIFICATE OF CORRECTION

PATENT NO. : 5,327,518
DATED : July 5, 1994
INVENTOR(S) : E. Bryan George and Mark J. T. Smith It is certified that error appears in the above-indentified patent and that said Letters Patent is hereby corrected as shown below:

Delete drawing sheets consisting of Fig. 1. 8,11,12,15,16,21,24,26, and substitute therefor the drawing sheets, consisting of Fig.1, 8, 11, 12, 15, 16,21,24,26, as shown on the attached pages.

Signed and Sealed this

Eighteenth Day of October, 1994

Attest:

BRUCE LEHMAN

Attesting Officer     Commissioner of Patents and Trademarks